United States Patent
Mizuno et al.

[11] Patent Number: 6,051,516
[45] Date of Patent: Apr. 18, 2000

[54] DIELECTRIC CERAMIC COMPOSITION AND MONOLITHIC CERAMIC CAPACITOR USING SAME

[75] Inventors: Shinobu Mizuno, Muko; Norihiko Sakamoto; Nobuyuki Wada, both of Shiga-ken, all of Japan

[73] Assignee: Murata Manufacturing Co., Ltd., Japan

[21] Appl. No.: 09/120,760

[22] Filed: Jul. 22, 1998

[30] Foreign Application Priority Data

| Jul. 23, 1997 | [JP] | Japan | 9-197170 |
| Jul. 23, 1997 | [JP] | Japan | 9-197171 |
| Jul. 23, 1997 | [JP] | Japan | 9-197172 |
| May 12, 1998 | [JP] | Japan | 10-128623 |
| May 12, 1998 | [JP] | Japan | 10-128624 |
| May 12, 1998 | [JP] | Japan | 10-128626 |

[51] Int. Cl.$^7$ ............................................. C04B 35/468
[52] U.S. Cl. ................. 501/138; 501/139; 361/321.4; 361/321.5
[58] Field of Search ...................... 501/138, 139; 361/321.1, 321.2, 321.4, 321.5

[56] References Cited

U.S. PATENT DOCUMENTS 5,801,111  9/1998  Wada et al. ........................... 501/139

FOREIGN PATENT DOCUMENTS

0605904A2  12/1993  European Pat. Off. .
0737655A1   4/1996  European Pat. Off. .

*Primary Examiner*—Karl Group
*Attorney, Agent, or Firm*—Ostrolenk, Faber, Gerb, Soffen, LLP

[57] ABSTRACT

The present invention provides a dielectric ceramic composition containing 100 parts by weight of essential component represented by $(BaO)_m TiO_2 + M_2O_3 + R_2O_3 + BaZrO_3 + MgO + MnO$ (wherein $M_2O_3$ represents $Sc_2O_3$ and/or at least one of $Eu_2O_3$, $Gd_2O_3$, $Tb_2O_3$ and $Dy_2O_3$) and 0.2 to 3.0 parts by weight of a side component represented by $Li_2O$—(Si, Ti)$O_2$—MO (wherein MO represents $Al_2O_3$ and or $ZrO_2$) or $SiO_2$—$TiO_2$—XO (wherein XO represents at least one of BaO, CaO, SrO, MgO, ZnO and MnO), and a ceramic capacitor using the same.

20 Claims, 3 Drawing Sheets

FIG. 1
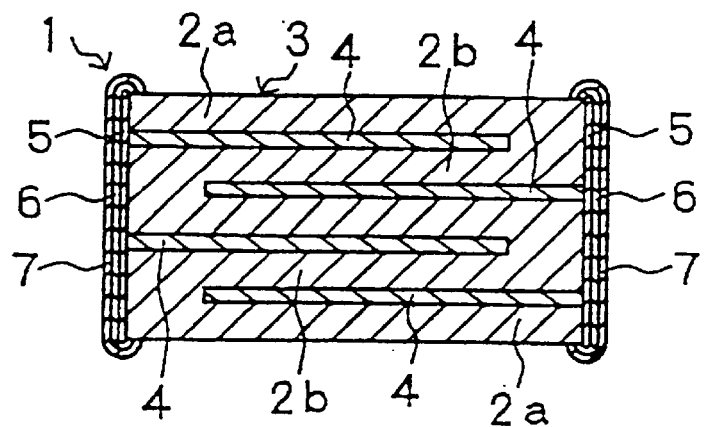
FIG. 2
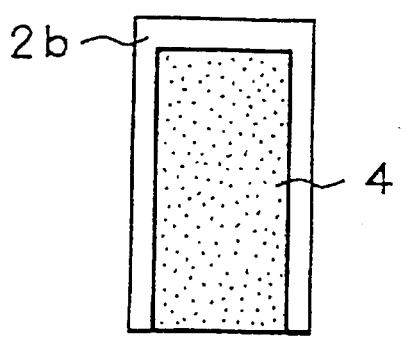
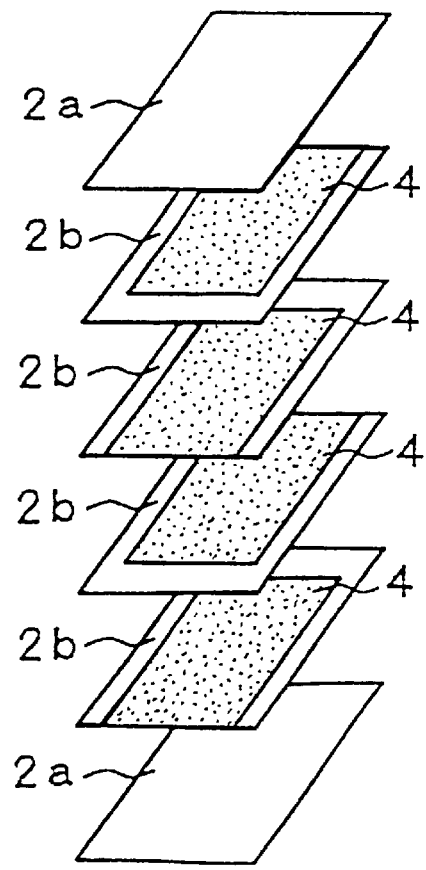
FIG. 3

DIELECTRIC CERAMIC COMPOSITION AND MONOLITHIC CERAMIC CAPACITOR USING SAME

BACKGROUND OF THE INVENTION

1. Field of the Invention

The present invention relates to a dielectric ceramic composition and monolithic ceramic capacitor using the same.

2. Description of the Related Art

The conventional ceramic capacitor is usually produced by the following process.

First, a sheet of a dielectric material coated on its surface with an electrode material to serve as an inner electrode is prepared. A material essentially composed of $BaTiO_3$ is used for the dielectric material. Then, the sheet of the dielectric material coated with this electrode material is laminated with heat-pressing to form a monolithic body followed by firing at 1250 to 1350° C. in an environment to obtain a ceramic monolithic body having inner electrodes. A monolithic ceramic capacitor is obtained by glazing outer electrodes electrically connected to the inner electrodes.

Noble metals such as platinum, gold, palladium or silver have been conventionally used for the material of the inner electrode of this monolithic. ceramic capacitor. However, these electrode materials are expensive although having excellent characteristics, rendering the production cost high. Therefore, a monolithic capacitor using base metals such as Ni as the inner electrode is currently proposed to reduce the production cost, and its application in the market being steadily increasing.

In the trend to make electronic appliances compact, high performance and low price, strongly required is a monolithic capacitor of even lower price, improved in insulation durability, insulating property and reliability, and having a large capacitance. Although it is advantageous to use an inexpensive monolithic ceramic capacitor in which nickel is used for the inner electrode for reducing the price of the electronic appliances, there is the problem that the insulation resistance, insulation durability and reliability extremely deteriorate when the electronic appliances are used under a high electric field strength because conventional dielectric ceramic materials are designed on the premise that they are used under a low electric field strength. In other words, there has been no monolithic ceramic capacitor capable of use under a high electric field strength when using nickel for the inner electrode.

For example, while the dielectric materials disclosed in Japanese Examined Patent Publication No. 57-42588 and Japanese Unexamined Patent Publication No. 61-101459 display a large dielectric constant, the grain size of the dielectric ceramic is large, thereby exhibiting deficiencies such that the insulation durability of the monolithic ceramic capacitor becomes low when it is used under a high electric field strength or the mean life span under the high temperature load test is short.

In the dielectric material disclosed in Japanese Examined Patent Publication No. 61-14611, there was a deficiency that the dielectric constant, or the electrostatic capacitance, becomes extremely lowered when the capacitor is used under a high electric field strength, although its dielectric constant obtained under a low electric field strength is as high as 2000 to 2800. There is also the deficiency that the insulation resistance is low.

SUMMARY OF THE INVENTION

The object of the present invention is to provide a dielectric ceramic composition capable of forming, for example, dielectric ceramic layers of a monolithic ceramic capacitor, wherein the insulation resistance represented by the product with the electrostatic capacitance (the product CR) is as high as about 4900 to 5000 Ω•F or more at room temperature and about 200 Ω•F or more at 150° C., respectively, when the capacitor is used under a high electric field strength of, for example, as high as about 10 kV/mm, along with having a small voltage dependence of the insulation resistance, excellent stability of the electrostatic capacitance against DC vias voltage, being high in insulation durability while the temperature characteristics of the electrostatic capacitance satisfies both the B-level characteristic standard stipulated in the JIS Standard and X7R-level characteristic standard stipulated in the EIA standard and having excellent weather resistance performance as shown by a high temperature load test and high humidity load test. Another object of the present invention is to provide a monolithic ceramic capacitor whose inner electrode is constructed of Ni or Ni alloys along with using such dielectric ceramic composition as the dielectric ceramic layer.

In broad terns, provided is a monolithic ceramic capacitor employing a dielectric ceramic composition comprising barium titanate, barium zirconate, manganese oxide, and at least one of $Sc_2O_3$, $Y_2O_3$, $Eu_2O_3$, $Gd_2O_3$, $Tb_2O_3$, $Dy_2O_3$, $Ho_2O_3$, $Er_2O_3$, $Tm_2O_3$ and $Yb_2O_3$, as a also $Li_2O$—(Si, Ti)$O_2$—MO or $SiO_2$—$TiO_2$—XO, and optionally MgO.

In a first preferred aspect, the present invention provides a dielectric ceramic composition comprising barium titanate containing about 0.02% by weight or less of alkali metal oxides, at least one of scandium oxide or yttrium oxide, at least one of compound europium oxide, gadolinium oxide, terbium oxide and dysprosium oxide, and barium zirconate and manganese oxide, and corresponding to the composition formula

$$(BaO)_m TiO_2 + \alpha M_2O_3 + \beta R_2O_3 + \gamma BaZrO_3 + gMnO$$

(wherein $M_2O_3$ represents at least one of $Sc_2O_3$ or $Y_2O_3$ and $R_2O_3$ represents at least one of $Eu_2O_3$, $Gd_2O_3$, $Tb_2O_3$ and $Dy_2O_3$, α, β, γ and g represent mo range of $0.01 \leq \alpha < 0.04$, $0.01 \leq \beta \leq 0.04$, $0.01 \leq \gamma \leq 0.04$, $0.01 < g \leq 0.12$ and $\alpha + \beta \leq 0.05$ with $1.01 < m \leq 1.03$), along with containing about 1 to 2 parts by weight of either a first or second side component relative to 100 parts by weight of the essential component defined by said formula, wherein the first side component is an oxide represented by $Li_2O$—(Si, Ti)$O_2$—MO (wherein MO is at least one of $Al_2O_3$ or $ZrO_2$) and the second side component is an oxide represented by $SiO_2$—$TiO_2$—XO (wherein XO is at least one of BaO, CaO, SrO, MgO, ZnO and MnO).

In the dielectric ceramic composition described above, the essential component may further contain h moles of magnesium oxide, where $0.001 < g \leq 0.12$, $0.001 < h \leq 0.12$ and $g+h \leq 0.13$ In the dielectric ceramic composition according to another aspect of the present invention, the essential component may be represented by the following composition formula

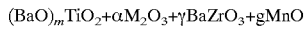
$$(BaO)_m TiO_2 + \alpha M_2O_3 + \gamma BaZrO_3 + gMnO$$

(wherein $M_2O_3$ represents at least one of either $Sc_2O_3$ or $Y_2O_3$, where α, γ and g representing mole ratio in the range of $0.001 \leq \alpha \leq 0.06$, $0.005 \leq \gamma < 0.06$ and $0.001 < g < 0.13$ with $1.000 < m \leq 1.035$).

The essential component may further contain h moles of magnesium oxide, where $0.001 < g \leq 0.12$, $0.001 < h \leq 0.12$ and $g+h \leq 0.13$.

According to a different aspect of the present invention, the essential component may be represented by the following composition formula $$(BaO)_m TiO_2 + \alpha R_2O_3 + \gamma BaZrO_3 + gMnO$$

(wherein $R_2O_3$ represents at least one of $Eu_2O_3$, $Gd_2O_3$, $Tb_2O_3$, $Dy_2O_3$, $Ho_2O_3$, $Er_2O_3$, $Tm_2O_3$ and $Yb_2O_3$, where $\alpha$, $\gamma$ and $g$ represent moles in the range of $0.001 \leq \alpha \leq 0.06$, $0.005 \leq \gamma \leq 0.06$ and $0.001 < g \leq 0.13$ with $1.000 < m \leq 1.025$).

The essential component may further contain $h$ moles of magnesium oxide, where $0.001 \leq \gamma \leq 0.06$, $0.001 < g \leq 0.12$, $0.001 < h \leq 0.12$ and $g + h \leq 0.13$.

In the dielectric ceramic compositions described above, it is preferable that the first side component, when its composition is represented by $xLi_2O - y(SiN_w, Ti_{1-w})O_2 - zMO$ (wherein x, y and z represent mol % and w is in the range of $0.30 \leq w \leq 1.00$), falls within or on the boundary lines of the area surrounded by straight lines connecting the points indicated by A (x=20, y=80, z=0), B (x=10, y=80, z=10), C (x=10, y=70, z=20), D (x=20), E (x=45, y=45, z=10) and F (x=45, y=55, z=0) provided that when the composition falls on the straight line of A-F, w is within the area of $0.3 \leq w < 1.0$ on a three component diagram defined by the apexes corresponding to each component.

In the dielectric ceramic compositions described above, it is preferable that the second side component, when its composition is represented by $xSiO2 - yTiO_2 - zXO$ (wherein x, y and z represent mol %), falls within or on the boundary lines of the area surrounded by straight lines connecting the points indicated by A (x=85, y=1, z=14), B (x=35, y=51, z=14), C (x=30, y=20, z=50) and D (x=39, y=1, z=60) in the three component diagram defined by the apexes corresponding to each component.

The second side component contains in total about 15 parts by weight of at least one of $Al_2O_3$ and $ZrO_2$ (the content of $ZrO_2$ is about 5 parts by weight or less) relative to 100 parts by weight of the oxide represented by $SiO_2 - TiO_2 - XO$.

The present invention according to a different aspect provides a monolithic ceramic capacitor provided with a plurality of dielectric ceramic layers, inner electrodes formed between the ceramic layers and outer electrodes electrically connected to the inner electrodes, wherein the dielectric ceramic layers are constructed by the dielectric ceramic composition described above and the inner electrodes are composed of nickel or a nickel alloy.

The outer electrode may be provided with a sintered layer of an electroconductive metal powder or an electroconductive metal powder supplemented with glass frits.

BRIEF DESCRIPTION OF THE DRAWINGS

FIG. 1 is a cross sectional view showing the monolithic ceramic capacitor according to one embodiment of the present invention.

FIG. 2 is a plane view showing the dielectric ceramic layer portion having inner electrodes of the monolithic ceramic capacitor shown in FIG. 1.

FIG. 3 is a disassembled perspective view showing the ceramic monolithic portion of the monolithic ceramic capacitor shown in FIG. 1.

DESCRIPTION OF THE PREFERRED EMBODIMENT

Figure 4:
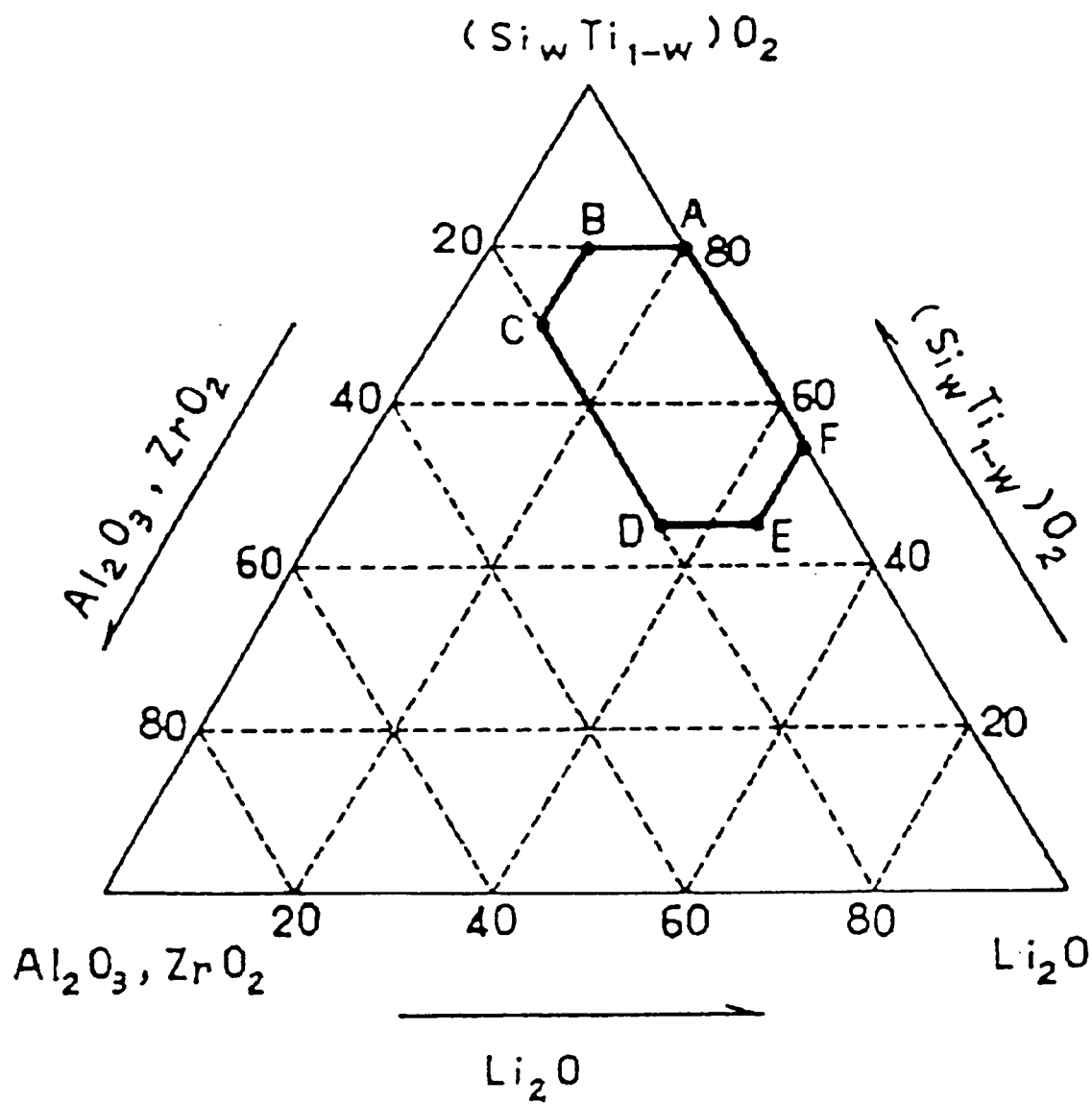
FIG. 4 is a three component phase diagram of $Li_2O - (Si_w, Ti_{1-w})O_2 - MO$ oxides.

The basic construction of the monolithic ceramic capacitor according to the first embodiment of the present invention will be described hereinafter referring to the drawings. FIG. 1 is a cross section showing one example of the monolithic ceramic capacitor, FIG. 2 is a plane view showing the dielectric ceramic portion having inner electrodes of the monolithic ceramic capacitor in FIG. 1, and FIG. 3 is a disassembled perspective view showing the dielectric ceramic portion having inner electrodes of the monolithic ceramic capacitor in FIG. 1.

As shown in FIG. 1, the monolithic ceramic capacitor 1 according to the present embodiment is provided with a rectangular shaped monolithic ceramic body 3 obtained by laminating a plurality of dielectric ceramic layers 2a and 2b via inner electrodes 4. An outer electrode 5 is formed on both side faces of the monolithic ceramic body 3 so that the outer electrodes are electrically connected to each of the specified inner electrodes 4, on which a first plating layer 6 comprising nickel or copper is plated, and a second plating layer 7 comprising a solder or tin being further formed on the first plating layer.

The method for producing the monolithic ceramic capacitor 1 will be next described in the order of production steps.

At first, a raw material powder of barium titanate prepared by weighing and mixing in a given composition ratio is prepared as an essential component of the dielectric ceramic layers 2a and 2b.

Then, a slurry is prepared by adding an organic binder in this raw material powder and, after forming this slurry into a sheet, a green sheet for use in the dielectric ceramic layers 2a and 2b is obtained.

Next, an inner electrode 4 comprising nickel or a nickel alloy is formed on one principal face of the green sheet to serve as a dielectric ceramic layer 2b. Nickel or nickel alloys as base metals may be used for the material of the inner electrode 4 when the dielectric ceramic layers 2a and 2b are formed using the dielectric ceramic composition as described above but the invention is not limited thereto. The inner electrode 4 may be formed by a screen printing method, a deposition method or a plating method.

After laminating a required number of the green sheets for use in the dielectric ceramic layers 2b having the inner electrode 4, the green sheets are inserted between the green sheets having no inner electrode for use as the dielectric ceramic layers 2a, thus obtaining a raw monolithic body by press-adhering these green sheets. Then, this raw monolithic body is fired at a given temperature to obtain a ceramic monolithic body 3.

The outer electrodes 5 are formed at the both side faces of the ceramic monolithic body 3 so as to be electrically connected to the inner electrodes 4. The same material used in the inner electrodes 4 can be used for the outer electrodes 5. While silver, palladium, a silver-palladium alloy, copper and a copper alloy are available in addition to a composition prepared by adding a glass frit such as a $B_2O_3 - SiO_2 - BaO$ glass or $Li_2O - SiO_2 - BaO$ glass to these metal powders, an appropriate material should be selected by taking the application and application site of the monolithic capacitor into consideration. While the outer electrodes 5 can be formed by coating the ceramic monolithic body 3 obtained by firing with a metal powder paste as a raw material followed by heat-adhering, it may also be formed by heat-adhering the metal powder paste simultaneously with the ceramic monolithic body 3.

The first plating layer 6 is then formed by applying a plating of nickel or copper on the outer electrode 5. Finally, the second plating layer 7 comprising a solder or tin is formed on the first plating layer 6, thereby completing the monolithic capacitor 1. Such process for further forming a conductive layer on the outer electrode 5 may be omitted depending on the intended application of the monolithic ceramic capacitor.

By using the dielectric ceramic composition as described previously for constructing the dielectric ceramic layers 2a and 2b, the characteristics of the dielectric ceramic layers are not deteriorated even when it is fired in a reducing atmosphere. In other words, such characteristics are obtained in which the product the insulation resistance and the electrostatic capacitance (the product CR) is as high as about 4900 to 5000 Ω•F or more and about 200 Ω•F or more at room temperature and 150° C., respectively, when the capacitor is used under an electric field strength as high as about 10 kV/mm, while having a small voltage dependence of the insulation resistance, the absolute value of the capacitance decreasing ratio at an impressed DC voltage of 5 kV/mm being as small as about 40% to 45%, the insulation durability being as high as about 12 kV/mm or more under an AC voltage and about 14 kV/mm under a DC voltage, the temperature characteristics of the electrostatic capacitance satisfying the B-level characteristic standard stipulated in the JIS Standard in the temperature range of −25° C. to +85° C. and X7R-level characteristic standard stipulated in the EIA standard in the temperature range of −55° C. to +125° C. and having excellent weather resistance performance as shown by a high temperature load test at 150° C. and at DC 25 kV/mm and a high humidity load test.

It has been confirmed that, among alkaline earth metal oxides such as SrO and CaO existing in barium titanate as impurities, alkali metal oxides such as $Na_2O$ and $K_2O$ and other oxides such as $Al_2O_3$ and $SiO_2$, the content of the alkali metal oxides especially influences the electric characteristics. While the specific dielectric constant is decreased when the amounts of addition of rare earth element oxides such as $Eu_2O_3$, $Gd_2O_3$, $Tb_2O_3$, $Dy_2O_3$, $Ho_2O_3$, $Er_2O_3$, and $Yb_2O_3$, and $Sc_2O_3$ and $Y_2O_3$ are increased, the specific dielectric constant can be kept to a practically acceptable range of about 900 to 1600 by keeping the content of the alkali metal oxides contained in barium titanate as impurities to about 0.02% by weight or less, preferably 0.012% or less.

Adding an oxide represented by $Li_2O$—(Si, Ti)$O_2$—MO (wherein MO is at least one of $Al_2O_3$ and $ZrO_2$) to the dielectric ceramic composition allows the composition to be sintered at a relatively low temperature of about 1300° C. or less, further improving the high temperature load characteristic.

Adding an oxide represented by $Si_2O$—$TiO_2$—XO (wherein XO is at least one of BaO, CaO, SrO, MgO, ZnO and MnO) to the dielectric ceramic composition allows the composition to be improved in sintering property as well as in high temperature load characteristics and humidity resistance load characteristics. A higher insulation resistance can be obtained by adding $Al_2O_3$ and/or $ZrO_2$ in the oxide represented by $Si_2O$—$TiO_2$—XO.

EXAMPLES

The present invention will now be described in more detail by way of examples. However, the present invention is not limited to these examples.

Example 1

After preparing and weighing $TiCl_4$ and $Ba(NO_3)_2$ having a variety of purity as starting materials, the compounds were precipitated as titanyl barium oxalate ($BaTiO(C_2O_4) \cdot 4H_2O$) by adding oxalic acid. This precipitate was decomposed by heating at a temperature of 1000° C. or more to synthesize four kinds of barium titanate listed in TABLE 1.

TABLE 1

| Kind of $BaTiO_3$ | Content of impurities (% by weight) | | | | | Mean particle size (μm) |
| --- | --- | --- | --- | --- | --- | --- |
| | Alkali metal oxide | SrO | CaO | $SiO_2$ | $Al_2O_3$ | |
| A | 0.003 | 0.012 | 0.001 | 0.01 | 0.005 | 0.6 |
| B | 0.02 | 0.01 | 0.003 | 0.019 | 0.008 | 0.56 |
| C | 0.012 | 0.179 | 0.018 | 0.155 | 0.071 | 0.72 |
| D | 0.062 | 0.014 | 0.001 | 0.019 | 0.004 | 0.58 |

Oxides, carbonates or hydroxides of each component of the first side component were weighed so as to be in a composition ratio (mole ratio) of $0.25Li_2O$–$0.65$ $(0.30TiO_2 \cdot 0.70SiO_2)$–$0.10Al_2O_3$ to obtain a powder by crushing and mixing.

Likewise, oxides, carbonates or hydroxides of each component of the second side component were weighed so as to be in a composition ratio (mole ratio) of $0.66SiO_2$–$0.17TiO_2$–$0.15BaO$–$0.02MnO$ to obtain a powder by crushing and mixing.

Oxide powders of the first and second side components were placed in separate platinum crucibles and heated at 1500° C. After quenching and crushing the mixture, each oxide powder with a mean particle size of 1 μm or less was obtained.

In the next step, $BaCO_3$ for adjusting the mole ratio Ba/Ti (m) in the barium titanate, and $Sc_2O_3$, $Y_2O_3$, $Eu_2O_3$, $Gd_2O_3$, $Tb_2O_3$ and $Dy_2O_3$, $BaZrO_3$, MgO and MnO, each having a purity of 99% or more, were prepared. These raw material powders and the oxides side components were weighted so as to form the compositions shown in TABLE 2 and TABLE 3. The amounts of addition of the first and second side components are indicated by parts by weight relative to 100 parts by weight of the essential component $(BaO)_m TiO_2 + \alpha M_2O_3 + \beta R_2O_3 + \gamma BaZrO_3 + gMnO + hMnO$.

An organic solvent such as polyvinyl butyral binder and ethanol were added to the weighed compounds and the resulting mixture was mixed in a ball mill in an wet state to prepare a ceramic slurry. This ceramic slurry was formed into a sheet by the doctor blade method to obtain a rectangular shaped green sheet with a thickness of 35 μm, followed by printing an electroconductive paste mainly composed of Ni on the ceramic green sheet to form an electroconductive paste layer for forming inner electrodes.

Then, a plurality of the ceramic green sheets on which the electroconductive layer had been formed were laminated so that the sides where the electroconductive paste is projected are alternately placed with each other, thus obtaining a monolithic body. This monolithic body was heated at 350° C. in a $N_2$ atmosphere and, after allowing the binder to decompose, the monolithic body was fired at the temperatures shown in TABLE 4 and TABLE 5 in a reducing atmosphere comprising $H_2$—$N_2$—$H_2O$ gases under an oxygen partial pressure of $10^{-9}$ to $10^{12}$ MPa, thereby obtaining a ceramic sintered body.

Both side faces of the ceramic sintered body were coated with a silver paste containing $B_2O_3$—$Li_2$—$SiO_2$—BaO glass frit and fired at a temperature of 600° C. in a $N_2$ atmosphere, thereby obtaining outer electrodes electrically connected to the inner electrodes.

TABLE 2

| Sample No. | Kind of BaTiO₃ | $(BaO)_m \cdot TiO_2 + \alpha M_2O_3 + \beta R_xO_y + \gamma BaZrO_3 + gMgO + hMnO$ | | | | | | | | | | | | | | | Amount of addition of the first side component | Amount of addition of the second side component |
|---|---|---|---|---|---|---|---|---|---|---|---|---|---|---|---|---|---|---|
| | | α | | Total of α | β | | | | | Total of β | α + β | γ | g | h | g + h | m | | |
| | | Sc₂O₃ | Y₂O₃ | | Eu₂O₃ | Gd₂O₃ | Tb₂O₃ | Dy₂O₃ | | | | | | | | | | |
| *1 | A | 0 | 0.0008 | 0.0008 | 0 | 0.05 | 0 | 0 | 0.05 | 0.0508 | 0.02 | 0.05 | 0.07 | 0.12 | 1.005 | 1 | 0 |
| *2 | A | 0.03 | 0.03 | 0.06 | 0 | 0 | 0.001 | 0 | 0.001 | 0.061 | 0.03 | 0.04 | 0.08 | 0.12 | 1.005 | 1 | 0 |
| *3 | A | 0.01 | 0.01 | 0.02 | 0 | 0 | 0.0008 | 0 | 0.0008 | 0.0208 | 0.03 | 0.02 | 0.03 | 0.05 | 1.005 | 1 | 0 |
| *4 | A | 0 | 0.001 | 0.001 | 0 | 0.03 | 0.02 | 0.02 | 0.07 | 0.071 | 0.03 | 0.03 | 0.1 | 0.13 | 1.01 | 1 | 0 |
| *5 | A | 0.01 | 0.02 | 0.03 | 0.02 | 0 | 0 | 0.02 | 0.04 | 0.07 | 0 | 0.12 | 0.01 | 0.13 | 1.01 | 1 | 0 |
| *6 | A | 0.01 | 0.01 | 0.02 | 0 | 0.02 | 0.02 | 0 | 0.04 | 0.06 | 0.08 | 0.07 | 0.06 | 0.13 | 1.01 | 1.5 | 0 |
| *7 | A | 0 | 0.01 | 0.01 | 0 | 0 | 0 | 0.02 | 0.02 | 0.03 | 0 | 0.03 | 0.04 | 0.07 | 1.01 | 1.5 | 0 |
| *8 | A | 0.01 | 0.02 | 0.03 | 0 | 0.02 | 0.01 | 0.01 | 0.02 | 0.05 | 0.02 | 0.001 | 0.069 | 0.07 | 1.01 | 1 | 0 |
| *9 | A | 0 | 0 | 0 | 0.01 | 0.01 | 0 | 0 | 0.01 | 0.02 | 0.02 | 0.125 | 0.005 | 0.13 | 1.01 | 1 | 0 |
| *10 | A | 0.01 | 0.01 | 0.02 | 0.01 | 0.01 | 0 | 0.01 | 0.02 | 0.04 | 0.02 | 0.079 | 0.001 | 0.08 | 1.01 | 1 | 0 |
| *11 | A | 0.01 | 0 | 0.01 | 0 | 0.01 | 0 | 0.02 | 0.02 | 0.03 | 0.02 | 0.005 | 0.13 | 0.13 | 1.01 | 1 | 0 |
| *12 | A | 0.01 | 0.02 | 0.03 | 0.02 | 0 | 0.01 | 0.01 | 0.04 | 0.07 | 0.03 | 0.05 | 0.08 | 0.14 | 1.01 | 1 | 0 |
| *13 | A | 0.005 | 0.005 | 0.01 | 0.01 | 0.01 | 0.005 | 0 | 0.02 | 0.03 | 0.03 | 0.03 | 0.025 | 0.055 | 0.99 | 1 | 0 |
| *14 | A | 0.01 | 0 | 0.01 | 0 | 0.005 | 0.005 | 0.01 | 0.03 | 0.04 | 0.04 | 0.04 | 0.03 | 0.07 | 1.00 | 1 | 0 |
| *15 | A | 0.005 | 0.005 | 0.01 | 0 | 0 | 0.01 | 0.01 | 0.01 | 0.02 | 0.04 | 0.02 | 0.03 | 0.05 | 1.038 | 1 | 0 |
| *16 | A | 0.01 | 0 | 0.01 | 0.01 | 0 | 0 | 0.01 | 0.02 | 0.03 | 0.02 | 0.03 | 0.02 | 0.05 | 1.05 | 1 | 1 |
| *17 | A | 0 | 0.01 | 0.01 | 0 | 0.01 | 0.01 | 0 | 0.02 | 0.03 | 0.02 | 0.03 | 0.04 | 0.07 | 1.01 | 0 | 0 |
| *18 | A | 0 | 0.01 | 0.01 | 0 | 0.01 | 0.01 | 0.01 | 0.03 | 0.04 | 0.02 | 0.04 | 0.03 | 0.07 | 1.01 | 5 | 0 |
| *19 | A | 0 | 0.01 | 0.01 | 0.01 | 0 | 0 | 0.01 | 0.02 | 0.03 | 0.02 | 0.02 | 0.04 | 0.06 | 1.01 | 0 | 4 |
| *20 | A | 0.01 | 0.01 | 0.02 | 0 | 0.01 | 0.01 | 0 | 0.01 | 0.03 | 0.03 | 0.03 | 0.02 | 0.05 | 1.01 | 0 | 0 |
| *21 | A | 0 | 0.01 | 0.01 | 0.02 | 0 | 0.02 | 0 | 0.03 | 0.04 | 0.02 | 0.04 | 0.05 | 0.09 | 1.01 | 2 | 0 |
| 22 | D | 0 | 0.001 | 0.001 | 0.02 | 0 | 0.009 | 0 | 0.029 | 0.03 | 0.02 | 0.04 | 0.01 | 0.05 | 1.015 | 1 | 0 |
| 23 | B | 0.01 | 0.01 | 0.02 | 0 | 0.01 | 0 | 0 | 0.01 | 0.03 | 0.03 | 0.03 | 0.02 | 0.05 | 1.02 | 1 | 0 |

TABLE 3

| | | | | | (BaO)$_m$·TiO$_2$ + αM$_2$O$_3$ + βR$_2$O$_3$ + γBaZrO$_3$ + gMgO + hMnO | | | | | | | | | | | Amount of addition of the first side component | Amount of addition of the second side component |
|---|---|---|---|---|---|---|---|---|---|---|---|---|---|---|---|---|---|
| | | α | | Total of α | β | | | | Total of β | α + β | γ | g | h | g + h | m | | |
| Sample No. | Kind of BaTiO$_3$ | Sc$_2$O$_3$ | Y$_2$O$_3$ | | Eu$_2$O$_3$ | Gd$_2$O$_3$ | Tb$_2$O$_3$ | Dy$_2$O$_3$ | | | | | | | | | |
| 24 | C | 0.01 | 0.02 | 0.03 | 0 | 0 | 0 | 0.01 | 0.01 | 0.04 | 0.03 | 0.12 | 0.002 | 0.122 | 1.03 | 1 | 0 |
| 25 | A | 0.01 | 0.03 | 0.04 | 0 | 0 | 0.01 | 0 | 0.01 | 0.05 | 0.03 | 0.07 | 0.06 | 0.13 | 1.02 | 1 | 0 |
| 26 | A | 0.01 | 0.04 | 0.05 | 0 | 0.01 | 0 | 0 | 0.01 | 0.06 | 0.03 | 0.002 | 0.12 | 0.122 | 1.01 | 0 | 1 |
| 27 | A | 0.005 | 0.005 | 0.01 | 0 | 0.01 | 0 | 0.001 | 0.001 | 0.011 | 0.02 | 0.01 | 0.02 | 0.03 | 1.01 | 1 | 0 |
| 28 | A | 0 | 0.01 | 0.01 | 0.01 | 0 | 0.01 | 0 | 0.02 | 0.03 | 0.02 | 0.03 | 0.02 | 0.05 | 1.01 | 1 | 0 |
| 29 | A | 0 | 0.01 | 0.01 | 0.02 | 0 | 0.01 | 0 | 0.03 | 0.04 | 0.02 | 0.05 | 0.03 | 0.08 | 1.015 | 0 | 1 |
| 30 | A | 0 | 0.01 | 0.01 | 0 | 0.04 | 0 | 0 | 0.04 | 0.05 | 0.02 | 0.06 | 0.03 | 0.09 | 1.01 | 0 | 1 |
| 31 | A | 0.01 | 0.02 | 0.03 | 0 | 0.03 | 0 | 0.02 | 0.05 | 0.08 | 0.02 | 0.05 | 0.06 | 0.11 | 1.01 | 1 | 0 |
| 32 | A | 0.01 | 0.02 | 0.03 | 0 | 0 | 0.02 | 0 | 0.02 | 0.05 | 0.03 | 0.05 | 0.04 | 0.09 | 1.01 | 1 | 0 |
| 33 | A | 0 | 0.01 | 0.01 | 0 | 0.02 | 0 | 0.03 | 0.03 | 0.04 | 0.03 | 0.06 | 0.04 | 0.1 | 1.01 | 1 | 0 |
| 34 | A | 0.01 | 0.01 | 0.02 | 0.02 | 0 | 0 | 0 | 0.02 | 0.04 | 0.01 | 0.03 | 0.02 | 0.05 | 1.01 | 1 | 0 |
| 35 | A | 0.01 | 0.01 | 0.02 | 0 | 0 | 0.01 | 0 | 0.01 | 0.03 | 0.04 | 0.05 | 0.03 | 0.08 | 1.01 | 1 | 0 |
| 36 | A | 0.01 | 0.01 | 0.02 | 0 | 0 | 0.01 | 0.01 | 0.02 | 0.04 | 0.06 | 0.05 | 0.02 | 0.07 | 1.01 | 2 | 0 |
| 37 | A | 0.01 | 0.01 | 0.02 | 0 | 0 | 0.01 | 0 | 0.02 | 0.04 | 0.03 | 0.04 | 0.03 | 0.07 | 1.01 | 2 | 0 |
| 38 | A | 0.01 | 0.01 | 0.02 | 0.01 | 0 | 0 | 0 | 0.01 | 0.03 | 0.03 | 0.04 | 0.015 | 0.055 | 1.01 | 2 | 0 |
| 39 | A | 0.01 | 0.01 | 0.02 | 0 | 0 | 0 | 0.01 | 0.01 | 0.03 | 0.02 | 0.03 | 0.04 | 0.07 | 1.01 | 2 | 0 |
| 40 | A | 0 | 0.02 | 0.02 | 0 | 0 | 0.01 | 0 | 0.01 | 0.03 | 0.02 | 0.03 | 0.02 | 0.05 | 1.01 | 2 | 0 |
| 41 | A | 0 | 0.02 | 0.02 | 0.01 | 0 | 0 | 0 | 0.01 | 0.03 | 0.02 | 0.03 | 0.03 | 0.06 | 1.001 | 2 | 0 |
| 42 | A | 0.02 | 0 | 0.02 | 0 | 0.01 | 0 | 0.01 | 0.02 | 0.04 | 0.03 | 0.04 | 0.03 | 0.07 | 1.01 | 0 | 2 |
| 43 | A | 0.01 | 0.01 | 0.02 | 0 | 0 | 0.01 | 0 | 0.02 | 0.04 | 0.03 | 0.03 | 0.05 | 0.08 | 1.035 | 2 | 0 |
| 44 | A | 0.01 | 0.01 | 0.02 | 0 | 0.02 | 0 | 0 | 0.02 | 0.04 | 0.03 | 0.04 | 0.03 | 0.07 | 1.015 | 0.2 | 0 |
| 45 | A | 0.01 | 0.02 | 0.03 | 0 | 0 | 0 | 0.01 | 0.01 | 0.04 | 0.03 | 0.03 | 0.02 | 0.05 | 1.01 | 3 | 0 |
| 46 | A | 0 | 0.02 | 0.02 | 0 | 0 | 0 | 0.01 | 0.01 | 0.03 | 0.03 | 0.02 | 0.04 | 0.06 | 1.01 | 0 | 0.2 |
| 47 | A | 0 | 0.02 | 0.02 | 0.01 | 0 | 0.01 | 0 | 0.02 | 0.04 | 0.03 | 0.05 | 0.02 | 0.07 | 1.01 | 0 | 3 |

The overall dimensions of the monolithic ceramic capacitor thus obtained were 5.0 mm in width, 5.7 mm in length and 2.4 mm in thickness while the thickness of each dielectric ceramic layer was 30 µm. The total number of the effective dielectric ceramic layers were 57, the area of the confronting electrode per layer being $8.2 \times 10^{-6}$ m$^2$.

Electric characteristics of these monolithic ceramic capacitors were measured. The electrostatic capacitance (C) and dielectric loss (tan δ) were measured using an automatic bridge type measuring instrument at 1 kHz, 1 Vrms and 25° C. and the dielectric constant (ε) was calculated from the electrostatic capacitance. Next, the insulation resistance was measured using an insulation resistance tester at 25° C. and 150° C. by impressing direct current voltages of 315 V (or 10 kV/mm) and 945 V (or 30 kV/mm) for 2 minutes, obtaining the product of the electrostatic capacitance and insulation resistance, or the product CR.

The rate of change of the electrostatic capacitance against temperature changes was also measured. The rate of change at −25° C. and 85° C. by taking the electrostatic capacitance at 20° C. as a standard (ΔC/C$_{20}$), the rate of change at −55° C. and 125° C. by taking the electrostatic capacitance at 25° C. as a standard (ΔC/C$_{25}$) and the maximum value of the rate of change (|ΔC|$_{max}$) as an absolute value were measured as the electrostatic capacitances against temperature changes.

The DC vias characteristic was also evaluated. First, the electrostatic capacitance when an AC voltage of 1 kHz and 1 Vrms was impressed was measured. Then, the electrostatic capacitance when a DC voltage of 150 V and an AC voltage of 1 kHz and 1 Vrms were simultaneously impressed was measured, thereby the rate of reduction of the electrostatic capacitance (ΔC/C) due to loading the DC voltage was calculated.

In the high temperature load test, a direct current voltage of 750 V (or 25 kV/mm) was impressed at 150° C. on 36 pieces of each sample to measure the time dependent changes of the insulation resistance. The time when the insulation resistance of each sample was reduced below $10^6$ Ω was defined to be a life span time and mean life span time was evaluated.

In the humidity resistance test, the number of the test pieces having an insulation resistance of $10^6$ Ω or less among the 72 test pieces were counted after impressing a DC voltage of 315 V under an atmospheric pressure of 2 atm (relative humidity 100%) at 120° C. for 250 hours.

Insulation breakdown voltages under AC and DC voltages were measured by impressing AC and DC voltages at a voltage increase rate of 100 V/sec.

The results described above are listed in TABLE 4 and TABLE 5.

TABLE 4

| Sample No. | Baking Temp. (°C) | Dielectric Constant | Dielectric Loss tan δ (%) | Ratio of Temperature Dependent Capacitor Change (%) | | | | | DC bias characteristic (%) ΔC/C 5 kV/mm | Product CR (Ω·F) | | | | Insulation breakdown voltage (kV/mm) | | Humidity Resistance Load Test: Number of rejects | Mean Life Span |
|---|---|---|---|---|---|---|---|---|---|---|---|---|---|---|---|---|---|
| | | | | ΔC/C$_{20}$ | | ΔC/C$_{25}$ | | Maximum value | | 315 V Impressed Voltage 25° C. | 945 V Impressed Voltage 25° C. | 315 V Impressed Voltage 150° C. | 945 V Impressed Voltage 150° C. | AC | DC | | |
| | | | | -25° C. | 85° C. | -55° C. | 125° C. | | | | | | | | | | |
| *1 | 1300 | 1210 | 0.7 | 5.6 | -12 | 6.4 | -17.5 | 21 | -21 | 5110 | 4860 | 220 | 210 | 12 | 14 | 0/72 | 960 |
| *2 | 1300 | 960 | 0.7 | 2.3 | -7.8 | 4.7 | -6.9 | 8.7 | -16 | 8520 | 8090 | 200 | 190 | 12 | 14 | 0/72 | 910 |
| *3 | 1300 | 1550 | 0.7 | 3 | -7.9 | 5 | -6.8 | 8.5 | -42 | 3020 | 2870 | 120 | 110 | 13 | 14 | 0/72 | 930 |
| *4 | 1300 | 920 | 0.7 | 6 | -12.9 | 7.5 | -19 | 25.3 | -14 | 5060 | 4810 | 250 | 240 | 12 | 14 | 0/72 | 120 |
| *5 | 1280 | 960 | 2 | 2.1 | -8 | 4.2 | -7.1 | 8.5 | -14 | 5070 | 4820 | 260 | 250 | 12 | 14 | 10/72 | 180 |
| *6 | 1280 | 1070 | 0.7 | 1.9 | -8.2 | 3 | -7.5 | 8.9 | -16 | 3120 | 2180 | 140 | 100 | 12 | 14 | 0/72 | 870 |
| *7 | 1300 | 1440 | 0.7 | 2.2 | -14.3 | 4.5 | -31.5 | 36.2 | -36 | 5160 | 4900 | 240 | 230 | 12 | 14 | 0/72 | 160 |
| *8 | 1280 | 1280 | 0.8 | 2.2 | -12.5 | 4.6 | -16.3 | 21.3 | -26 | 3090 | 2940 | 130 | 120 | 13 | 14 | 0/72 | 950 |
| *9 | 1360 | 1530 | 2.6 | 2.3 | -7.7 | 5 | -7.5 | 8.5 | -43 | 5110 | 4860 | 230 | 220 | 12 | 14 | 53/72 | 120 |
| *10 | | | | | | | | Unmeasurable Due to Semiconductor Formation | | | | | | | | | |
| *11 | 1280 | 1460 | 0.7 | 3 | -8.5 | 5.1 | -17.9 | 23.6 | -38 | 3150 | 2990 | 150 | 140 | 12 | 14 | 0/72 | 150 |
| *12 | 1280 | 940 | 2.1 | 2.3 | -8.2 | 4.5 | -8.5 | 8.7 | -14 | 5060 | 4800 | 240 | 230 | 12 | 14 | 9/72 | 100 |
| *13 | | | | | | | | Unmeasurable Due to Semiconductor Formation | | | | | | | | | |
| *14 | 1300 | 1360 | 0.7 | 3.4 | -8.4 | 5.3 | -8 | 9.3 | -30 | 3200 | 3040 | 160 | 150 | 10 | 11 | 0/72 | 130 |
| *15 | | | | | | | | Unmeasurable Due to Insufficient Sintering | | | | | | | | | |
| *16 | | | | | | | | Unmeasurable Due to Insufficient Sintering | | | | | | | | | |
| *17 | | | | | | | | Unmeasurable Due to Insufficient Sintering | | | | | | | | | |
| *18 | 1300 | 1320 | 2.6 | 3.3 | -8.3 | 5.1 | -8.2 | 9.2 | -25 | 3250 | 3090 | 170 | 160 | 11 | 12 | 0/72 | 150 |
| *19 | | | | | | | | Unmeasurable Due to Insufficient Sintering | | | | | | | | | |
| *20 | 1300 | 1470 | 2.6 | 1.9 | -8.7 | 4 | -8 | 9.3 | -41 | 3300 | 3140 | 180 | 170 | 12 | 12 | 0/72 | 110 |
| *21 | 1300 | 1140 | 0.6 | 2.2 | -8.9 | 7 | -8.3 | 9.5 | -26 | 5180 | 4920 | 280 | 270 | 12 | 14 | 0/72 | 860 |
| 22 | 1280 | 1480 | 0.7 | 5.2 | -7.2 | 6.5 | -7 | 8.7 | -39 | 5090 | 4840 | 270 | 260 | 12 | 15 | 0/72 | 920 |
| 23 | 1280 | 1460 | 0.7 | 1.6 | -7.6 | 7 | -7.2 | 8.8 | -39 | 5020 | 4770 | 250 | 240 | 12 | 14 | 0/72 | 940 |

TABLE 5

| Sample No. | Baking Temp. (°C.) | Dielectric Constant | Dielectric Loss tan δ (%) | Ratio of Temperature Dependent Capacitor Change (%) ΔC/C₂₀ −25° C. | 85° C. | ΔC/C₂₅ −55° C. | 125° C. | Maximum value | DC vias characteristic (%) ΔC/C 5 kV/mm | Product CR (Ω·F) 315 V Impressed Voltage 25° C. | 945 V Impressed Voltage 25° C. | 315 V Impressed Voltage 150° C. | 945 V Impressed Voltage 150° C. | Insulation breakdown voltage (kV/mm) AC | DC | Humidity Resistance Load Test: Number of reject | Mean Life Span |
|---|---|---|---|---|---|---|---|---|---|---|---|---|---|---|---|---|---|
| 24 | 1280 | 1350 | 0.6 | 1.7 | −8.5 | 5.9 | −7.8 | 8.9 | −31 | 5280 | 5020 | 290 | 280 | 12 | 15 | 0/72 | 990 |
| 25 | 1300 | 1260 | 0.6 | 2 | −8.7 | 5.1 | −8.2 | 9.5 | −23 | 5130 | 4870 | 270 | 260 | 12 | 14 | 0/72 | 890 |
| 26 | 1300 | 1080 | 0.7 | 2.1 | −8.8 | 5.5 | −8.3 | 9.2 | −17 | 5200 | 4940 | 220 | 210 | 12 | 15 | 0/72 | 950 |
| 27 | 1300 | 1650 | 0.6 | 2.1 | −7.5 | 6.1 | −7.5 | 8.7 | −45 | 5210 | 4950 | 230 | 220 | 12 | 14 | 0/72 | 820 |
| 28 | 1300 | 1410 | 0.7 | 3 | −7.9 | 6.7 | −7.3 | 8.8 | −36 | 5290 | 5030 | 280 | 270 | 12 | 14 | 0/72 | 850 |
| 29 | 1280 | 1370 | 0.6 | 3.1 | −8.2 | 6 | −7.8 | 8.8 | −33 | 5200 | 4940 | 290 | 280 | 13 | 14 | 0/72 | 900 |
| 30 | 1280 | 1230 | 0.6 | 2.1 | −8.5 | 5.8 | −7.9 | 9.5 | −22 | 5260 | 5000 | 250 | 240 | 12 | 14 | 0/72 | 870 |
| 31 | 1300 | 1030 | 0.6 | 2 | −8.9 | 5 | −8.2 | 9.2 | −15 | 5240 | 4980 | 210 | 200 | 12 | 14 | 0/72 | 920 |
| 32 | 1300 | 1260 | 0.6 | 1.9 | −7.9 | 4.8 | −7.5 | 8.7 | −21 | 5010 | 4760 | 200 | 190 | 12 | 14 | 0/72 | 920 |
| 33 | 1300 | 1060 | 0.6 | 2 | −8 | 4.9 | −7.8 | 8.5 | −16 | 5230 | 4970 | 260 | 250 | 12 | 14 | 0/72 | 870 |
| 34 | 1280 | 1420 | 0.6 | 2 | −8.2 | 5.3 | −7.9 | 8.9 | −36 | 5060 | 4810 | 280 | 270 | 12 | 14 | 0/72 | 850 |
| 35 | 1280 | 1360 | 0.6 | 2 | −7.8 | 5.7 | −8 | 8.6 | −30 | 5260 | 5000 | 230 | 220 | 12 | 15 | 0/72 | 820 |
| 36 | 1300 | 1370 | 0.7 | 2.5 | −7.9 | 6 | −7.6 | 8 | −32 | 5100 | 4850 | 220 | 210 | 12 | 14 | 0/72 | 850 |
| 37 | 1300 | 1350 | 0.6 | 2 | −8 | 6.1 | −7.7 | 8.5 | −32 | 5070 | 4820 | 250 | 240 | 12 | 14 | 0/72 | 890 |
| 38 | 1300 | 1470 | 0.6 | 2 | −8.1 | 5.8 | −8 | 8.6 | −39 | 5090 | 4840 | 230 | 220 | 13 | 14 | 0/72 | 900 |
| 39 | 1280 | 1440 | 0.7 | 2.6 | −8.1 | 5.9 | −7.9 | 8.7 | −39 | 5100 | 4850 | 240 | 230 | 13 | 14 | 0/72 | 870 |
| 40 | 1280 | 1480 | 0.7 | 2.5 | −8.5 | 6 | −8.2 | 9.2 | −40 | 5210 | 4950 | 210 | 200 | 12 | 14 | 0/72 | 910 |
| 41 | 1280 | 1460 | 0.6 | 2 | −7.8 | 6.7 | −8 | 8.6 | −40 | 5220 | 4960 | 260 | 250 | 12 | 14 | 0/72 | 890 |
| 42 | 1300 | 1380 | 0.6 | 2.7 | −7.9 | 6 | −8.2 | 8.7 | −30 | 5160 | 4900 | 230 | 220 | 12 | 14 | 0/72 | 920 |
| 43 | 1300 | 1350 | 0.6 | 2 | −8.1 | 5.8 | −8 | 8.5 | −30 | 5360 | 5090 | 250 | 240 | 12 | 14 | 0/72 | 900 |
| 44 | 1300 | 1320 | 0.6 | 2.5 | −8.2 | 5.9 | −7.7 | 8.9 | −25 | 5180 | 4920 | 230 | 220 | 12 | 14 | 0/72 | 880 |
| 45 | 1300 | 1450 | 0.7 | 2.3 | −8.3 | 7.2 | −7.8 | 8.8 | −38 | 5190 | 4930 | 290 | 280 | 12 | 14 | 0/72 | 850 |
| 46 | 1280 | 1430 | 0.7 | 2.3 | −8 | 6.8 | −7.9 | 8.8 | −38 | 5230 | 4970 | 270 | 260 | 12 | 14 | 0/72 | 860 |
| 47 | 1300 | 1440 | 0.6 | 2.2 | −7.9 | 6.5 | −7.5 | 8 | −38 | 5260 | 5000 | 260 | 250 | 12 | 14 | 0/72 | 920 |

It is evident from Table 1 to TABLE 5 that the monolithic ceramic capacitor according to the present invention has a capacitance decreasing ratio of as small as within −45% at an impressed voltage of 5 kV/mm and a dielectric loss of less than 1.0 %, wherein the rate of change of the electrostatic capacitance against temperature changes satisfies both the B-level characteristic standard stipulated in the JIS Standard in the temperature range of −25° C. to +85° C. and X7R-level characteristic standard stipulated in the EIA standard in the temperature range of −55° C. to +125° C.

Moreover, the insulation resistances at 25° C. and 150° C. as expressed by the product CR show values as high as 5000 Ω•F or more and 200 Ω•F or more, respectively, when the ceramic capacitor is used under a high electric field strength of 10 kV/mm. The insulation breakdown voltage also shows high values of 12 kV/mm or more under the AC voltage and 14 kV/mm or more under the DC voltage. In addition, an acceleration test at 150° C. and DC 25 kV/mm gave a mean life span as long as 800 hours or more in addition to enabling a relatively low firing temperature of 1300° C. or less.

The reason why the composition was limited in the present invention will be described hereinafter.

In the composition of $(BaO)_m TiO_2 + \alpha M_2O_3 + \beta R_2O_3 + \gamma BaZrO_3 + gMnO + hMgO$ (wherein $M_2O_3$ represents at least one of $Sc_2O_3$ or $Y_2O_3$ and $R_2O_3$ represents at least one of $Eu_2O_3$, $Gd_2O_3$, $Tb_2O_3$ and $Dy_2O_3$, $\alpha$, $\beta$, $\gamma$, g and h representing mole ratio, respectively), a $M_2O_3$ content $\alpha$ of less than about 0.001 as shown in the sample No. 1 is not preferable because the temperature characteristic does not satisfy the B-level/X7R characteristics. On the other hand, a $M_2O_3$ content $\alpha$ of more than about 0.05 as shown in the sample No. 2 is also not preferable because the specific dielectric constant is reduced to less than 1000. Accordingly, the preferable range of the $M_2O_3$ content $\alpha$ is $0.001 \leq \alpha \leq 0.05$.

It is not preferable that the $R_2O_3$ content $\beta$ is less than about 0.001 as in the sample No. 3 since the insulation resistance is so low that the product CR becomes small. It is also not preferable that the $R_2O_3$ content $\beta$ is more than about 0.05 as in the sample No. 4 because the temperature characteristic does not satisfy the B-level/X7R characteristics, reducing reliability. Accordingly, the preferable range of the $R_2O_3$ content $\beta$ is $0.001 \leq \beta \leq 0.05$.

When the combined amount of $M_2O_3$ and $R_2O_3$ ($\alpha + \beta$) is more than about 0.06, the dielectric loss is increased up to 2.0% while the mean life span is shortened, and the number of rejects in the humidity resistance load test is increased. Accordingly, the combined amount of $M_2O_3$ and $R_2O_3$ ($\alpha + \beta$) is preferably in the range of $\alpha + \beta \leq 0.06$.

It is not preferable that, as seen in the sample No. 6, the $BaZrO_3$ content $\gamma$ is zero since the insulation resistance becomes low while having a larger voltage dependency of the insulation resistance than in the system containing $BaZrO_3$. On the other hand, when the $BaZrO_3$ content $\gamma$ exceeds about 0.06 as in the sample No. 7, the temperature characteristic does not satisfy the B-level/X7R characteristics, and the mean life span is shortened. Accordingly, the preferable range of the $BaZrO_3$ content $\gamma$ is $0.005 \leq \gamma \leq 0.06$.

It is not preferable that, as seen in the sample No. 8, the MgO content g is about 0.001 since the insulation resistance becomes low and the temperature characteristics do not satisfy the B-level/X7R characteristics. On the other hand, when the MgO content g exceeds about 0.12 as seen in the sample No. 9, the sintering temperature becomes high and the dielectric loss exceeds 2.0%, which is not preferable because rejection in the humidity resistance test are greatly increased while shortening the mean life span. Accordingly, the preferable range of the MgO content g is $0.001 \leq g \leq 0.12$.

It is not preferable that, as seen in the sample No. 12, the MnO content h is about 0.001 as seen in the sample No. 10 since the sample becomes not measurable due to semiconductor formation. It is not preferable that the MnO content h exceeds about 0.12, on the other hand, because the temperature characteristic X7R is not satisfied, the insulation resistance becomes low and the mean life span becomes short. Accordingly, the preferable MnO content h is in the range of $0.001 < h \leq 0.12$.

It is not preferable that, as seen in the sample No. 12, the combined content of MgO and MnO (g+h) exceeds about 0.13 because the dielectric loss is increased to 2.0%, the mean life span is shortened and the number of rejects in the humidity resistance load test is increased. Accordingly, the combined content of MgO and MnO (g+h) is preferably in the range of $g+h \leq 0.13$.

It is not preferable that the $BaO/TiO_2$ ratio m is less than about 1.000 as in the sample No. 13 because measurements are impossible due to formation of semiconductors. It is also not preferable that, as seen in the sample No. 14, that the $BaO/TiO_2$ ratio m is about 1.000 since the insulation resistance as well as the AC and DC breakdown voltage become low along with shortening the mean life span. It is not preferable, on the other hand, that the $BaO/TiO_2$ ratio m is over about 1.035 since measurements becomes impossible due to insufficient sintering. Accordingly, the $BaO/TiO_2$ ratio m in the range of $1.000 < m \leq 1.035$ is preferable.

It is not preferable that the amount of addition of the first or second side component is zero as in the samples No. 17 and 19 because measruement are impossible due to insufficient sintering. When the amount of addition of the first or second side component exceeds about 3.0 parts by weight as seen in the samples No. 18 and 20, the dielectric loss exceeds 1.0% and the insulation resistance and insulation breakdown voltage are lowered along with shortening the mean life span, which are not preferable. Accordingly, the preferable content of either the first or the second components is about 0.2 to 3.0 parts by weight.

The content of the alkali earth metal oxides contained in barium titanate as impurities are below about 0.02% by weight because when the content of the alkali earth metal oxides exceeds about 0.02% by weight, the dielectric constant is decreased.

Example 2

A starting material $BaO_{1.010} \cdot TiO_2 + 0.010 Y_2O_3 + 0.02 Gd_2O_3 + 0.01 BaZrO_3 + 0.05 MgO + 0.01 MnO$ (mole ratio) was prepared using barium titanate A of TABLE 1 as a dielectric powder, in which $Li_2O$—$(Si, Ti)O_2$—MO oxide with a mean particle size of 1 $\mu$m or less shown in TABLE 6 prepared by heating at 1200 to 1500° C. was added as a first side component. A monolithic ceramic capacitor was prepared by the same method as in Example 1, except that the starting material as described above was used. The overall dimensions of the monolithic ceramic capacitor produced are the same as in Example 1.

Then, the electric characteristics were measured by the same method as described above. The results are shown in TABLE 7.

TABLE 6

| Sample No. | Amount of addition (parts by weight) | Composition (mol % except w) | | | | |
|---|---|---|---|---|---|---|
| | | $Li_2O$ | $(Si_wTi_{1-w})O_2$ | w | $Al_2O_3$ | $ZrO_2$ |
| 101 | 1 | 20 | 80 | 0.3 | 0 | 0 |
| 102 | 1 | 10 | 80 | 0.6 | 5 | 5 |
| 103 | 0.8 | 10 | 70 | 0.5 | 20 | 0 |
| 104 | 0.8 | 35 | 45 | 1 | 10 | 10 |
| 105 | 1.5 | 45 | 45 | 0.5 | 10 | 0 |
| 106 | 1.5 | 45 | 55 | 0.3 | 0 | 0 |
| 107 | 1 | 20 | 70 | 0.6 | 5 | 5 |
| 108 | 1 | 20 | 70 | 0.4 | 10 | 0 |
| 109 | 1.2 | 30 | 60 | 0.7 | 5 | 5 |
| 110 | 1.2 | 30 | 60 | 0.8 | 10 | 0 |
| 111 | 2 | 40 | 50 | 0.6 | 5 | 5 |
| 112 | 2 | 40 | 50 | 0.9 | 0 | 10 |
| 113 | 1.5 | 10 | 85 | 0.4 | 5 | 0 |
| 114 | 2 | 5 | 75 | 0.6 | 10 | 10 |
| 115 | 1.2 | 20 | 55 | 0.5 | 25 | 0 |
| 116 | 1 | 45 | 40 | 0.8 | 0 | 15 |
| 117 | 0.8 | 50 | 45 | 0.7 | 5 | 0 |
| 118 | 1.2 | 25 | 75 | 0.9 | 0 | 0 |
| 119 | 1.5 | 25 | 75 | 1 | 0 | 0 |
| 120 | 1 | 35 | 65 | 0.9 | 0 | 0 |
| 121 | 1.5 | 35 | 65 | 1 | 0 | 0 |
| 122 | 1.2 | 20 | 70 | 0.2 | 0 | 10 |

TABLE 7

| Sample No. | Baking Temp. (°C) | Dielectric Constant | Dielectric Loss tan δ (%) | Ratio of Temperature Dependent Capacitor Change (%) ΔC/C₂₀ | | | | Maximum value | DC vias characteristic (%) ΔC/C 5 kV/mm | Product CR (Ω·F) 315 V Impressed Voltage 25° C. | 945 V Impressed Voltage 25° C. | 315 V Impressed Voltage 150° C. | 945 V Impressed Voltage 150° C. | Insulation breakdown voltage (kV/mm) AC | DC | Humidity Resistance Load Test: Number of rejects | Mean Life Span (h) |
|---|---|---|---|---|---|---|---|---|---|---|---|---|---|---|---|---|---|
| | | | | −25° C. | 85° C. | −55° C. | 125° C. | | | | | | | | | | |
| 101 | 1280 | 1480 | 0.6 | 2.1 | −8.5 | 5.2 | −8 | 8.3 | −39 | 5090 | 4840 | 230 | 220 | 12 | 15 | 0/72 | 880 |
| 102 | 1280 | 1490 | 0.6 | 2.3 | −8 | 5.6 | −8.5 | 8.9 | −40 | 5080 | 4830 | 240 | 230 | 12 | 14 | 0/72 | 850 |
| 103 | 1280 | 1420 | 0.6 | 3 | −8.1 | 4.9 | −8.9 | 9.5 | −38 | 5070 | 4820 | 250 | 240 | 12 | 14 | 0/72 | 900 |
| 104 | 1300 | 1400 | 0.6 | 2.4 | −8.3 | 5 | −9.2 | 9.5 | −36 | 5100 | 4850 | 230 | 220 | 12 | 15 | 0/72 | 910 |
| 105 | 1300 | 1460 | 0.6 | 2.6 | −8 | 5.2 | −9.5 | 9.7 | −37 | 5120 | 4860 | 220 | 210 | 13 | 14 | 0/72 | 820 |
| 106 | 1280 | 1440 | 0.7 | 2.1 | −8.9 | 4.8 | −8.2 | 8.8 | −37 | 5100 | 4850 | 230 | 220 | 12 | 14 | 0/72 | 820 |
| 107 | 1280 | 1500 | 0.6 | 2 | −7.9 | 4.9 | −9.1 | 9.5 | −40 | 5230 | 4970 | 250 | 240 | 13 | 14 | 0/72 | 910 |
| 108 | 1280 | 1480 | 0.6 | 3.1 | −7.8 | 5.2 | −9.4 | 9.6 | −40 | 5130 | 4870 | 240 | 230 | 12 | 14 | 0/72 | 930 |
| 109 | 1280 | 1480 | 0.6 | 2.8 | −8.2 | 5.4 | −9 | 9.2 | −40 | 5090 | 4840 | 230 | 220 | 12 | 14 | 0/72 | 880 |
| 110 | 1300 | 1490 | 0.6 | 2.5 | −8.2 | 5.5 | −9.5 | 9.8 | −40 | 5080 | 4830 | 220 | 220 | 12 | 14 | 0/72 | 860 |
| 111 | 1300 | 1460 | 0.6 | 2 | −8.5 | 5.7 | −9.1 | 9.5 | −39 | 5070 | 4820 | 220 | 210 | 12 | 14 | 0/72 | 880 |
| 112 | 1280 | 1470 | 0.6 | 2.8 | −8 | 5 | −9 | 9.2 | −39 | 5130 | 4870 | 220 | 210 | 12 | 14 | 0/72 | 870 |
| 113 | 1350 | | | | | | | | Unmeasurable due to Insufficient Sintering | | | | | | | | |
| 114 | 1350 | | | | | | | | Unmeasurable due to Insufficient Sintering | | | | | | | | |
| 115 | 1350 | 1450 | 1.4 | 2.2 | −8.9 | 4.8 | −8.7 | 9 | −39 | 5160 | 4900 | 250 | 240 | 11 | 13 | 20/72 | 120 |
| 116 | 1350 | | | | | | | | Unmeasurable due to Insufficient Sintering | | | | | | | | |
| 117 | 1350 | | | | | | | | Unmeasurable due to Insufficient Sintering | | | | | | | | |
| 118 | 1300 | 1450 | 0.6 | 2.3 | −8.8 | 5.3 | −8.9 | 9.2 | −39 | 5200 | 4940 | 240 | 230 | 12 | 14 | 0/72 | 820 |
| 119 | 1350 | 1490 | 1.3 | 1.9 | −8.5 | 4.5 | −8.6 | 8.9 | −40 | 5190 | 4930 | 260 | 250 | 11 | 13 | 11/72 | 190 |
| 120 | 1300 | 1440 | 0.6 | 2.4 | −9.2 | 5 | −9.2 | 9.3 | −37 | 5180 | 4920 | 250 | 240 | 12 | 14 | 0/72 | 860 |
| 121 | 1350 | 1460 | 1.3 | 2.1 | −8.8 | 4.2 | −8.7 | 9 | −37 | 5170 | 4910 | 240 | 230 | 11 | 13 | 22/72 | 120 |
| 122 | 1350 | 1450 | 1.2 | 2.2 | −8.7 | 4.5 | −8.8 | 9.2 | −37 | 5200 | 4940 | 230 | 220 | 11 | 13 | 19/72 | 170 |

As is evident from TABLE 6 and TABLE 7, preferable results are obtained in the samples No. 101 to 112, 118 and 120, in which oxides with compositions within or on the boundary lines of the area surrounded by the straight lines connecting the spots indicated by A (X=20, y=80, z=0), B (X=10, y=80, z=10), C (X=10, y=70, z=20), D(X=35, y=45, z=20), E (X=45, y=45, z=10) and F (X=45, y=55, z=10) in the three component phase diagram of the oxides represented by $Li_2O$—$(Si_w, Ti_{1-w})O_2$–MO shown in FIG. 4 are added, wherein the samples have a capacitance decreasing ratio of as small as within −45% at an impressed voltage of 5 kV/mm and a dielectric loss of 1.0% or less, along with a rate of change of the electrostatic capacitance against temperature changes satisfying the B-level characteristic standard stipulated in the JIS Standard in the temperature range of −25° C. to +85° C. and X7R-level characteristic standard stipulated in the EIA standard in the temperature range of −55° C. to +125° C.

The insulation resistance represented by the product CR at 25° C. and 150° C. shows values as high as 5000 Ω•F or more and 200 Ω•F or more, respectively, when the capacitor used under a electric field strength of 10 kV/mmn. The insulation breakdown voltages are as high as 12 kV/mm or more under AC voltage and 14 kV/mm or more under a DC voltage. The mean life span is as long as 800 hours or more in the acceleration test at 150° C. and DC 25 kV/mm while using a relatively low firing temperature of 1300° C. or less.

On the contrary, when the $Li_2O$—$(Si_w, Ti_{1-w})O_2$—MO oxide is outside of the composition range described above, the sintering becomes insufficient or many samples are rejected in the humidity resistance load test even after sintering, as seen in the samples No. 113 to 117 and 119. With the samples with the composition falling on the line A-F and w=1.0 (samples No. 119 and 121) the sintering temperature becomes high along and there are many rejects in the humidity resistance load test. When the value of w is less than about 0.30 as shown in the sample No. 122, the sintering temperature becomes high along with having many rejects in the humidity resistance load test.

Example 3

A starting material $BaO_{1.010}$•$TiO_2$+$0.010Y_2O_3$+$0.01Eu_2O_3$+$0.01Gd_2O_3$+$0.01BaZrO_3$+$0.05MgO$+$0.01MnO$ (mole ratio) was prepared using barium titanate A of TABLE 1 as a dielectric powder, in which oxides represented by $SiO_2$—$TiO_2$—XO with a mean particle size of 1 μm or less shown in TABLE 8 prepared by heating at 1200 to 1500° C. was added as a second side component. A monolithic ceramic capacitor was produced by the same method as in Example 1, except that the starting material as described above was used. The amounts of addition of $Al_2O_3$ and $ZrO_2$ correspond to the amounts of addition relative to 100 parts by weight of the second side component ($xSiO_2$—$yTiO_2$—$zXO$). The overall dimensions of the monolithic capacitor produced is the same as in Example 1.

Then, the electric characteristics were measured as in Example 1. The results are shown in TABLE 9.

TABLE 8

| | | The second side component | | | | | | | | | | |
|---|---|---|---|---|---|---|---|---|---|---|---|---|
| | Amount of | Essential component (mole %) | | | | | | | | | Added component (Parts by weight) | |
| Sample | addition (parts | | | | | XO | | | | | | |
| No. | by weight) | $SiO_2$ | $TiO_2$ | BaO | CaO | SrO | MgO | ZnO | MnO | Total | $Al_2O_3$ | $ZrO_2$ |
| 201 | 1 | 85 | 1 | 1 | 0 | 0 | 0 | 4 | 9 | 14 | 0 | 0 |
| 202 | 1 | 35 | 51 | 0 | 10 | 0 | 0 | 0 | 4 | 14 | 0 | 0 |
| 203 | 1 | 30 | 20 | 0 | 30 | 0 | 15 | 4 | 1 | 50 | 0 | 0 |
| 204 | 1 | 39 | 1 | 20 | 20 | 2 | 0 | 13 | 5 | 60 | 0 | 0 |
| 205 | 1 | 70 | 10 | 5 | 5 | 0 | 0 | 10 | 0 | 20 | 0 | 0 |
| 206 | 1 | 45 | 10 | 0 | 0 | 0 | 0 | 15 | 30 | 45 | 0 | 0 |
| 207 | 1 | 50 | 20 | 10 | 10 | 3 | 7 | 0 | 0 | 30 | 0 | 0 |
| 208 | 1 | 50 | 30 | 0 | 16 | 0 | 0 | 0 | 4 | 20 | 0 | 0 |
| 209 | 1 | 35 | 30 | 25 | 10 | 0 | 0 | 0 | 0 | 35 | 0 | 0 |
| 210 | 1 | 40 | 40 | 10 | 0 | 0 | 0 | 5 | 5 | 20 | 0 | 0 |
| 211 | 1 | 45 | 22 | 3 | 30 | 0 | 0 | 0 | 0 | 33 | 15 | 0 |
| 212 | 1 | 45 | 22 | 3 | 30 | 0 | 0 | 0 | 0 | 33 | 10 | 5 |
| 213 | 1 | 65 | 25 | 5 | 5 | 0 | 0 | 0 | 0 | 10 | 0 | 0 |
| 214 | 1 | 25 | 40 | 15 | 0 | 10 | 0 | 5 | 5 | 35 | 0 | 0 |
| 215 | 1 | 30 | 10 | 30 | 25 | 0 | 0 | 5 | 0 | 60 | 0 | 0 |
| 216 | 1 | 50 | 0 | 35 | 15 | 0 | 0 | 0 | 0 | 50 | 0 | 0 |
| 217 | 1 | 45 | 22 | 30 | 0 | 0 | 3 | 0 | 0 | 33 | 25 | 0 |
| 218 | 1 | 45 | 22 | 30 | 0 | 3 | 0 | 0 | 0 | 33 | 0 | 15 |
| 219 | 1 | 30 | 60 | 10 | 0 | 0 | 0 | 0 | 0 | 10 | 0 | 0 |

TABLE 9

| Sample No. | Baking Temp. (° C.) | Dielectric Constant | Dielectric Loss tan δ (%) | Ratio of Temperature Dependent Capacitor Change (%) ΔC/C₂₀ -25° C. | 85° C. | ΔC/C₂₅ -55° C. | 125° C. | Maximum value | DC vias characteristic (%) ΔC/C 5 kV/mm | Product CR (Ω · F) 315 V Impressed Voltage 25° C. | 945 V Impressed Voltage 25° C. | 315 V Impressed Voltage 150° C. | 945 V Impressed Voltage 150° C. | Insulation breakdown voltage (kV/mm) AC | DC | Humidity Resistance Load Test: Number of reject | Mean Life Span (h) |
|---|---|---|---|---|---|---|---|---|---|---|---|---|---|---|---|---|---|
| 201 | 1300 | 1460 | 0.6 | 3.2 | -8.2 | 6.8 | -7.9 | 8.5 | -39 | 5080 | 4830 | 220 | 210 | 12 | 14 | 0/72 | 840 |
| 202 | 1280 | 1490 | 0.6 | 3.5 | -8.4 | 7 | -8.1 | 8.6 | -40 | 5080 | 4830 | 230 | 220 | 12 | 14 | 0/72 | 800 |
| 203 | 1280 | 1470 | 0.6 | 4 | -8.6 | 7.2 | -8.3 | 8.7 | -39 | 5120 | 4860 | 220 | 210 | 12 | 14 | 0/72 | 920 |
| 204 | 1300 | 1450 | 0.6 | 3.8 | -8.5 | 6.9 | -8.2 | 8.6 | -39 | 5150 | 4890 | 240 | 230 | 12 | 14 | 0/72 | 860 |
| 205 | 1300 | 1460 | 0.6 | 3.9 | -8.5 | 7.1 | -8.2 | 8.8 | -39 | 5070 | 4820 | 220 | 210 | 12 | 14 | 0/72 | 820 |
| 206 | 1280 | 1430 | 0.6 | 3.7 | -8.5 | 6.8 | -8.3 | 8.7 | -38 | 5080 | 4820 | 220 | 220 | 13 | 15 | 0/72 | 90 |
| 207 | 1280 | 1450 | 0.6 | 3.5 | -8.4 | 7 | -8.1 | 8.7 | -39 | 5030 | 4780 | 230 | 220 | 12 | 14 | 0/72 | 890 |
| 208 | 1300 | 1470 | 0.6 | 3.1 | -8 | 6.7 | -7.9 | 8.3 | -39 | 5040 | 4790 | 200 | 190 | 12 | 14 | 0/72 | 930 |
| 209 | 1300 | 1460 | 0.6 | 3.5 | -8.4 | 6.9 | -8 | 8.7 | -39 | 5080 | 4830 | 220 | 210 | 12 | 14 | 0/72 | 830 |
| 210 | 1280 | 1450 | 0.6 | 3.9 | -8.6 | 7.2 | -8.2 | 8.8 | -39 | 5100 | 4850 | 210 | 200 | 12 | 14 | 0/72 | 860 |
| 211 | 1300 | 1430 | 0.6 | 4 | -8.7 | 7.3 | -8.5 | 8.9 | -38 | 5410 | 5140 | 300 | 290 | 12 | 14 | 0/72 | 870 |
| 212 | 1350 | 1440 | 0.6 | 3.8 | -8.4 | 6.9 | -8 | 8.7 | -39 | 5420 | 5150 | 310 | 300 | 12 | 14 | 0/72 | 880 |
| 213 | 1350 | 1420 | 1.2 | 3.1 | -8.1 | 6.6 | -7.6 | 8.3 | -38 | 5120 | 4860 | 230 | 220 | 11 | 13 | 38/72 | 150 |
| 214 | 1350 | | | | | | | Unmeasurable due to insufficient sintering | | | | | | | | | |
| 215 | 1350 | | | | | | | Unmeasurable due to insufficient sintering | | | | | | | | | |
| 216 | 1350 | 1420 | 1.3 | 3.3 | -8.2 | 6.8 | -7.8 | 8.5 | -38 | 5030 | 4780 | 220 | 210 | 11 | 13 | 70/72 | 120 |
| 217 | 1350 | | | | | | | Unmeasurable due to insufficient sintering | | | | | | | | | |
| 218 | 1350 | | | | | | | Unmeasurable due to insufficient sintering | | | | | | | | | |
| 219 | 1350 | | | | | | | Unmeasurable due to insufficient sintering | | | | | | | | | |

Figure 5:
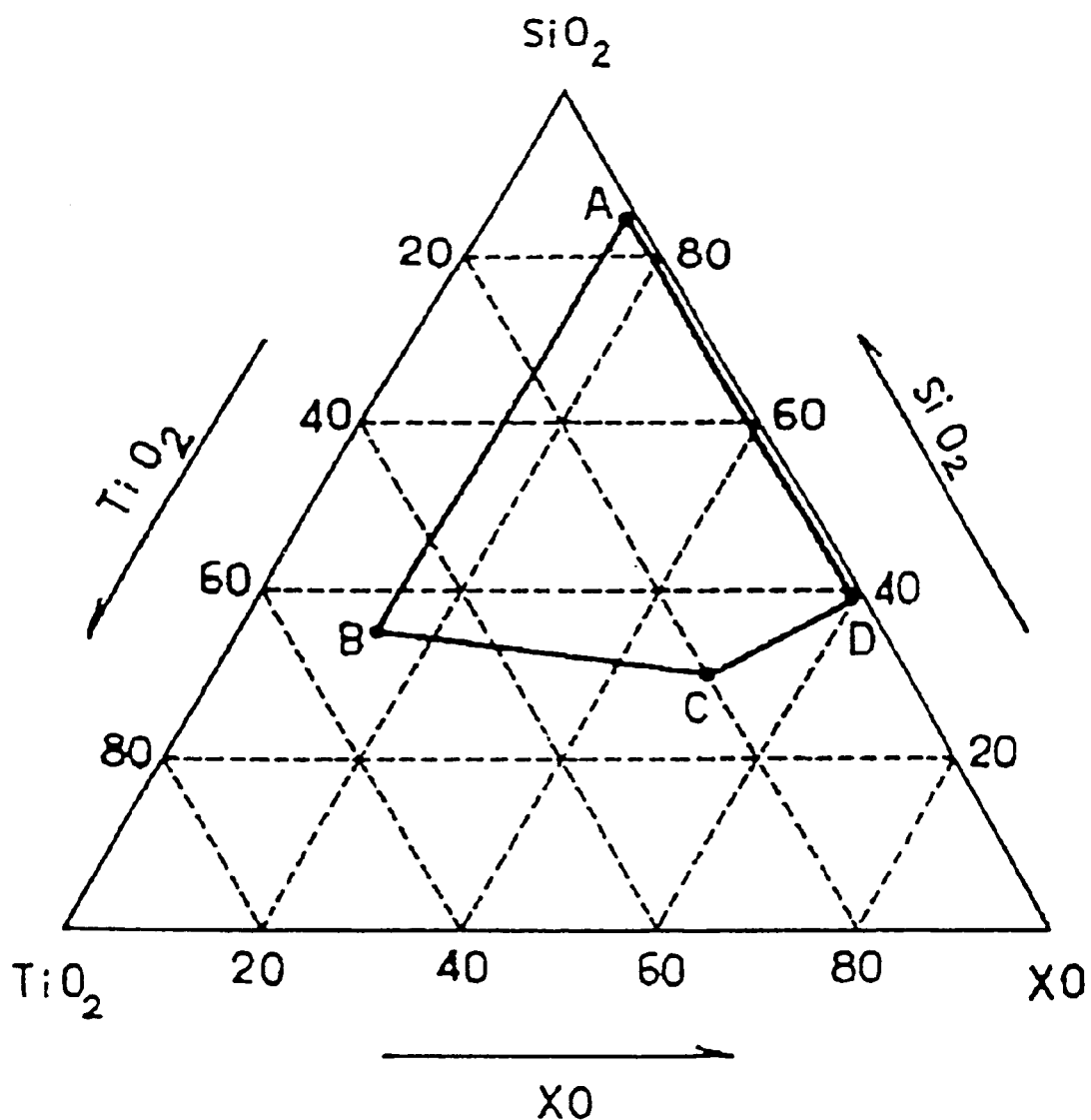
FIG. 5 is a three component phase diagram of $SiO_2 - TiO_2 - XO$ oxides.

As is evident from TABLE 8 and TABLE 9, preferable results are obtained in samples No. 201 to 212 in which oxides with compositions within or on the boundary lines of the area surrounded by the straight lines connecting the spots indicated by A (x=85, y=1, z=14), B (x=35, y=51, z=14), C (x=30, y=20, z=50) and D (x=39, y=1, z=60), wherein x, y and z represent mole %, in the three component phase diagram of the $SiO_2$—$TiO_2$—XO oxides shown in FIG. 5 are added, wherein the samples have a capacitance decreasing ratio of as small as within −45% at an impressed voltage of 5 kV/mm and a dielectric loss of 1.0% or less, along with the rate of change of the electrostatic capacitance against temperature changes satisfying the B-level characteristic standard stipulated in the JIS Standard in the temperature range of −25° C. to +85° C. and X7R-level characteristic standard stipulated in the EIA standard in the temperature range of −55° C. to +125° C.

When the capacitor is used under a high electric field strength of 10 kV/mm, the insulation resistance represented by the product CR at 25° C. and 150° C. show a high value of 5000 Ω•F or more and 200 Ω•F or more, respectively. The insulation breakdown voltage also shows high values of 12 kV/mm or more under the AC voltage and 14 kV/mm or more under the DC voltage. The mean life span in the acceleration test at 150° C. and DC 25 l(V/mn is as long as 800 hours along with being free from rejects in the humidity resistance load test and it was possible to sinter the material at a relatively low sintering temperature of 1300° C.

In other $SiO_2$—$TiO_2$—XO oxides, on the other hand, sintering becomes insufficient as in samples No. 213 to 219 or rejects occurred in the humidity resistance load test even after sintering.

Although a monolithic capacitor having 5400 Ω•F or more and 300 Ω•F or more of the insulation resistances at 25° C. and 150° C., respectively, under the electric field strength of 10 kV/mm were obtained, the sintering property is extremely deteriorated when the amounts of addition of $Al_2O_3$ and $ZrO_2$ exceed about 15 parts by weight and about 5 parts by weight, respectively.

Example 4

The four kinds of barium titanate ($BaTiO_3$) in TABLE 1, an oxide powder as a first side component and an oxide powder as a second side component were obtained by the same method as in Example 1.

Next, $BaCO_3$ for adjusting the Ba/Ti mole ratio m of barium titanate, and $Sc_2O_3$, $Y_2O_3$, $Eu_2O_3$, $Gd_2O_3$, $Tb_2O_3$ and $Dy_2O_3$, $BaZrO_3$ and MnO, each having a purity of 99% or more, were prepared. These raw material powders and the foregoing oxide powder as one of the side component of either the first or the second component were weighed to be the compositions shown in TABLE 10 and TABLE 11. The amounts of addition of the first and second side components correspond to the amount of addition relative to 100 parts by weight of the essential component $(BaO)_m TiO_2 + \alpha M_2 O_3 + \beta R_2 O_3 + (BaZrO_3 + gMnO)$. A monolithic ceramic capacitor was produced using this weighed materials by the same method as in Example 1. Overall dimensions of the monolithic ceramic capacitor produced is the same as in Example 1.

The electric characteristics were measured by the same method as in Example 1. The results are shown in TABLE 12 and TABLE 13.

TABLE 10

| Sample No. | Kind of BaTiO₃ | $(BaO)_m TiO_2 + \alpha M_2O_3 + \beta R_2O_3 + \gamma BaZrO_3 + gMnO$ | | | | | | | | | | | The amount of addition of the first side component (parts by weight) | The amount of addition of the second side component (parts by weight) |
|---|---|---|---|---|---|---|---|---|---|---|---|---|---|---|
| | | α | | | β | | | | | | | | | |
| | | Sc₂O₃ | Y₂O₃ | Total of α | Eu₂O₃ | Gd₂O₃ | Tb₂O₃ | Dy₂O₃ | Total of β | α+β | γ | g | m | | |
| *301 | A | 0 | 0.0007 | 0.0007 | 0.04 | 0 | 0 | 0 | 0.04 | 0.0407 | 0.03 | 0.09 | 0.01 | 1.5 | 0 |
| *302 | A | 0.05 | 0.02 | 0.07 | 0 | 0.001 | 0 | 0 | 0.002 | 0.072 | 0.02 | 0.14 | 1.005 | 1.2 | 0 |
| *303 | A | 0.02 | 0 | 0.02 | 0 | 0 | 0 | 0.0008 | 0.0008 | 0.0208 | 0.03 | 0.04 | 1.015 | 1 | 0 |
| *304 | A | 0 | 0.001 | 0.001 | 0.04 | 0 | 0.03 | 0 | 0.07 | 0.071 | 0.04 | 0.14 | 1.005 | 1 | 0 |
| *305 | A | 0 | 0.04 | 0.04 | 0 | 0.02 | 0.02 | 0 | 0.04 | 0.08 | 0.03 | 0.16 | 1.005 | 1 | 0 |
| *306 | A | 0 | 0 | 0.01 | 0.01 | 0 | 0.02 | 0 | 0.03 | 0.04 | 0 | 0.08 | 1.01 | 1.5 | 0 |
| *307 | A | 0.01 | 0 | 0.01 | 0 | 0.02 | 0 | 0 | 0.02 | 0.03 | 0.08 | 0.06 | 1.01 | 1.5 | 0 |
| *308 | A | 0.01 | 0.01 | 0.02 | 0 | 0 | 0 | 0.02 | 0.01 | 0.04 | 0.01 | 0.001 | 1.005 | 1 | 0 |
| *309 | A | 0 | 0.01 | 0.01 | 0.01 | 0 | 0 | 0 | 0.02 | 0.02 | 0.02 | 0.14 | 1.01 | 1 | 0 |
| *310 | A | 0.01 | 0 | 0.01 | 0 | 0.01 | 0.01 | 0.01 | 0.02 | 0.03 | 0.03 | 0.06 | 0.99 | 1.2 | 0 |
| *311 | A | 0 | 0.02 | 0.02 | 0 | 0.03 | 0 | 0.01 | 0.03 | 0.05 | 0.03 | 0.1 | 1.00 | 1 | 0 |
| *312 | A | 0.005 | 0.005 | 0.01 | 0 | 0 | 0 | 0.03 | 0.03 | 0.04 | 0.04 | 0.08 | 1.038 | 1 | 0 |
| *313 | A | 0 | 0.01 | 0.01 | 0 | 0.01 | 0 | 0 | 0.03 | 0.04 | 0.03 | 0.08 | 1.05 | 1 | 0 |
| *314 | A | 0.02 | 0 | 0.02 | 0.01 | 0 | 0 | 0.02 | 0.03 | 0.04 | 0.03 | 0.09 | 1.005 | 0 | 2 |
| *315 | A | 0 | 0.01 | 0.01 | 0.01 | 0 | 0.01 | 0.01 | 0.02 | 0.04 | 0.02 | 0.08 | 1.01 | 5 | 0 |
| *316 | A | 0.01 | 0 | 0.01 | 0 | 0 | 0 | 0.02 | 0.03 | 0.04 | 0.03 | 0.06 | 1.01 | 0 | 4 |
| *317 | A | 0.02 | 0 | 0.02 | 0.02 | 0 | 0 | 0.01 | 0.02 | 0.04 | 0.03 | 0.08 | 1.015 | 2.5 | 0 |
| *318 | D | 0.01 | 0 | 0.01 | 0 | 0.01 | 0.01 | 0.03 | 0.03 | 0.04 | 0.02 | 0.08 | 1.01 | 1 | 0 |
| 319 | A | 0 | 0.001 | 0.001 | 0.01 | 0 | 0 | 0 | 0.01 | 0.031 | 0.03 | 0.06 | 1.015 | 1 | 0 |
| 320 | B | 0 | 0.02 | 0.02 | 0 | 0 | 0.02 | 0.01 | 0.03 | 0.03 | 0.02 | 0.06 | 1.01 | 1 | 0 |
| 321 | C | 0.01 | 0.01 | 0.02 | 0.01 | 0 | 0 | 0 | 0.01 | 0.05 | 0.03 | 0.11 | 1.01 | 1 | 0 |
| 322 | A | 0.01 | 0.03 | 0.04 | 0 | 0 | 0 | 0.01 | 0.01 | 0.05 | 0.02 | 0.1 | 1.005 | 1 | 0 |

TABLE 11

| Sample No. | Kind of BaTiO₃ | $\alpha$ | | | $\beta$ | | | | | $\alpha+\beta$ | $\gamma$ | g | m | The amount of addition of the first component (parts by weight) | The amount of addition of the second side component (parts by weight) |
|---|---|---|---|---|---|---|---|---|---|---|---|---|---|---|---|
| | | Sc₂O₃ | Y₂O₃ | Total of α | Eu₂O₃ | Gd₂O₃ | Tb₂O₃ | Dy₂O₃ | Total of β | | | | | | |
| 323 | A | 0 | 0.05 | 0.05 | 0.01 | 0 | 0 | 0 | 0.01 | 0.06 | 0.03 | 0.13 | 1.01 | 0 | 1 |
| 324 | A | 0.02 | 0.01 | 0.03 | 0 | 0.001 | 0 | 0 | 0.001 | 0.031 | 0.02 | 0.06 | 1.005 | 1 | 0 |
| 325 | A | 0.02 | 0 | 0.02 | 0 | 0 | 0 | 0.02 | 0.02 | 0.04 | 0.03 | 0.08 | 1.01 | 1.1 | 0 |
| 326 | A | 0 | 0.01 | 0.01 | 0.01 | 0 | 0.02 | 0 | 0.03 | 0.04 | 0.02 | 0.08 | 1.01 | 0 | 1 |
| 327 | A | 0.01 | 0 | 0.01 | 0 | 0 | 0.01 | 0.02 | 0.03 | 0.04 | 0.03 | 0.08 | 1.01 | 0 | 2 |
| 328 | A | 0.01 | 0 | 0.01 | 0.03 | 0.02 | 0 | 0 | 0.05 | 0.06 | 0.02 | 0.12 | 1.01 | 0 | 0 |
| 329 | A | 0.01 | 0.01 | 0.02 | 0.02 | 0 | 0 | 0 | 0.02 | 0.04 | 0.02 | 0.08 | 1.01 | 1 | 0 |
| 330 | A | 0.01 | 0.02 | 0.03 | 0 | 0.01 | 0.01 | 0 | 0.02 | 0.05 | 0.005 | 0.1 | 1.005 | 1 | 0 |
| 331 | A | 0.01 | 0 | 0.01 | 0 | 0.01 | 0 | 0.02 | 0.03 | 0.04 | 0.03 | 0.08 | 1.01 | 1 | 0 |
| 332 | A | 0.01 | 0.01 | 0.02 | 0 | 0.02 | 0.01 | 0 | 0.03 | 0.05 | 0.06 | 0.1 | 1.01 | 1 | 0 |
| 333 | A | 0.02 | 0 | 0.02 | 0.01 | 0 | 0 | 0.01 | 0.02 | 0.04 | 0.02 | 0.08 | 1.01 | 1 | 0 |
| 334 | A | 0 | 0.02 | 0.02 | 0.02 | 0 | 0 | 0 | 0.02 | 0.04 | 0.03 | 0.08 | 1.005 | 1 | 0 |
| 335 | A | 0.01 | 0.02 | 0.03 | 0 | 0 | 0.01 | 0 | 0.01 | 0.04 | 0.03 | 0.09 | 1.01 | 2 | 0 |
| 336 | A | 0.01 | 0.01 | 0.02 | 0.01 | 0 | 0 | 0.01 | 0.02 | 0.04 | 0.03 | 0.08 | 1.01 | 2 | 0 |
| 337 | A | 0.01 | 0.01 | 0.02 | 0.02 | 0.01 | 0 | 0 | 0.03 | 0.05 | 0.02 | 0.1 | 1.005 | 2 | 0 |
| 338 | A | 0.005 | 0 | 0.005 | 0 | 0 | 0.005 | 0 | 0.005 | 0.01 | 0.03 | 0.02 | 1.001 | 2 | 0 |
| 339 | A | 0.01 | 0.01 | 0.02 | 0 | 0 | 0.01 | 0.01 | 0.02 | 0.04 | 0.02 | 0.08 | 1.01 | 0 | 1.5 |
| 340 | A | 0.03 | 0 | 0.03 | 0 | 0.02 | 0 | 0 | 0.02 | 0.05 | 0.03 | 0.1 | 1.035 | 2 | 0 |
| 341 | A | 0 | 0.02 | 0.02 | 0 | 0 | 0.01 | 0.01 | 0.02 | 0.04 | 0.02 | 0.08 | 1.01 | 0.2 | 0 |
| 342 | A | 0.01 | 0.01 | 0.02 | 0 | 0.01 | 0 | 0 | 0.01 | 0.03 | 0.03 | 0.06 | 1.01 | 3 | 0 |
| 343 | A | 0.01 | 0.01 | 0.02 | 0.02 | 0 | 0.01 | 0 | 0.03 | 0.05 | 0.03 | 0.1 | 1.01 | 0 | 0.2 |
| 344 | A | 0.02 | 0.01 | 0.03 | 0 | 0.03 | 0 | 0 | 0.03 | 0.06 | 0.02 | 0.13 | 1.005 | 0 | 3 |

(BaO)ₘTiO₂ + αM₂O₃ + βR₂O₃ + γBaZrO₃ + gMnO

TABLE 12

| Sample No. | Baking Temp. (°C) | Dielectric Constant | Dielectric Loss tan δ (%) | Ratio of Temperature Dependent Capacitance Change (%) ΔC/C₂₀ -25°C | 85°C | ΔC/C₂₅ -55°C | 125°C | Maximum value | DC vias characteristic (%) ΔC/C 5 kV/mm | Product CR (Ω·F) 315 V Impressed Voltage 25°C | 945 V Impressed Voltage 25°C | 315 V Impressed Voltage 150°C | 945 V Impressed Voltage 150°C | Insulation breakdown voltage (kV/mm) AC | DC | Humidity Resistance Load Test: Number of reject | Mean Life Span (h) |
|---|---|---|---|---|---|---|---|---|---|---|---|---|---|---|---|---|---|
| *301 | 1300 | 1220 | 0.6 | 5.3 | -12.5 | 6.5 | -17.5 | 17.5 | -18 | 5000 | 4750 | 210 | 200 | 13 | 14 | 0/72 | 980 |
| *302 | 1300 | 820 | 0.7 | 2.5 | -7.2 | 5 | -7.5 | 7.6 | -5 | 5110 | 4860 | 220 | 210 | 12 | 14 | 0/72 | 950 |
| *303 | 1300 | 1450 | 0.6 | 3.2 | -7.1 | 5.2 | -7.6 | 8 | -38 | 2900 | 2760 | 130 | 120 | 13 | 14 | 0/72 | 900 |
| *304 | 1300 | 800 | 0.7 | 6.4 | -13.5 | 7.6 | -19.5 | 19.5 | -7 | 4920 | 4670 | 230 | 220 | 12 | 14 | 0/72 | 100 |
| *305 | 1280 | 710 | 2.2 | 3 | -6.5 | 5 | -7.3 | 7.5 | -6 | 5030 | 4780 | 240 | 230 | 12 | 14 | 15/72 | 150 |
| *306 | 1280 | 1220 | 0.6 | 2.2 | -7.5 | 4 | -8.4 | 8.6 | -22 | 2850 | 2000 | 110 | 80 | 12 | 14 | 0/72 | 900 |
| *307 | 1300 | 1340 | 0.7 | 2.5 | -13.5 | 5 | -31.5 | 31.5 | -32 | 5110 | 4860 | 250 | 240 | 12 | 14 | 0/72 | 130 |
| *308 | | | | | | | | | Unmeasurable due to semiconductor formation | | | | | | | | |
| *309 | 1280 | 1460 | 0.7 | 3.3 | -7.5 | 5.5 | -18.5 | 18.5 | -37 | 2940 | 2790 | 160 | 150 | 12 | 14 | 0/72 | 110 |
| *310 | | | | | | | | | Unmeasurable due to semiconductor formation | | | | | | | | |
| *311 | 1300 | 1160 | 0.7 | 4 | -7.6 | 5.6 | -8 | 8.3 | -20 | 3080 | 2930 | 170 | 160 | 10 | 11 | 0/72 | 100 |
| *312 | | | | | | | | | Unmeasurable due to insufficient sintering | | | | | | | | |
| *313 | | | | | | | | | Unmeasurable due to insufficient sintering | | | | | | | | |
| *314 | | | | | | | | | Unmeasurable due to insufficient sintering | | | | | | | | |
| *315 | 1300 | 1240 | 2.7 | 4 | -7.4 | 5.8 | -7.7 | 8.3 | -22 | 3100 | 2950 | 160 | 150 | 10 | 12 | 0/72 | 130 |
| *316 | | | | | | | | | Unmeasurable due to insufficient sintering | | | | | | | | |
| *317 | 1300 | 1260 | 2.8 | 2.3 | -8.3 | 5 | -8.5 | 8.8 | -22 | 3110 | 2960 | 170 | 160 | 11 | 12 | 0/72 | 100 |
| *318 | 1300 | 1250 | 0.7 | 2.5 | -8.1 | 7.2 | -8.2 | 8.8 | -21 | 5050 | 4800 | 240 | 230 | 13 | 14 | 0/72 | 880 |
| 319 | 1280 | 1380 | 0.7 | 5.5 | -6.6 | 7 | -7.1 | 8.1 | -35 | 5000 | 4750 | 240 | 230 | 12 | 15 | 0/72 | 960 |
| 320 | 1280 | 1360 | 0.6 | 1.7 | -7.3 | 7.5 | -8 | 8.2 | -35 | 4990 | 4740 | 230 | 220 | 12 | 14 | 0/72 | 940 |
| 321 | 1280 | 1130 | 0.6 | 2 | -8.1 | 4 | -8.5 | 8.6 | -18 | 5170 | 4910 | 250 | 240 | 12 | 15 | 0/72 | 970 |
| 322 | 1300 | 1130 | 0.6 | 2.2 | -8.3 | 4.5 | -8.5 | 8.7 | -18 | 5090 | 4840 | 230 | 220 | 12 | 14 | 0/72 | 900 |

TABLE 13

| Sample No. | Baking Temp. (°C.) | Dielectric Constant | Dielectric Loss tan δ (%) | Ratio of Temperature Dependent Capacitance Change (%) ΔC/C₂₀ -25°C. | ΔC/C₂₀ 85°C. | ΔC/C₇₅ -55°C. | ΔC/C₇₅ 125°C. | Maximum value | DC vias characteristic (%) ΔC/C 5 kV/mm | Product CR (Ω·F) 315 V Impressed Voltage 25°C. | 945 V Impressed Voltage 25°C. | 315 V Impressed Voltage 150°C. | 945 V Impressed Voltage 150°C. | Insulation breakdown voltage (kV/mm) AC | DC | Humidity Resistance Load Test: Number of reject | Mean Life Span (h) |
|---|---|---|---|---|---|---|---|---|---|---|---|---|---|---|---|---|---|
| 323 | 1300 | 940 | 0.7 | 2.3 | -8.2 | 5 | -8.5 | 8.8 | -11 | 5000 | 4750 | 210 | 200 | 12 | 15 | 0/72 | 930 |
| 324 | 1300 | 1320 | 0.6 | 2.1 | -7.5 | 5.5 | -8 | 8.2 | -32 | 5120 | 4860 | 250 | 240 | 12 | 14 | 0/72 | 850 |
| 325 | 1300 | 1230 | 0.6 | 3.3 | -7.5 | 6 | -8.4 | 8.4 | -23 | 5170 | 4910 | 250 | 240 | 12 | 14 | 0/72 | 870 |
| 326 | 1280 | 1280 | 0.6 | 3 | -7.8 | 5.5 | -8.3 | 8.5 | -24 | 5080 | 4830 | 250 | 240 | 13 | 14 | 0/72 | 890 |
| 327 | 1280 | 1240 | 0.7 | 2.5 | -7.8 | 5.1 | -8.2 | 8.8 | -19 | 5120 | 4860 | 250 | 240 | 12 | 15 | 0/72 | 900 |
| 328 | 1300 | 930 | 0.6 | 2.5 | -8.1 | 6 | -8.5 | 8.7 | -11 | 5100 | 4850 | 250 | 240 | 13 | 14 | 0/72 | 960 |
| 329 | 1300 | 1250 | 0.6 | 2.3 | -8.3 | 5.2 | -7.9 | 8.8 | -22 | 5010 | 4760 | 220 | 210 | 12 | 14 | 0/72 | 990 |
| 330 | 1300 | 1110 | 0.7 | 3 | -7.5 | 5 | -8 | 8.5 | -17 | 5000 | 4750 | 220 | 210 | 12 | 14 | 0/72 | 900 |
| 331 | 1280 | 1260 | 0.6 | 2 | -7.7 | 5.1 | -8.2 | 7.9 | -21 | 4980 | 4730 | 220 | 210 | 12 | 15 | 0/72 | 880 |
| 332 | 1280 | 1160 | 0.6 | 2.4 | -8 | 5 | -8.1 | 8.1 | -21 | 5090 | 4840 | 250 | 240 | 12 | 14 | 0/72 | 820 |
| 333 | 1300 | 1220 | 0.7 | 3 | -7.4 | 6.2 | -8 | 8 | -23 | 4920 | 4670 | 220 | 210 | 12 | 14 | 0/72 | 870 |
| 334 | 1300 | 1240 | 0.7 | 2.1 | -7.5 | 6 | -8.5 | 8.1 | -21 | 5000 | 4750 | 200 | 190 | 12 | 14 | 0/72 | 900 |
| 335 | 1300 | 1250 | 0.6 | 1.9 | -7.7 | 5.4 | -8.3 | 8.5 | -22 | 5010 | 4760 | 200 | 190 | 13 | 14 | 0/72 | 920 |
| 336 | 1280 | 1260 | 0.7 | 2.6 | -7.6 | 5.8 | -7.9 | 8.2 | -22 | 5110 | 4860 | 250 | 240 | 13 | 14 | 0/72 | 880 |
| 337 | 1280 | 1150 | 0.6 | 2.3 | -7.8 | 6.2 | -8.5 | 8.8 | -18 | 5100 | 4850 | 250 | 240 | 12 | 14 | 0/72 | 960 |
| 338 | 1280 | 1520 | 0.6 | 2 | -8.3 | 6.1 | -8.1 | 8.2 | -40 | 5080 | 4830 | 250 | 240 | 12 | 14 | 0/72 | 900 |
| 339 | 1300 | 1260 | 0.6 | 2.4 | -7.5 | 6.2 | -7.5 | 8.3 | -23 | 4990 | 4740 | 200 | 190 | 12 | 14 | 0/72 | 950 |
| 340 | 1300 | 1110 | 0.7 | 2 | -7.4 | 6 | -7.9 | 8.1 | -17 | 5120 | 4860 | 250 | 240 | 12 | 14 | 0/72 | 940 |
| 341 | 1300 | 1270 | 0.6 | 2.6 | -7.6 | 5.8 | -8.5 | 8.5 | -25 | 5100 | 4850 | 250 | 240 | 12 | 14 | 0/72 | 900 |
| 342 | 1300 | 1350 | 0.7 | 2.4 | -7.9 | 7 | -8.4 | 8.5 | -33 | 5140 | 4880 | 250 | 240 | 12 | 14 | 0/72 | 920 |
| 343 | 1280 | 1130 | 0.7 | 2.2 | -7.8 | 6.4 | -8.3 | 8.5 | -18 | 5190 | 4930 | 250 | 240 | 12 | 14 | 0/72 | 900 |
| 344 | 1300 | 980 | 0.7 | 2 | -7.7 | 6 | -8.5 | 8.8 | -11 | 5100 | 4850 | 240 | 230 | 12 | 14 | 0/72 | 960 |

As is evident from TABLE 10 to TABLE 13, the monolithic capacitor according to the present invention has a capacitance decreasing ratio of as small as within −45% at an impressed voltage of 5 kV/mm and a dielectric loss of 1.0% or less, alone with the rate of change of the electrostatic capacitance against temperature changes satisfying the B-level characteristic standard stipulated in the JIS Standard in the temperature range of −25° C. to +85° C. and X7R-level characteristic standard stipulated in the EIA standard in the temperature range of −55° C. to +125° C.

Moreover, when the capacitor is used under a high electric field strength of 10 kV/mm, the insulation resistance represented by the product CR at 25° C. and 150° C. shows a high value of 4900 Ω·F or more and 200 Ω·F or more, respectively. The insulation breakdown voltage also shows high values of 12 kV/mm or more under the AC voltage and 14 kV/mm under the DC voltage. The mean life span in the acceleration test at 150° C. and DC 25 kV/mm is as long as 800 hours along it being possible to conduct sintering at a relatively low sintering temperature of 1300° C.

The reason why the composition was limited in the present invention will be described hereinafter.

In the composition of $(BaO)_m TiO_2 + \alpha M_2O_3 + \beta R_2O_3 + \gamma BaZrO_3 + gMnO$ (wherein $M_2O_3$ represents at least one of $Sc_2O_3$ or $Y_2O_3$ and $R_2O_3$ represents at least one of $Eu_2O_3$, $Gd_2O_3$, $Tb_2O_3$ and $Dy_2O_3$, $\alpha$, $\beta$, $\gamma$ and g representing mole ratio, respectively), a $M_2O_3$ content $\alpha$ of less than about 0.001 as shown in the sample No. 301 is not preferable because the temperature characteristic does not satisfy the B-level/X7R characteristics. On the other hand, the $M_2O_3$ content $\alpha$ of more than about 0.05 as shown in the sample No. 302 is also not preferable because the specific dielectric constant is reduced to less than 900. Accordingly, the preferable range of the $M_2O_3$ content $\alpha$ is $0.001 \leq \alpha \leq 0.05$.

It is not preferable that the $R_2O_3$ content $\beta$ of less than about 0.001 as in the sample No. 303 since the insulation resistance is so low that the product CR becomes small. It is also not preferable that the $R_2O_3$ content $\beta$ is more than about 0.05 as in the sample No. 304 because the temperature characteristic does not satisfy the B-level/X7R characteristics, reducing reliability. Accordingly, the preferable range of the $R_2O_3$ content $\beta$ is $0.001 \leq \beta \leq 0.05$.

When the combined amount of $M_2O_3$ and $R_2O_3$ ($\alpha+\beta$) is more than about 0.06 as in the sample No. 305, the dielectric loss is increased up to 2.0% while the mean life span is shortened, being not preferable since the number of rejects in the humidity resistance load test is increased. Accordingly, the combined amount of $M_2O_3$ and $R_2O_3$ ($\alpha+\beta$) is preferably in the range of $\alpha+\beta \leq 0.06$.

It is not preferable that, as seen in the sample No. 306, the $BaZrO_3$ content $\gamma$ is zero since the insulation resistance becomes low while having a larger voltage dependency of the insulation resistance than in the system containing $BaZrO_3$. On the other hand, when $BaZrO_3$ content $\gamma$ exceeds about 0.06 as in the sample No. 307, the temperature characteristic does not satisfy the B-level/X7R characteristics, being not preferable since the mean life span is shortened. Accordingly, the preferable range of the $BaZrO_3$ content $\gamma$ is $0.005 \leq \gamma \leq 0.06$.

It is not preferable that, as seen in the sample No. 308, the MgO content g is about 0.001 since measurements are impossible due to semiconductor formation. On the other hand, it is not preferable that the MgO content g exceeds about 0.13 as seen in the sample No. 309 because the temperature characteristic X7R is not satisfied, the insulating resistance is low and the mean life span becomes short. Accordingly, the preferable range of the MgO content g is $0.001 \leq g \leq 0.13$.

It is not preferable that the $BaO/TiO_2$ ratio m is less than about 1.000 as in the sample No. 310 because measurements are impossible due to formation of semiconductors. It is also not preferable that, as seen in the sample No. 311, the $BaO/TiO_2$ ratio m is about 1.000 since the insulation resistance as well as the AC and DC breakdown voltage becomes low along with shortening the mean life span. It is not preferable, on the other hand, that the $BaO/TiO_2$ ratio m is over about 1.035 as in the samples No. 312 and 313 since measurements becomes impossible due to insufficient sintering. Accordingly, the $BaO/TiO_2$ ratio m in the range of $1.000 < m < 1.035$ is preferable.

It is not preferable that the amount of addition of the first or second side component is zero as in the samples No. 314 and 316 because measurements are impossible due to insufficient sintering. It is not preferable that the amount of addition of the first or second side component exceeds about 3.0 parts by weight as seen in the samples No. 315 and 317, as the dielectric loss exceeds 1.0% and the insulation resistance and insulation breakdown voltage are lowered along with shortening the mean life span. Accordingly, the preferable content of either the first or the second components is 0.2 to 3.0 parts by weight.

The content of the alkali earth metal oxides contained in barium titanate as impurities are below about 0.02% by weight because when the content of the alkali earth metal oxides exceeds about 0.02% by weight as in the sample No. 318, the dielectric constant is decreased.

Example 5

A starting material of the composition of $BaO_{1.010} \cdot TiO_2 + 0.01Y_2O_3 + 0.02Dy_2O_3 + 0.01BaZrO_3 + 0.06MnO$ (mole ratio) was prepared using barium titanate A of TABLE 1 as the dielectric powder, in which oxides represented by $LL_2O$—(Si, Ti)$O_2$—MO with a mean particle size of 1 μm or less shown in TABLE 6 prepared by heating at 1200 to 1500° C. was added as a first side component. A monolithic ceramic capacitor was produced by the same method as in Example 1, except that the starting material as described above was used. The overall dimensions of the monolithic capacitor is the same as in Example 1. The electric characteristics were measured by the same method as in Example 1. The results are shown in TABLE 14. The samples No. 401 to 422 in TABLE 14 correspond to the samples No. 101 to 122 in TABLE 6, respectively, wherein, for example, the side component in the sample No. 101 in TABLE 6 is added to the sample No. 401 in TABLE 14.

TABLE 14

| Sample No. | Baking Temp. (°C.) | Dielectric Constant | Dielectric Loss tan δ (%) | Ratio of Temperature Dependent Capacitance Change (%) ΔC/C₂₀ -25° C. | ΔC/C₂₀ 85° C. | ΔC/C₇₅ -55° C. | ΔC/C₇₅ 125° C. | Maximum value | DC vias characteristic (%) ΔC/C 5 kV/mm | Product CR (Ω·F) 315 V Impressed Voltage 25° C. | 945 V Impressed Voltage 25° C. | 315 V Impressed Voltage 150° C. | 945 V Impressed Voltage 150° C. | Insulation breakdown voltage (kV/mm) AC | Insulation breakdown voltage (kV/mm) DC | Humidity Resistance Load Test: Number of rejection | Mean Life Span (h) |
|---|---|---|---|---|---|---|---|---|---|---|---|---|---|---|---|---|---|
| 401 | 1280 | 1350 | 0.7 | 2.2 | -8.4 | 4.8 | -8.2 | 8.4 | -33 | 4950 | 4700 | 220 | 210 | 13 | 15 | 0/72 | 920 |
| 402 | 1280 | 1380 | 0.6 | 2.1 | -8 | 4.9 | -8.1 | 8.3 | -36 | 4970 | 4720 | 240 | 230 | 12 | 14 | 0/72 | 940 |
| 403 | 1280 | 1360 | 0.6 | 2.7 | -7.9 | 5 | -7.8 | 8.1 | -33 | 4960 | 4710 | 230 | 220 | 13 | 15 | 0/72 | 930 |
| 404 | 1300 | 1310 | 0.6 | 2.1 | -7.7 | 5.1 | -7.9 | 8.3 | -31 | 4990 | 4740 | 250 | 240 | 12 | 14 | 0/72 | 900 |
| 405 | 1300 | 1380 | 0.6 | 2.3 | -7.9 | 4.7 | -8.4 | 8.6 | -36 | 5040 | 4790 | 230 | 230 | 12 | 14 | 0/72 | 870 |
| 406 | 1280 | 1380 | 0.6 | 2 | -7.7 | 4.7 | -8.5 | 8.7 | -36 | 5010 | 4760 | 230 | 230 | 12 | 14 | 0/72 | 950 |
| 407 | 1280 | 1370 | 0.6 | 2 | -7.5 | 5 | -8.5 | 8.8 | -35 | 5140 | 4880 | 250 | 240 | 12 | 14 | 0/72 | 930 |
| 408 | 1280 | 1380 | 0.6 | 2.8 | -8 | 5 | -8.2 | 8.5 | -36 | 5030 | 4780 | 250 | 240 | 12 | 14 | 0/72 | 940 |
| 409 | 1280 | 1380 | 0.6 | 3 | -7.4 | 4.9 | -8.4 | 8.3 | -36 | 4980 | 4730 | 240 | 230 | 12 | 14 | 0/72 | 900 |
| 410 | 1300 | 1350 | 0.6 | 2.4 | -7.6 | 5.1 | -8.5 | 8.7 | -33 | 5000 | 4750 | 240 | 230 | 12 | 14 | 0/72 | 970 |
| 411 | 1300 | 1320 | 0.7 | 2.3 | -7.5 | 5.4 | -8.3 | 8.5 | -32 | 4990 | 4740 | 230 | 220 | 12 | 14 | 0/72 | 920 |
| 412 | 1280 | 1360 | 0.6 | 2.7 | -7.5 | 5.1 | -8.2 | 8.3 | -33 | 5050 | 4800 | 210 | 200 | 12 | 14 | 0/72 | 900 |
| 413 | 1350 | | | | | | | | Unmeasurable due to insufficient sintering | | | | | | | | |
| 414 | 1350 | | | | | | | | Unmeasurable due to insufficient sintering | | | | | | | | |
| 415 | 1350 | 1350 | 1.4 | 2.4 | -7.7 | 5 | -8.5 | 8.6 | -33 | 5040 | 4790 | 240 | 230 | 11 | 13 | 32/72 | |
| 416 | 1350 | | | | | | | | Unmeasurable due to insufficient sintering | | | | | | | | |
| 417 | 1350 | | | | | | | | Unmeasurable due to insufficient sintering | | | | | | | | |
| 418 | 1300 | 1350 | 0.6 | 2.5 | -7.5 | 5.1 | -8.3 | 8.5 | -33 | 5080 | 4830 | 230 | 220 | 12 | 14 | 0/72 | 880 |
| 419 | 1350 | 1370 | 1.3 | 2 | -7.3 | 4.9 | -8.2 | 8.5 | -35 | 5100 | 4850 | 250 | 240 | 11 | 13 | 25/72 | 140 |
| 420 | 1300 | 1350 | 0.7 | 2.4 | -7.8 | 4.7 | -8.5 | 8.7 | -33 | 4960 | 4710 | 260 | 250 | 12 | 14 | 0/72 | 920 |
| 421 | 1350 | 1360 | 1.3 | 2.5 | -8 | 4.3 | -8.3 | 8.5 | -33 | 5070 | 4820 | 250 | 240 | 11 | 13 | 33/72 | 110 |
| 422 | 1350 | 1330 | 1.2 | 2.3 | -8.1 | 4.9 | -8.2 | 8.5 | -32 | 5070 | 4820 | 250 | 240 | 11 | 13 | 28/72 | 150 |

As is evident from TABLE 14, preferable results are obtained in the samples No. 401 to 412, 418 and 420, in which oxides in the samples No. 101 to 112, 118 and 120 in TABLE 6 with compositions within or on the boundary line of the area surrounded by the straight lines connecting the spots indicated by A (x=20, y=80, z=0), B (x=10, y=80, z=10), C (x=10, y=70, z=20), D (x=35, y=45, z=20), E (x=45, y=45, z=10) and F (x=45, y=55, z=0), wherein x, y and z represent mole % and w is mole ratio, in the three component phase diagram of the $Li_2O$—$(Si_w, Ti_{1-w})O_2$—$MO$ oxides shown in FIG. 4 are added, wherein the samples have a capacitance decreasing ratio of as small as within −40% at an impressed voltage of 5 kV/mm and a dielectric loss of 1.0% or less, along with the rate of change of the electrostatic capacitance against temperature changes satisfying the B-level characteristic standard stipulated in the JIS Standard in the temperature range of −25° C. to +85° C. and X7R-level characteristic standard stipulated in the EIA standard in the temperature range of −55° C. to +125° C.

When the capacitor is used under a high electric field strength of 10 kV/mm, the insulation resistance represented by the product CR at 25° C. and 150° C. show a high value of 4900 Ω•F or more and 200 Ω•F or more, respectively. The insulation breakdown voltage also shows high values of 12 kV/mm or more under the AC voltage and 14 kV/mm under the DC voltage. The mean life span in the acceleration test at 150° C. and DC 25 kV/mm is as long as 800 hours along with being possible to sinter at a relatively low sintering temperature of 1300° C.

On the contrary, when the oxide represented by $Li_2O$—$(Si_w, Ti_{1-w})O_2$—$MO$ is outside of the composition range described above as in the samples No. 113 to 117 and 119 in TABLE 6, sintering becomes insufficient or many samples are rejected in the humidity resistance load test even after sintering as seen in the samples No. 413 to 417 and 419. The samples with the composition falling on the line A-F and w=1.0 have a high sintering temperature and many rejects in the humidity resistance load test as seen in the samples No. 119 and 121 in TABLE 14. When the value of w is less than 0.30 as shown in the sample No. 122 in TABLE 6, the sintering temperature becomes high and there are many rejects in the humidity resistance load test as seen in the sample NO. 433 in TABLE 14.

Example 6

A starting material with a composition of $BaO_{1.010} \cdot TiO_2$ + $0.01Y_2O_3 + 0.01Eu_2O_3 + 0.01Tb_2O_3 + 0.015BaZrO_3$ + $0.06MnO$ (mole ratio) was prepared using barium titanate A of TABLE 1 as a dielectric powder, in which the TABLE 8 oxide $SiO_2$—$TiO_2$—$XO$ of mean particle size of 1 μm or less and prepared by heating at 1200 to 1500° C. was added as a second side component. A monolithic ceramic capacitor was produced by the same method and same overall dimensions as in Example 1, except that the starting material as described above was used. The electric characteristics were measured by the same method as in Example 1. The results are shown in TABLE 15. Samples No. 501 to 519 in TABLE 15 correspond to samples No. 201 to 219 in TABLE 8, respectively, wherein, for example, the sample No. 501 in TABLE 15 was obtained by adding the side component to the sample No. 201 in TABLE 8.

TABLE 15

| Sample No. | Baking Temp. (°C.) | Dielectric Constant | Dielectric Loss tan δ (%) | Ratio of Temperature Dependent Capacitance Change (%) ΔC/C₂₀ | | | ΔC/C₇₅ 125° C. | Maximum value | DC vias characteristic (%) ΔC/C 5 kV/mm | Product CR (Ω·F) 315 V Impressed Voltage 25° C. | 945 V Impressed Voltage 25° C. | 315 V Impressed Voltage 150° C. | 945 V Impressed Voltage 150° C. | Insulation breakdown voltage (kV/mm) AC | DC | Humidity Resistance Load Test: Number of reject | Mean Life Span (h) |
|---|---|---|---|---|---|---|---|---|---|---|---|---|---|---|---|---|---|
| | | | | −25° C. | 85° C. | −55° C. | | | | | | | | | | | |
| 501 | 1300 | 1350 | 0.6 | 3.3 | −8 | 6.2 | −7.5 | 7.8 | −34 | 4970 | 4720 | 210 | 200 | 12 | 14 | 0/72 | 900 |
| 502 | 1280 | 1370 | 0.6 | 3.2 | −8.1 | 6.5 | −7.7 | 7.9 | −36 | 4980 | 4730 | 220 | 210 | 12 | 14 | 0/72 | 890 |
| 503 | 1280 | 1360 | 0.7 | 3.4 | −8.2 | 6.7 | −8 | 8.2 | −34 | 5030 | 4780 | 220 | 210 | 12 | 14 | 0/72 | 930 |
| 504 | 1300 | 1330 | 0.6 | 4 | −8 | 6.5 | −8.1 | 8.2 | −33 | 5020 | 4770 | 230 | 220 | 13 | 15 | 0/72 | 870 |
| 505 | 1300 | 1350 | 0.6 | 3.5 | −8.1 | 6.8 | −7.9 | 8.1 | −34 | 4990 | 4740 | 230 | 200 | 12 | 14 | 0/72 | 850 |
| 506 | 1280 | 1320 | 0.6 | 3.4 | −7.9 | 6.3 | −7.7 | 8 | −33 | 4980 | 4730 | 210 | 220 | 13 | 15 | 0/72 | 900 |
| 507 | 1280 | 1350 | 0.6 | 3.5 | −8.1 | 6.4 | −7.5 | 7.7 | −34 | 4950 | 4700 | 230 | 200 | 12 | 14 | 0/72 | 880 |
| 508 | 1300 | 1360 | 0.6 | 3.3 | −7.7 | 6.8 | −7.8 | 8 | −34 | 4950 | 4700 | 200 | 190 | 12 | 14 | 0/72 | 910 |
| 509 | 1300 | 1370 | 0.6 | 3.7 | −8.1 | 6.5 | −7.7 | 7.8 | −36 | 4980 | 4730 | 230 | 220 | 12 | 14 | 0/72 | 880 |
| 510 | 1300 | 1360 | 0.6 | 3.5 | −7.9 | 6.8 | −7.5 | 7.7 | −34 | 5000 | 4750 | 220 | 210 | 12 | 14 | 0/72 | 870 |
| 511 | 1280 | 1340 | 0.6 | 3.8 | −8 | 7 | −7.6 | 7.8 | −33 | 5320 | 5050 | 310 | 300 | 12 | 14 | 0/72 | 900 |
| 512 | 1300 | 1330 | 0.6 | 3.4 | −7.8 | 6.8 | −7.8 | 8.2 | −34 | 5330 | 5060 | 320 | 300 | 13 | 15 | 0/72 | 900 |
| 513 | 1350 | 1310 | 1.3 | 3.3 | −7.8 | 6.8 | −7.9 | 8.3 | −33 | 5100 | 4850 | 220 | 210 | 11 | 13 | 42/72 | 120 |
| 514 | 1350 | | | | | | | | Unmeasurable due to insufficient sintering | | | | | | | | |
| 515 | 1350 | | | | | | | | Unmeasurable due to insufficient sintering | | | | | | | | |
| 516 | 1350 | 1300 | 1.2 | 3.5 | −8 | 6.5 | −7.5 | 7.7 | −33 | 4950 | 4700 | 230 | 220 | 11 | 13 | 71/72 | 130 |
| 517 | 1350 | | | | | | | | Unmeasurable due to insufficient sintering | | | | | | | | |
| 518 | 1350 | | | | | | | | Unmeasurable due to insufficient sintering | | | | | | | | |
| 519 | 1350 | | | | | | | | Unmeasurable due to insufficient sintering | | | | | | | | |

As is evident from the samples No. 501 to 512 in TABLE 15, preferable results are obtained in the samples in which the oxides of the samples No. 201 to 212 in TABLE 8 with compositions within or on the boundary lines of the area surrounded by the straight lines connecting A (x=85, y=1, z=14), B (x=35, y=51, z=14), C (x=30, y=20, z=50) and D (x=39, y=1, z=60), wherein x, y and z represent mole %, in the three component phase diagram of the oxides represented by $SiO_2$—$TiO_2$—XO shown in FIG. 5 are added, wherein the samples have a capacitance decreasing ratio of as small as within −40% at an impressed voltage of 5 kV/mm and a dielectric loss of 1.0% or less, along with the rate of chance of the electrostatic capacitance against temperature changes satisfying the B-level characteristic standard stipulated in the JIS Standard in the temperature range of −25° C. to +85° C. and X7R-level characteristic standard stipulated in the EIA standard in the temperature range of −55° C. to +125° C.

When the capacitor is used under a high electric field strength of 10 kV/mm, the insulation resistance represented by the product CR at 25° C. and 150° C. show a high value of 4900 Ω•F or more and 200 Ω•F or more, respectively. The insulation breakdown voltage also shows high values of 12 kV/mm or more under the AC voltage and 14 kV/mm under the DC voltage. The mean life span in the acceleration test at 150° C. and DC 25 kV/mm is as long as 800 hours along with being free from rejections in the humidity resistance load test and it is possible to sinter at a relatively low sintering temperature of 1300° C.

On the contrary, when the $SiO_2$—$TiO_2$—XO oxide is outside of the composition range described above, as in the samples No.213 to 219 in TABLE 8, the sintering becomes insufficient or many samples are rejected in the humidity resistance load test even after sintering as seen in the samples No. 513 to 519 in TABLE 15.

When $Al_2O_3$ and/or $ZrO_2$ is allowed in the oxides represented by $SiO_2$—$TiO_2$—XO, as in the samples No.211 and 212 in TABLE 8, a monolithic capacitor having the insulation resistances of 5300 Ω•F or more and 300 Ω•F or more at 25° C. and 150° C., respectively, under an electric field strength of 10 kV/mm as the samples No. 511 and 512 in TABLE 15 can be obtained. However, when the amounts of addition of $Al_2O_3$ and $ZrO_2$ exceed about 15 parts by weight and about 5 parts by weight, respectively, as in the samples No. 217 and 218 in TABLE 8, the sintering property is extremely deteriorated, as in the samples No. 217 and 218 in TABLE 8.

Example 7

After preparing and weighing $TiCl_4$ and $Ba(NO_3)_2$ having a variety of purity as starting materials, the compounds were precipitated as titanyl barium oxalate ($BaTiO(C_2O_4)$•$4H_2O$) by adding oxalic acid. This precipitate was decomposed by heating at a temperature of 1000° C. or more to synthesize four kinds of barium titanate listed in TABLE 1.

Oxides, carbonates or hydroxides of each component of the first side component were weighed so as to be a composition ratio (mole ratio) of $0.25Li_2O$–$0.65$ ($0.30TiO_2$•$0.70SiO_2$)–$0.10Al_2O_3$ to obtain a powder by crushing and mixing.

Likewise, oxides, carbonates or hydroxides of each component of the second side component were weighed so as to be a composition ratio (mole ratio) of $0.66SiO_2$—$0.17TiO_2$—$0.15BaO$–$0.02MnO$ to obtain a powder by crushing and mixing.

Oxide powders of the first and second side components were placed in separate platinum crucibles and heated at 1500° C. After quenching and crushing the mixture, each oxide powder with a mean particle size of 1 μm or less was obtained.

In the next step, $BaCO_3$ for adjusting the mole ratio Ba/Ti (m) in barium titanate, and $Sc_2O_3$, $Y_2O_3$, $BaZrO_3$, MgO and MnO, each having a purity of 99% or more, were prepared. These raw material powders and the oxide first or second side component were weighted so as to form the compositions shown in TABLE 16 and TABLE 17. The amounts of addition of the first and second side components are indicated by parts by weight relative to 100 parts by weight of the essential component represented by $(BaO)_mTiO_2 + \alpha M_2O_3 + \gamma BaZrO_3 + hMgO + gMnO$.

TABLE 16

| Sample No. | Kind of BaTiO₃ | $(BaO)_mTiO_2 + \alpha M_2O_3 + \beta BaZrO_3 + \gamma MgO + gMnO$ | | | | | | | | Amount of addition of the first components (parts by weight) | Amount of addition of the second component (parts by weight) |
| | | α | | | β | γ | g | γ + g | m | | |
| | | Sc₂O₃ | Y₂O₃ | Total of α | | | | | | | |
|---|---|---|---|---|---|---|---|---|---|---|---|
| *1001 | 1A | 0 | 0.0008 | 0.0008 | 0.02 | 0.002 | 0.002 | 0.004 | 1.005 | 1 | 0 |
| *1002 | 1A | 0.01 | 0.06 | 0.07 | 0.03 | 0.07 | 0.05 | 0.12 | 1.005 | 1 | 0 |
| *1003 | 1A | 0.01 | 0.02 | 0.03 | 0 | 0.03 | 0.02 | 0.05 | 1.01 | 1.5 | 0 |
| *1004 | 1A | 0.02 | 0.01 | 0.03 | 0.08 | 0.02 | 0.04 | 0.06 | 1.01 | 1.5 | 0 |
| *1005 | 1A | 0.01 | 0.01 | 0.02 | 0.02 | 0.001 | 0.034 | 0.035 | 1.01 | 1 | 0 |
| *1006 | 1A | 0.01 | 0.02 | 0.03 | 0.02 | 0.125 | 0.005 | 0.13 | 1.01 | 1 | 0 |
| *1007 | 1A | 0.02 | 0.02 | 0.04 | 0.02 | 0.079 | 0.001 | 0.08 | 1.01 | 1 | 0 |
| *1008 | 1A | 0.01 | 0.02 | 0.03 | 0.02 | 0.005 | 0.125 | 0.13 | 1.01 | 1 | 0 |
| *1009 | 1A | 0.01 | 0.02 | 0.03 | 0.03 | 0.08 | 0.06 | 0.14 | 1.01 | 1 | 0 |
| *1010 | 1A | 0.02 | 0.01 | 0.03 | 0.03 | 0.02 | 0.03 | 0.05 | 0.99 | 1 | 0 |
| *1011 | 1A | 0.01 | 0.01 | 0.02 | 0.04 | 0.03 | 0.02 | 0.05 | 1.00 | 1 | 0 |
| *1012 | 1A | 0.02 | 0 | 0.02 | 0.04 | 0.02 | 0.01 | 0.03 | 1.038 | 1 | 0 |
| *1013 | 1A | 0.01 | 0.01 | 0.02 | 0.02 | 0.03 | 0.01 | 0.04 | 1.05 | 0 | 1 |
| *1014 | 1A | 0.01 | 0.01 | 0.02 | 0.02 | 0.01 | 0.02 | 0.03 | 1.01 | 0 | 0 |
| *1015 | 1A | 0.02 | 0.01 | 0.03 | 0.02 | 0.03 | 0.02 | 0.05 | 1.01 | 5 | 0 |
| *1016 | 1A | 0.01 | 0.01 | 0.02 | 0.02 | 0.01 | 0.03 | 0.04 | 1.01 | 0 | 0 |
| *1017 | 1A | 0.005 | 0.025 | 0.03 | 0.02 | 0.03 | 0.02 | 0.05 | 1.01 | 0 | 4 |
| *1018 | 1D | 0.01 | 0.02 | 0.03 | 0.03 | 0.03 | 0.03 | 0.06 | 1.01 | 2 | 0 |
| 1019 | 1A | 0 | 0.001 | 0.001 | 0.02 | 0.002 | 0.0015 | 0.003 | 1.015 | 1 | 0 |
| 1020 | 1B | 0.02 | 0 | 0.02 | 0.03 | 0.02 | 0.01 | 0.03 | 1.02 | 1 | 0 |

TABLE 16-continued

| Sample No. | Kind of BaTiO$_3$ | $\alpha$ Sc$_2$O$_3$ | Y$_2$O$_3$ | Total of $\alpha$ | $\beta$ | $\gamma$ | g | $\gamma$ + g | m | Amount of addition of the first components (parts by weight) | Amount of addition of the second component (parts by weight) |
|---|---|---|---|---|---|---|---|---|---|---|---|
| 1021 | 1C | 0.005 | 0.05 | 0.055 | 0.03 | 0.12 | 0.002 | 0.122 | 1.03 | 1 | 0 |
| 1022 | 1A | 0 | 0.04 | 0.04 | 0.03 | 0.03 | 0.04 | 0.07 | 1.02 | 1 | 0 |
| 1023 | 1A | 0 | 0.06 | 0.06 | 0.03 | 0.01 | 0.12 | 0.13 | 1.01 | 0 | 1 |

TABLE 17

| Sample No. | Kind of BaTiO$_3$ | $\alpha$ Sc$_2$O$_3$ | Y$_2$O$_3$ | Total of $\alpha$ | $\beta$ | $\gamma$ | g | $\gamma$ + g | m | Amount of addition of the first side component | Amount of addition of the second side component |
|---|---|---|---|---|---|---|---|---|---|---|---|
| 1024 | 1A | 0 | 0.01 | 0.01 | 0.005 | 0.01 | 0.02 | 0.03 | 1.01 | 1 | 0 |
| 1025 | 1A | 0 | 0.02 | 0.02 | 0.04 | 0.01 | 0.03 | 0.04 | 1.01 | 1 | 0 |
| 1026 | 1A | 0 | 0.03 | 0.03 | 0.06 | 0.03 | 0.02 | 0.05 | 1.01 | 1 | 0 |
| 1027 | 1A | 0.01 | 0.04 | 0.05 | 0.03 | 0.06 | 0.05 | 0.11 | 1.01 | 2 | 0 |
| 1028 | 1A | 0 | 0.005 | 0.005 | 0.02 | 0.005 | 0.006 | 0.011 | 1.001 | 2 | 0 |
| 1029 | 1A | 0 | 0.04 | 0.04 | 0.03 | 0.05 | 0.02 | 0.07 | 1.01 | 0 | 2 |
| 1030 | 1A | 0 | 0.02 | 0.02 | 0.03 | 0.02 | 0.03 | 0.05 | 1.035 | 2 | 0 |
| 1031 | 1A | 0 | 0.02 | 0.02 | 0.03 | 0.03 | 0.01 | 0.04 | 1.015 | 0.2 | 0 |
| 1032 | 1A | 0 | 0.02 | 0.02 | 0.03 | 0.02 | 0.03 | 0.05 | 1.01 | 3 | 0 |
| 1033 | 1A | 0 | 0.02 | 0.02 | 0.03 | 0.02 | 0.015 | 0.035 | 1.01 | 0 | 0.2 |
| 1034 | 1A | 0 | 0.02 | 0.02 | 0.03 | 0.03 | 0.01 | 0.04 | 1.01 | 0 | 3 |

An organic solvent such as polyvinyl butyral binder and ethanol was added to the weighed compounds and the mixture was mixed in a ball mill in an wet state to prepare a ceramic slurry. This ceramic slurry was formed into a sheet by a doctor blade method to obtain a rectangular shaped green sheet with a thickness of 35 µm, followed by printing an electroconductive paste of Ni on the ceramic green sheet to form an electroconductive paste layer for forming inner electrodes.

Then, a plurality of the ceramic green sheets on which the electroconductive layer is formed were laminated so that the sides where the electroconductive paste projected are alternately placed, thus obtaining a monolithic body. This monolithic body was heated at 350° C. in a N$_2$ atmosphere and, after allowing the binder to decompose, the monolithic body was fired at the temperatures shown in TABLE 18 and TABLE 19 in a reducing atmosphere comprising H$_2$—N$_2$—H$_2$O gases under an oxygen partial pressure of $10^{-9}$ to $10^{-12}$ MPa for two hours, thereby obtaining a ceramic sintered body.

Both side faces of the ceramic sintered body were coated with a silver paste containing B$_2$O$_3$—Li$_2$O—SiO$_2$—BaO glass frit and fired at a temperature of 600° C. in a N$_2$ atmosphere, thereby obtaining outer electrodes electrically connected to the inner electrodes.

The overall dimensions of the monolithic ceramic capacitor thus obtained were 5.0 mm in width, 5.7 mm in length and 2.4 mm in thickness while the thickness of each dielectric ceramic layer was 30 µm. Total number of the effective dielectric ceramic layers were 57, the area of the confronting electrode per layer being $8.2 \times 10^{-6}$ m$^2$.

Electric characteristics of these monolithic ceramic capacitors were measured. The electrostatic capacitance (C) and dielectric loss (tan δ) were measured using an automatic bridge type measuring instrument at 1 kHz, 1 Vrms and 25° C. and the dielectric constant ($\epsilon$) was calculated from the electrostatic capacitance. Next, the insulation resistance was measured using an insulation resistance tester at 25° C. and 150° C. by impressing direct current voltages of 315 V (or 10 kV/mm) and 945 V (or 30 kV/mm) for 2 minutes, obtaining a product of the electrostatic capacitance and insulation resistance, or a product CR.

The rate of change of the electrostatic capacitance against temperature changes was also measured. The rate of change at −25° C. and 85° C. by taking the electrostatic capacitance at 20° C. as a standard ($\Delta C/C_{20}$), the rate of change at −55° C. and 125° C. by taking the electrostatic capacitance at 20° C. as a standard ($\Delta C/C_{25}$) and the maximum value of the rate of change ($|\Delta C|_{max}$) as an absolute value were measured as the electrostatic capacitances against temperature changes.

The DC vias characteristic was also evaluated. First, the electrostatic capacitance when an AC voltage of 1 kHz and 1 Vrms was impressed was measured. Then, the electrostatic capacitance when a DC voltage of 150 V and an AC voltage of 1 kHz and 1 Vrms were simultaneously impressed was measured, thereby the rate of reduction of the electrostatic capacitance ($\Delta C/C$) due to loading the DC voltage was calculated.

In the high temperature load test, a direct current voltage of 750 V (or 25 kV/mm) was impressed at 150° C. on 36 pieces of each sample to measure the time dependent changes of the insulation resistance. The time when the insulation resistance of each sample was reduced below $10^6$ Ω was defined to be a life span time and mean life span time was evaluated.

In the humidity resistance test, the number of the test pieces having an insulation resistance of $10^6$ Ω or less among the 72 test pieces were counted after impressing a DC voltage of 315 V under an atmospheric pressure of 2 atm (relative humidity 100%) at 120° C. for 250 hours.

Insulation breakdown voltages under AC and DC voltages were measured by impressing AC and DC voltages at a voltage increase rate of 100 V/sec.

The results described above are listed in TABLE 18 and TABLE 19.

TABLE 18

| Sample No. | Baking Temp. (°C.) | Dielectric Constant | Dielectric Loss tan δ (%) | Ratio of Temperature Dependent Capacitance Change (%) ΔC/C₂₀ -25°C. | 85°C. | ΔC/C₂₅ -55°C. | 125°C. | Maximum value | DC vias characteristic (%) ΔC/C 5 kV/mm | Product CR (Ω·F) 315 V Impressed Voltage 25°C. | 945 V Impressed Voltage 25°C. | 315 V Impressed Voltage 150°C. | 945 V Impressed Voltage 150°C. | Insulation breakdown voltage (kV/mm) AC | DC | Humidity Resistance Load Test: Number of reject | Mean Life Span (h) |
|---|---|---|---|---|---|---|---|---|---|---|---|---|---|---|---|---|---|
| *1001 | 1300 | 1140 | 0.8 | 5.5 | -12.5 | 4.6 | -17.2 | 20 | -17 | 5130 | 4870 | 210 | 200 | 12 | 14 | 0/72 | 890 |
| *1002 | 1300 | 850 | 0.7 | 2.1 | -7.2 | 4.4 | -6.5 | 8 | -12 | 8490 | 8070 | 190 | 180 | 12 | 14 | 0/72 | 850 |
| *1003 | 1280 | 1020 | 0.6 | 2 | -8 | 4.2 | -8.2 | 9.1 | -15 | 3140 | 2200 | 150 | 110 | 12 | 14 | 0/72 | 840 |
| *1004 | 1300 | 1360 | 0.7 | 2.4 | -14.7 | 5.1 | -29.5 | 35.4 | -26 | 5170 | 4910 | 230 | 220 | 12 | 14 | 0/72 | 150 |
| *1005 | 1280 | 1220 | 0.7 | 3.2 | -14.2 | 4.1 | -17.9 | 23 | -21 | 3070 | 2920 | 130 | 120 | 13 | 14 | 0/72 | 830 |
| *1006 | 1360 | 1400 | 2.7 | 2.5 | -8.3 | 4.3 | -8.6 | 9 | -35 | 5140 | 4880 | 220 | 210 | 12 | 14 | 61/72 | 180 |
| *1007 | | | | | | | | | Unmeasurable due to semiconductor formation | | | | | | | | |
| *1008 | 1280 | 1340 | 0.8 | 3.5 | -8.9 | 4.8 | -18.6 | 25.1 | -28 | 3140 | 2980 | 140 | 130 | 12 | 14 | 0/72 | 190 |
| *1009 | 1280 | 880 | 2.6 | 3.5 | -9.2 | 3.8 | -9.1 | 9.9 | -12 | 5010 | 4760 | 240 | 230 | 12 | 14 | 15/72 | 130 |
| *1010 | | | | | | | | | Unmeasurable due to semiconductor formation | | | | | | | | |
| *1011 | 1300 | 1280 | 0.7 | 3.9 | -9 | 4.7 | -9.3 | 10.2 | -25 | 3300 | 3140 | 160 | 150 | 10 | 12 | 0/72 | 110 |
| *1012 | | | | | | | | | Unmeasurable due to insufficient sintering | | | | | | | | |
| *1013 | | | | | | | | | Unmeasurable due to insufficient sintering | | | | | | | | |
| *1014 | | | | | | | | | Unmeasurable due to insufficient sintering | | | | | | | | |
| *1015 | 1300 | 1280 | 2.3 | 4 | -8.9 | 4.2 | -9.4 | 10.9 | -25 | 3310 | 3150 | 160 | 150 | 11 | 11 | 0/72 | 150 |
| *1016 | | | | | | | | | Unmeasurable due to insufficient sintering | | | | | | | | |
| *1017 | 1300 | 1260 | 2.5 | 2.8 | -8.4 | 3.1 | -7.6 | 8.4 | -23 | 3150 | 2990 | 180 | 170 | 10 | 11 | 0/72 | 170 |
| *1018 | 1300 | 1030 | 0.7 | 2.5 | -7.9 | 5.6 | -9.4 | 9.2 | -15 | 5120 | 4860 | 260 | 250 | 12 | 14 | 0/72 | 870 |
| 1019 | 1280 | 1580 | 0.7 | 2.5 | -7.2 | 3.8 | -8.5 | 8.8 | -45 | 5070 | 4820 | 260 | 250 | 12 | 15 | 0/72 | 950 |
| 1020 | 1280 | 1520 | 0.6 | 2.6 | -7 | 4 | -8 | 8.6 | -45 | 5050 | 4800 | 240 | 230 | 12 | 14 | 0/72 | 960 |
| 1021 | 1280 | 1080 | 0.6 | 3 | -8 | 4.1 | -8.2 | 9 | -15 | 5290 | 5030 | 280 | 270 | 12 | 15 | 0/72 | 820 |
| 1022 | 1300 | 1320 | 0.6 | 2.5 | -8.3 | 3.8 | -8.6 | 8.8 | -26 | 5160 | 4900 | 250 | 240 | 12 | 14 | 0/72 | 830 |
| 1023 | 1300 | 1050 | 0.7 | 2.4 | -8.1 | 4.2 | -8.4 | 8.9 | -15 | 5230 | 4970 | 220 | 210 | 13 | 15 | 0/72 | 840 |

TABLE 19

| Sample No. | Baking Temp. (°C) | Dielectric Constant | Dielectric Loss tan δ (%) | Ratio of Temperature Dependent Capacitance Change (%) ΔC/C₂₀ | | | ΔC/C₇₅ | Maximum value | DC vias characteristic (%) ΔC/C 5 kV/mm | Product CR (Ω · F) 315 V Impressed Voltage 25° C. | 945 V Impressed Voltage 25° C. | 315 V Impressed Voltage 150° C. | 945 V Impressed Voltage 150° C. | Insulation breakdown voltage (kV/mm) AC | DC | Humidity Resistance Load Test: Number of reject | Mean Life Span (h) |
|---|---|---|---|---|---|---|---|---|---|---|---|---|---|---|---|---|---|
| | | | | −25° C. | 85° C. | −55° C. | 125° C. | | | | | | | | | | |
| 1024 | 1300 | 1570 | 0.6 | 2.9 | −7.9 | 4.1 | −8.2 | 8.8 | −45 | 5180 | 4920 | 230 | 220 | 12 | 14 | 0/72 | 890 |
| 1025 | 1300 | 1480 | 0.7 | 3.1 | −7.1 | 4.3 | −7.9 | 8.5 | −40 | 5300 | 5040 | 270 | 260 | 12 | 15 | 0/72 | 900 |
| 1026 | 1280 | 1420 | 0.6 | 3.2 | −8.1 | 3.8 | −8.3 | 9 | −35 | 5240 | 4980 | 280 | 270 | 13 | 14 | 0/72 | 830 |
| 1027 | 1280 | 1230 | 0.7 | 2.4 | −7.5 | 3.9 | −8.1 | 8.6 | −22 | 5260 | 5000 | 220 | 210 | 12 | 14 | 0/72 | 840 |
| 1028 | 1300 | 1590 | 0.6 | 2.8 | −7.6 | 4.2 | −7.9 | 8.4 | −45 | 5280 | 5020 | 200 | 190 | 12 | 14 | 0/72 | 860 |
| 1029 | 1300 | 1330 | 0.6 | 2.7 | −7.2 | 4.3 | −8.2 | 8.6 | −26 | 5040 | 4790 | 210 | 200 | 12 | 14 | 0/72 | 950 |
| 1030 | 1300 | 1540 | 0.6 | 2.6 | −7.9 | 4.5 | −8.1 | 8.8 | −42 | 5230 | 4970 | 240 | 230 | 13 | 14 | 0/72 | 900 |
| 1031 | 1280 | 1560 | 0.6 | 2.5 | −8 | 4.1 | −8.5 | 8.9 | −42 | 5080 | 7830 | 270 | 260 | 12 | 15 | 0/72 | 870 |
| 1032 | 1280 | 1550 | 0.6 | 2 | −8.1 | 3.9 | −8.2 | 8.7 | −42 | 5190 | 4930 | 210 | 200 | 12 | 14 | 0/72 | 890 |
| 1033 | 1300 | 1540 | 0.7 | 2.4 | −7.8 | 3.9 | −8.5 | 9.1 | −42 | 5140 | 4880 | 210 | 200 | 12 | 14 | 0/72 | 860 |
| 1034 | 1300 | 1520 | 0.6 | 2.5 | −7.6 | 4.2 | −8.4 | 9.2 | −43 | 5080 | 4830 | 230 | 220 | 12 | 14 | 0/72 | 840 |

It is evident from Table 16 to TABLE 19 that the monolithic ceramic capacitor according to the present invention has a capacitance decreasing ratio of as small as within −45% at an impressed voltage of 5 kV/mm and a dielectric loss of less than 1.0%, wherein the rate of change against temperature changes satisfies both the B-level characteristic standard stipulated in the JIS Standard in the temperature range of −25° C. to +85° C. and X7R-level characteristic standard stipulated in the EIA standard in the temperature range of −55° C. to +125° C.

Moreover, the insulation resistances at 25° C. and 150° C. as expressed by the product CR show as high values as 5000 Ω•F or more and 200 Ω•F or more, respectively, when the ceramic capacitor is used under a high electric field strength of 10 kV/mm. The insulation breakdown voltage also shows high values of 12 kV/mm or more under the AC voltage and 14 kV/mm or more under the DC voltage. In addition, an acceleration test at 150° C. and DC 25 kV/mm gave a mean life span as long as 800 hours or more besides enabling a relatively low firing temperature of 1300° C. or less.

The reason why the composition was limited in the present invention will be described hereinafter.

In the composition of $(BaO)_m TiO_2 + \alpha M_2O_3 + \gamma BaZrO_3 + gMnO + hMgO$ (wherein $M_2O_3$ represents at least one of either $Sc_2O_3$ or $Y_2O_3$, α, γ, g, and h represent mole ratio, respectively), a $M_2O_3$ content α of less than about 0.001 as shown in the sample No. 1001 is not preferable because the temperature characteristic does not satisfy the B-level/X7R characteristics. On the other hand, the $M_2O_3$ content α of more than about 0.06 as shown in the sample No. 1002 is also not preferable because the specific dielectric constant is reduced to less than 1000. Accordingly, the preferable range of the $M_2O_3$ content α is $0.001 \leq \alpha \leq 0.06$.

It is not preferable that the $BaZrO_3$ content γ be zero as in the sample No. 1003 is not preferable since the insulation resistance is low and the voltage dependency of the insulating resistance is larger than that of the composition system containing $BaZrO_3$. It is also not preferable that the $BaZrO_3$ content γ is more than about 0.06 as in the sample No. 1004 because the temperature characteristic does not satisfy the B-level/X7R characteristics, along with shortening the mean life span. Accordingly, the preferable range of the $BaZrO_3$ content γ is $0.005 \leq \gamma \leq 0.06$.

It is not preferable that, as seen in the sample No. 1005, the MgO content h is about 0.001 since the insulation resistance becomes low and the temperature characteristic does not satisfy the B-level/X7R characteristics. It is not preferable, on the other hand, that the MgO content h exceed about 0.12 as in the sample No. 1006, because the sintering temperature becomes high, the dielectric loss exceeds 2.0%, the number of rejections in the humidity resistance load test is extremely increased along with shortening the mean life span. Accordingly, the preferable range of the MgO content h is in the range of $0.001 < h \leq 0.12$.

It is not preferable that, as seen in the sample No. 1007, the MnO content g is about 0.001 Since measurement becomes impossible due to formation of semiconductors. It is not preferable, on the other hand, that the MnO content g exceed about 0.12 as seen in the sample No. 1008 because the temperature characteristic X7R is not satisfied and the insulation resistance is lowered and the mean life span becomes short. Accordingly, the preferable range of the MnO content g is in the range of $0.001 < g \leq 0.12$.

It is not preferable that, as in the sample No. 1009, the combined amount of g+h of the MgO content h and MnO content g exceed about 0.13 because the dielectric loss is increased to 2.0% and the mean life span is shortened and the rejection number in the humidity resistance load test increases. Accordingly, the combined amount of g+h of the MgO content h and MnO content g is preferably in the range of $g+h \leq 0.13$.

It is not preferable that the $BaO/TiO_2$ ratio m is less than about 1.000 as in the sample No. 1010 because measurements are impossible due to formation of semiconductors. It is also not preferable that, as seen in the sample No. 1011, the $BaO/TiO_2$ ratio m is about 1.000 since the insulation resistance as well as the AC and DC breakdown voltage are lowered along with shortening the mean life span. It is not preferable, on the other hand, that the $BaO/TiO_2$ ratio m is over about 1.035 as in the samples No. 1012 and 1013 since measurements becomes impossible due to insufficient sintering. Accordingly, the $BaO/TiO_2$ ratio m in the range of $1.000 < m \leq 1.035$ is preferable.

It is not preferable that the amount of addition of the first or second side component is zero as in the samples No. 1014 and 1016 because measurements are impossible due to insufficient sintering. It is not preferable that the amount of addition of the first or second side component exceed about 3.0 parts by weight as seen in the samples No. 1015 and 1017, because the dielectric loss exceeds 1.0% and the insulation resistance and Insulation breakdown voltage are lowered along with shortening the mean life span. Accordingly, the preferable content of either the first or the second components is 0.2 to 3.0 parts by weight.

The contents of the alkali earth metal oxides contained in barium titanate as impurities is below about 0.02% by weight because when the contents of the alkali earth metal oxides exceed about 0.02% by weight as in the sample No. 1018, the dielectric constant is decreased.

Example 8

A material with a composition of $BaO_{1.010} \cdot TiO_2 + 0.03Y_2O_3 + 0.02BaZrO_3 + 0.05MgO + 0.01$ MnO (mole ratio) was prepared using barium titanate A of TABLE 1 as a dielectric powder. A monolithic ceramic capacitor was produced by the same method as in Example 7, except that an oxide represented by $Li_2O—(Si, Ti)O_2—MO$ shown in Table 20, having a mean particle size of 1 μm or less produced by heating the material described above at 1200 to 1500° C., was added as the first side component. The overall dimensions of the monolithic ceramic capacitor produced is the same as in Example 7.

The electric characteristics were then measured by the same method as in Example 7. The results are shown in TABLE 21.

TABLE 20

| | | The first side component | | | | |
|---|---|---|---|---|---|---|
| Sample No. | Amount of addition (parts by weight) | Composition (mol %, except w) | | | | |
| | | $Li_2O$ | $(Si_w Ti_{1-w})O_2$ | w | $Al_2O_3$ | $ZrO_2$ |
| 1101 | 1 | 20 | 80 | 0.3 | 0 | 0 |
| 1102 | 1 | 10 | 80 | 0.6 | 5 | 5 |
| 1103 | 0.8 | 10 | 70 | 0.5 | 20 | 0 |
| 1104 | 0.8 | 35 | 45 | 1 | 10 | 10 |
| 1105 | 1.5 | 45 | 45 | 0.5 | 10 | 0 |
| 1106 | 1.5 | 45 | 55 | 0.3 | 0 | 0 |
| 1107 | 1 | 20 | 70 | 0.6 | 5 | 5 |

TABLE 20-continued

| | | The first side component | | | | |
|---|---|---|---|---|---|---|
| Sample No. | Amount of addition (parts by weight) | Composition (mol %, except w) | | | | |
| | | $Li_2O$ | $(Si_wTi_{1-w})O_2$ | w | $Al_2O_3$ | $ZrO_2$ |
| 1108 | 1 | 20 | 70 | 0.4 | 10 | 0 |
| 1109 | 1.2 | 30 | 60 | 0.7 | 5 | 5 |
| 1110 | 1.2 | 30 | 60 | 0.8 | 10 | 0 |
| 1111 | 2 | 40 | 50 | 0.6 | 5 | 5 |
| 1112 | 2 | 40 | 50 | 0.9 | 0 | 10 |
| 1113 | 1.5 | 10 | 85 | 0.4 | 5 | 0 |
| 1114 | 2 | 5 | 75 | 0.6 | 10 | 10 |
| 1115 | 1.2 | 20 | 55 | 0.5 | 25 | 0 |
| 1116 | 1 | 45 | 40 | 0.8 | 0 | 15 |
| 1117 | 0.8 | 50 | 45 | 0.7 | 5 | 0 |
| 1118 | 1.2 | 25 | 75 | 0.9 | 0 | 0 |
| 1119 | 1.5 | 25 | 75 | 1 | 0 | 0 |
| 1120 | 1 | 35 | 65 | 0.9 | 0 | 0 |
| 1121 | 1.5 | 35 | 65 | 1 | 0 | 0 |
| 1122 | 1.2 | 20 | 70 | 0.2 | 0 | 10 |

TABLE 21

| Sample No. | Baking Temp. (° C.) | Dielectric Constant | Dielectric Loss tan δ (%) | Ratio of Temperature Dependent Capacitance Change (%) ΔC/C₂₀ -25° C. | 85° C. | ΔC/C₂₅ -55° C. | 125° C. | Maximum value | DC vias characteristic (%) ΔC/C 5 kV/mm | Product CR (Ω · F) 315 V Impressed Voltage 25° C. | 945 V Impressed Voltage | 315 V Impressed Voltage 150° C. | 945 V Impressed Voltage | Insulation breakdown voltage (kV/mm) AC | DC | Humidity Resistance Load Test: Number of reject | Mean Life Span (h) |
|---|---|---|---|---|---|---|---|---|---|---|---|---|---|---|---|---|---|
| 1001 | 1280 | 1430 | 0.8 | 2.5 | -8.2 | 3.3 | -8.4 | 9.4 | -36 | 5120 | 4860 | 220 | 210 | 13 | 14 | 0/72 | 840 |
| 1102 | 1280 | 1450 | 0.6 | 2.3 | -8.4 | 3.8 | -8.6 | 9.5 | -37 | 5080 | 4830 | 230 | 220 | 13 | 14 | 0/72 | 890 |
| 1103 | 1280 | 1490 | 0.6 | 2.4 | -7.9 | 4.2 | -8.2 | 9.9 | -39 | 5160 | 4900 | 220 | 210 | 12 | 14 | 0/72 | 850 |
| 1104 | 1300 | 1470 | 0.7 | 2.1 | -7.8 | 4.6 | -8.1 | 8.9 | -39 | 5200 | 4940 | 220 | 200 | 12 | 15 | 0/72 | 830 |
| 1105 | 1300 | 1430 | 0.6 | 2 | -7.8 | 3.5 | -8.3 | 9.4 | -36 | 5180 | 4920 | 230 | 220 | 13 | 14 | 0/72 | 870 |
| 1106 | 1280 | 1450 | 0.7 | 2.6 | -8.2 | 3.7 | -8.6 | 9.2 | -37 | 5090 | 4840 | 210 | 200 | 12 | 14 | 0/72 | 900 |
| 1107 | 1280 | 1430 | 0.8 | 2.8 | -8.6 | 3.8 | -8.9 | 9.3 | -36 | 5070 | 4820 | 220 | 210 | 13 | 14 | 0/72 | 870 |
| 1108 | 1280 | 1440 | 0.6 | 2.9 | -8.4 | 4.1 | -8.7 | 8.9 | -36 | 5030 | 4780 | 220 | 210 | 12 | 14 | 0/72 | 830 |
| 1109 | 1280 | 1480 | 0.7 | 2.4 | -7.6 | 4.2 | -8.2 | 8.8 | -39 | 5220 | 4960 | 210 | 200 | 12 | 14 | 0/72 | 890 |
| 1110 | 1300 | 1470 | 0.6 | 2.6 | -7.4 | 3.8 | -8.3 | 8.8 | -39 | 5080 | 4830 | 230 | 220 | 13 | 14 | 0/72 | 910 |
| 1111 | 1300 | 1420 | 0.8 | 2.4 | -8 | 3.9 | -8.1 | 9 | -36 | 5100 | 4850 | 200 | 190 | 12 | 14 | 0/72 | 870 |
| 1112 | 1280 | 1410 | 0.6 | 2.2 | -8.4 | 3.9 | -8.6 | 9.1 | -35 | 5180 | 4920 | 210 | 200 | 12 | 14 | 0/72 | 850 |
| 1113 | 1350 | | | | | | | | Unmeasurable due to insufficient sintering | | | | | | | | 840 |
| 1114 | 1350 | | | | | | | | | | | | | | | | |
| 1115 | 1350 | 1460 | 1.5 | 2.8 | -7.8 | 4.2 | -8.2 | 8.9 | -37 | 4820 | 4580 | 190 | 180 | 11 | 13 | 32/72 | 180 |
| 1116 | 1350 | | | | | | | | Unmeasurable due to insufficient sintering | | | | | | | | |
| 1117 | 1350 | | | | | | | | Unmeasurable due to insufficient sintering | | | | | | | | |
| 1118 | 1300 | 1420 | 0.8 | 2.9 | -7.9 | 4.8 | -8.3 | 9.1 | -36 | 5160 | 4900 | 210 | 200 | 12 | 14 | 0/72 | 860 |
| 1119 | 1350 | 1430 | 1.4 | 2.7 | -8.2 | 4.2 | -8.4 | 9.2 | -36 | 4890 | 4650 | 190 | 180 | 11 | 13 | 16/72 | 150 |
| 1120 | 1300 | 1450 | 0.7 | 2.5 | -8 | 4 | -8.2 | 9.4 | -37 | 5130 | 4870 | 210 | 200 | 12 | 14 | 0/72 | 840 |
| 1121 | 1350 | 1460 | 1.4 | 2.2 | -8.1 | 3.8 | -8.6 | 9.1 | -38 | 4950 | 4700 | 190 | 180 | 11 | 13 | 36/72 | 140 |
| 1122 | 1350 | 1450 | 1.3 | 2.3 | -8.3 | 3.8 | -8.7 | 9.1 | -38 | 4870 | 4630 | 190 | 180 | 11 | 13 | 25/72 | 190 |

As is evident from TABLE 20 and TABLE 21, preferable results are obtained in the samples No. 1101 to 1112, 1118 and 1120, in which oxides with compositions within or on the boundary lines of the area surrounded by the straight lines connecting A (x=20, y=80, z=0), B (x=10, y=80, z=10), C (x=10, y=70, z=20), D (x=35, y=45, z=20), E (x=45, y=45, z=10) and F (x=45, y=55, z=0), (wherein x, y and z represent mole % and w represents mole ratio, which is in the range of $0.3 \leq w<1.0$ in the composition on the line A-F) of the three component phase diagram of the oxides represented by $Li_2O$—$(Si_w, Ti_{1-w})O_2$—MO shown in FIG. 4 are added, wherein the samples have a capacitance decreasing ratio of as small as within −45% at an impressed voltage of 5 kV/mm and a dielectric loss of 1.0% or less, along with the rate of change of the electrostatic capacitance against temperature changes satisfying the B-level characteristic standard stipulated in the JIS Standard in the temperature range of −25° C. to +85° C. and X7R-level characteristic standard stipulated in the EIA standard in the temperature range of −55° C. to +125° C.

Moreover, the insulation resistances at 25° C. and 150° C. as expressed by the product CR show values as high as 5000 Ω•F or more and 200 Ω•F or more, respectively, when the ceramic capacitor is used under a high electric field strength of 10 kV/mm. The insulation breakdown voltage also shows high values of 12 kV/mm or more under the AC voltage and 14 kV/mm or more under the DC voltage. In addition, an acceleration test at 150° C. and DC 25 kV/mm gave a mean life span as long as 800 hours or more and a relatively low firing temperature of 1300° C. or less could be used.

On the contrary, when the $Li_2O$—$(Si_w, Ti_{1-w})O_2$—MO oxide is outside of the composition range described above as shown in the samples No. 1113 to 1117, and 1119, the sintering becomes insufficient or many samples are rejected in the humidity resistance load test even after sintering. The samples with the composition falling on the line A-F and w=1.0 as in the samples No. 1119 and 1121 have high sintering temperature along with causing many rejects in the humidity resistance load test. When the value of w is less than about 0.30 as shown in the sample No. 1122, the sintering temperature becomes high along with causing many rejects in the humidity resistance load test.

Example 9

A material with a composition of $BaO_{1.010}@TiO_2$+ $0.03Sc_2O_3$+0.01 $5BaZrO_3$+$0.05MgO$+0.01 MnO (mole ratio) was prepared using barium titanate A of TABLE 1 as a dielectric powder. A monolithic ceramic capacitor was produced by the same method as in Example 7, except that an oxide $Li_2O$—$TiO_2$—XO shown in Table 22, having a mean particle size of 1 μm or less produced by heating the material described above at 1200 to 1500° C., was added as the second side component. The amounts of addition of $Al_2O_3$ and $ZrO_2$ correspond to parts by weight relative to 100 parts by weight of $(xSiO_2$—$yTiO_2$—$zXO)$. The overall dimensions of the monolithic ceramic capacitor produced is the same as in Example 7.

The electric characteristics were then measured by the same method as in Example 7. The results are shown in TABLE 23.

TABLE 22

| | | The second side component | | | | | | | | | | |
|---|---|---|---|---|---|---|---|---|---|---|---|---|
| | | Essential component (mol %) | | | | | | | | | Added component (Parts by weight) | |
| Sample No. | Amount of addition | $SiO_2$ | $TiO_2$ | BaO | CaO | SrO | MgO | ZnO | MnO | Total | $Al_2O_3$ | $ZrO_2$ |
| 1201 | 1 | 85 | 1 | 1 | 0 | 0 | 0 | 4 | 9 | 14 | 0 | 0 |
| 1202 | 1 | 35 | 51 | 0 | 10 | 0 | 0 | 0 | 4 | 14 | 0 | 0 |
| 1203 | 1 | 30 | 20 | 0 | 30 | 0 | 15 | 4 | 1 | 50 | 0 | 0 |
| 1204 | 1 | 39 | 1 | 20 | 20 | 2 | 0 | 13 | 5 | 60 | 0 | 0 |
| 1205 | 1 | 70 | 10 | 5 | 5 | 0 | 0 | 10 | 0 | 20 | 0 | 0 |
| 1206 | 1 | 45 | 10 | 0 | 0 | 0 | 0 | 15 | 30 | 45 | 0 | 0 |
| 1207 | 1 | 50 | 20 | 10 | 10 | 3 | 7 | 0 | 0 | 30 | 0 | 0 |
| 1208 | 1 | 50 | 30 | 0 | 16 | 0 | 0 | 0 | 4 | 20 | 0 | 0 |
| 1209 | 1 | 35 | 30 | 25 | 10 | 0 | 0 | 0 | 0 | 35 | 0 | 0 |
| 1210 | 1 | 40 | 40 | 10 | 0 | 0 | 0 | 5 | 5 | 20 | 0 | 0 |
| 1211 | 1 | 45 | 22 | 3 | 30 | 0 | 0 | 0 | 0 | 33 | 15 | 0 |
| 1212 | 1 | 45 | 22 | 3 | 30 | 0 | 0 | 0 | 0 | 33 | 10 | 5 |
| 1213 | 1 | 65 | 25 | 5 | 5 | 0 | 0 | 0 | 0 | 10 | 0 | 0 |
| 1214 | 1 | 25 | 40 | 15 | 0 | 10 | 0 | 5 | 5 | 35 | 0 | 0 |
| 1215 | 1 | 30 | 10 | 30 | 25 | 0 | 0 | 5 | 0 | 60 | 0 | 0 |
| 1216 | 1 | 50 | 0 | 35 | 15 | 0 | 0 | 0 | 0 | 50 | 0 | 0 |
| 1217 | 1 | 45 | 22 | 30 | 0 | 0 | 3 | 0 | 0 | 33 | 25 | 0 |
| 1218 | 1 | 45 | 22 | 30 | 0 | 3 | 0 | 0 | 0 | 33 | 0 | 15 |
| 1219 | 1 | 30 | 60 | 10 | 0 | 0 | 0 | 0 | 0 | 10 | 0 | 0 |

TABLE 23

| Sample No. | Baking Temp. (° C.) | Dielectric Constant | Dielectric Loss tan δ (%) | Ratio of Temperature Dependent Capacitance Change (%) ΔC/C₂₀ -25° C. | ΔC/C₂₀ 85° C. | ΔC/C₂₅ -55° C. | ΔC/C₂₅ 125° C. | Maximum value | DC vias characteristic (%) ΔC/C 5 kV/mm | Product CR (Ω · F) 315 V Impressed Voltage 25° C. | 945 V Impressed Voltage 25° C. | 315 V Impressed Voltage 150° C. | 945 V Impressed Voltage 150° C. | Insulation breakdown voltage (kV/mm) AC | DC | Humidity Resistance Load Test: Number of reject | Mean Life Span (h) |
|---|---|---|---|---|---|---|---|---|---|---|---|---|---|---|---|---|---|
| 1201 | 1300 | 1520 | 1.3 | 2.4 | -7.2 | 2.5 | -7.5 | 8.1 | -41 | 5010 | 4760 | 200 | 190 | 12 | 14 | 0/72 | 820 |
| 1202 | 1300 | 1530 | 1.4 | 2.3 | -7.5 | 2.4 | -7.8 | 8.2 | -41 | 5000 | 4750 | 210 | 200 | 12 | 14 | 0/72 | 810 |
| 1203 | 1300 | 1550 | 1.3 | 2.2 | -7.8 | 2.3 | -7.9 | 8 | -42 | 5020 | 4770 | 200 | 190 | 13 | 14 | 0/72 | 800 |
| 1204 | 1300 | 1540 | 1.3 | 2.3 | -7.7 | 2.4 | -7.8 | 8.3 | -41 | 5010 | 4760 | 200 | 190 | 12 | 15 | 0/72 | 860 |
| 1205 | 1300 | 1520 | 1.3 | 2.4 | -7.5 | 2.2 | -7.6 | 8.1 | -41 | 5030 | 4780 | 200 | 190 | 12 | 14 | 0/72 | 830 |
| 1206 | 1300 | 1530 | 1.3 | 2.2 | -7.4 | 2 | -7.5 | 8.1 | -41 | 5010 | 4760 | 200 | 190 | 13 | 15 | 0/72 | 890 |
| 1207 | 1300 | 1560 | 1.3 | 2.3 | -7.6 | 2.1 | -7.9 | 8.2 | -42 | 5000 | 4750 | 210 | 200 | 12 | 14 | 0/72 | 870 |
| 1208 | 1300 | 1520 | 1.3 | 2.4 | -7.5 | 2.3 | -8 | 8.2 | -41 | 5010 | 4760 | 200 | 190 | 13 | 14 | 0/72 | 850 |
| 1209 | 1300 | 1530 | 1.3 | 2.2 | -7.1 | 2.4 | -7.8 | 8.3 | -41 | 5020 | 4770 | 200 | 190 | 13 | 14 | 0/72 | 820 |
| 1210 | 1300 | 1510 | 1.4 | 2.3 | -7.5 | 2.4 | -7.9 | 8.1 | -41 | 5030 | 4780 | 200 | 190 | 12 | 14 | 0/72 | 810 |
| 1211 | 1300 | 1530 | 1.3 | 2.5 | -7.2 | 2.5 | -7.8 | 8 | -41 | 5420 | 5150 | 320 | 300 | 12 | 14 | 0/72 | 860 |
| 1212 | 1300 | 1540 | 1.3 | 2.1 | -7.1 | 2.2 | -7.6 | 8.1 | -41 | 5410 | 5140 | 300 | 290 | 12 | 14 | 0/72 | 840 |
| 1213 | 1350 | 1550 | 1.5 | 2 | -7 | 2.3 | -7.6 | 8.2 | -42 | 4830 | 4590 | 200 | 190 | 11 | 13 | 52/72 | 160 |
| 1214 | 1350 | | | | | | | Unmeasurable due to insufficient sintering | | | | | | | | | |
| 1215 | 1350 | | | | | | | Unmeasurable due to insufficient sintering | | | | | | | | | |
| 1216 | 1350 | 1560 | 1.6 | 2.3 | -7.2 | 2.4 | -7.8 | 8.2 | -42 | 4790 | 4550 | 200 | 190 | 1 | 13 | 72/72 | 180 |
| 1217 | 1350 | | | | | | | Unmeasurable due to insufficient sintering | | | | | | | | | |
| 1218 | 1350 | | | | | | | Unmeasurable due to insufficient sintering | | | | | | | | | |
| 1219 | 1350 | | | | | | | Unmeasurable due to insufficient sintering | | | | | | | | | |

As is evident from TABLE 22 and TABLE 23, preferable results are obtained in the samples No. 1201 to 1212 in which oxides with compositions within or on the boundary lines of the area surrounded by the straight lines connecting A (x=85, y=1, z=14), B (x=35, y=51, z=14), C (x=30, y=20, z=50) and D (x=39, y=1, z=60), (wherein x, y and z represent mole %) of the three component phase diagram of the oxides represented by $SiO_2$—$TiO_2$—XO shown in FIG. 5 are added, wherein the samples have a capacitance decreasing ratio of as small as −45% at an impressed voltage of 5 kV/mm and a dielectric loss of 1.0% or less, along with the rate of change of the electrostatic capacitance against temperature changes satisfying the B-level characteristic standard stipulated in the JIS Standard in the temperature range of −25° C. to +85° C. and X7R-level characteristic standard stipulated in the EIA standard in the temperature range of −55° C. to +125° C.

Moreover, the insulation resistances at 25° C. and 150° C. as expressed by the product CR show as high values as 5000 Ω•F or more and 200 Ω•F or more, respectively, when the ceramic capacitor is used under a high electric field strength of 10 kV/mm. The insulation breakdown voltage also shows high values of 12 kV/mm or more under the AC voltage and 14 kV/mm or more under the DC voltage. In addition, an acceleration test at 150° C. and DC 25 kV/mm gave a mean life span as long as 800 hours or more. Enabled was a relatively low firing temperature of 1300° C. or less.

When the composition of the oxide represented by $SiO_2$—$TiO_2$—XO is out of the composition range described above, on the other hand, sintering becomes insufficient as seen in the samples No.1213 to 1219 or many rejects occur in the humidity resistance load test even after the sintering.

When $Al_2O_3$ and/or $ZrO2$ is in the oxide represented by $SiO_2$—$TiO_2$—XO as in the samples No. 1211 and 1212, a monolithic capacitor having the insulation resistances of 5400 Ω•F or more and 300 Ω•F or more at 25° C. and 150° C., respectively, under an electric field strength of 10 kV/mm can be obtained. However, when the amounts of addition of $Al_2O_3$ and $ZrO_2$ exceed about 15 parts by weight and about 5 parts by weight, respectively, the sintering property is extremely deteriorated as in the samples No. 1217 and 1218.

Example 10

The four kinds of barium titanate ($BaTiO_3$) in TABLE 1, an oxide powder as a first side component and an oxide powder as a second side component were obtained by the same method as in Example 1.

Then, $BaCO_3$ for adjusting the Ba/Ti mole ratio m in barium titanate, and $Sc_2O_3$, $Y_2O_3$, $BaZrO_3$ and MnO with purity of 99% or more were prepared. These raw material powder and powder of the first or second side component were weighed so as to be the composition shown in TABLE 24 and TABLE 25. The amount of addition of the first or second side component corresponds to the amount relative to 100 parts of the essential component of $((BaO)_m TiO_2 + \alpha M_2O_3 + \beta BaZrO_3 + (MnO))$. A monolithic ceramic capacitor was produced using this weighed compounds by the same method as in Example 7. The overall dimensions of the monolithic ceramic capacitor produced are the same as in Example 7.

TABLE 24

| | | $(BaO)_m TiO_2 + \alpha M_2O_3 + \beta BaZrO_3 + \gamma MnO$ | | | | | | Amount of addition of the first side component (parts by weight) | Amount of addition of the second side component (parts by weight) |
|---|---|---|---|---|---|---|---|---|---|
| | Kind of | α | | Total | | | | | |
| Sample No. | $BaTiO_3$ | $Sc_2O_3$ | $Y_2O_3$ | of α | β | γ | m | | |
| *1301 | 1A | 0 | 0.0008 | 0.0008 | 0.01 | 0.0015 | 1.005 | 1 | 0 |
| *1302 | 1A | 0.03 | 0.045 | 0.075 | 0.02 | 0.15 | 1.01 | 1 | 0 |
| *1303 | 1A | 0.01 | 0.01 | 0.02 | 0 | 0.042 | 1.01 | 1.5 | 0 |
| *1304 | 1A | 0.02 | 0.01 | 0.03 | 0.07 | 0.06 | 1.01 | 1.5 | 0 |
| *1305 | 1A | 0 | 0.02 | 0.02 | 0.02 | 0.001 | 1.01 | 1 | 0 |
| *1306 | 1A | 0.02 | 0 | 0.02 | 0.03 | 0.14 | 1.01 | 1 | 0 |
| *1307 | 1A | 0 | 0.03 | 0.03 | 0.03 | 0.06 | 0.99 | 1 | 0 |
| *1308 | 1A | 0.005 | 0.015 | 0.02 | 0.04 | 0.041 | 1 | 1 | 0 |
| *1309 | 1A | 0 | 0.02 | 0.02 | 0.03 | 0.04 | 1.038 | 1 | 0 |
| *1310 | 1A | 0 | 0.03 | 0.03 | 0.02 | 0.06 | 1.045 | 0 | 1 |
| *1311 | 1A | 0 | 0.02 | 0.02 | 0.02 | 0.04 | 1.01 | 0 | 0 |
| *1312 | 1A | 0 | 0.02 | 0.03 | 0.02 | 0.06 | 1.01 | 5 | 0 |
| *1313 | 1A | 0.01 | 0.01 | 0.03 | 0.02 | 0.063 | 1.02 | 0 | 0 |
| *1314 | 1A | 0.02 | 0.02 | 0.02 | 0.03 | 0.04 | 1.01 | 0 | 4 |
| *1315 | ID | 0 | 0.03 | 0.03 | 0.03 | 0.06 | 1.02 | 1.5 | 0 |

TABLE 25

| | | | | | | | | Amount of addition of the first side component (parts by weight) | Amount of addition of the second side component (parts by weight) |
|---|---|---|---|---|---|---|---|---|---|
| | (BaO)$_m$TiO$_2$ + αM$_2$O$_3$ + βBaZrO$_3$ + γMnO | | | | | | | | |
| | Kind of | α | | Total | | | | | |
| Sample No. | BaTiO$_3$ | Sc$_2$O$_3$ | Y$_2$O$_3$ | of α | β | γ | m | | |
| 1316 | A | 0 | 0.001 | 0.001 | 0.02 | 0.002 | 1.01 | 1 | |
| 1317 | B | 0 | 0.02 | 0.02 | 0.03 | 0.04 | 1.02 | 1 | 0 |
| 1318 | C | 0.01 | 0 | 0.01 | 0.03 | 0.13 | 1.03 | 1 | 0 |
| 1319 | A | 0.01 | 0.04 | 0.05 | 0.04 | 0.1 | 1.02 | 1 | 0 |
| 1320 | A | 0.02 | 0.04 | 0.06 | 0.03 | 0.12 | 1.01 | | 0 |
| 1321 | A | 0 | 0.01 | 0.01 | 0.005 | 0.02 | 1.01 | 0 1 | |
| 1322 | A | 0.01 | 0.01 | 0.02 | 0.04 | 0.04 | 1.01 | 2 | 0 |
| 1323 | A | 0 | 0.03 | 0.03 | 0.06 | 0.06 | 1.01 | 1 | 0 |
| 1324 | A | 0.02 | 0.02 | 0.04 | 0.03 | 0.078 | 1.01 | 2 | 0 |
| 1325 | A | 0 | 0.01 | 0.01 | 0.02 | 0.02 | 1.001 | 2 | 0 |
| 1326 | A | 0 | 0.005 | 0.005 | 0.04 | 0.01 | 1.02 | 0 | 0 |
| 1327 | A | 0.01 | 0.01 | 0.02 | 0.03 | 0.04 | 1.035 | 2 | 2 |
| 1328 | A | 0.02 | 0 | 0.02 | 0.03 | 0.04 | 1.025 | 0.2 | 0 |
| 1329 | A | 0.01 | 0.01 | 0.02 | 0.03 | 0.04 | 1.01 | 3 | 0 |
| 1330 | A | 0 | 0.02 | 0.02 | 0.03 | 0.041 | 1.01 | 0 | 0 |
| 1331 | A | 0 | 0.02 | 0.02 | 0.03 | 0.04 | 1.01 | 0 | 0.2 3 |

The electric characteristics were measured by the same method as in Example 7. The results are shown in TABLE 26 and TABLE 27.

TABLE 26

| Sample No. | Baking Temp. (°C) | Dielectric Constant | Dielectric Loss tan δ (%) | Ratio of Temperature Dependent Capacitance Change (%) ΔC/C₂₀ -25° C. | ΔC/C₂₀ 85° C. | ΔC/C₇₅ -55° C. | ΔC/C₇₅ 125° C. | Maximum value | DC vias characteristic (%) ΔC/C 5 kV/mm | Product CR (Ω·F) 315 V Impressed Voltage 25° C. | 945 V Impressed Voltage 25° C. | 315 V Impressed Voltage 150° C. | 945 V Impressed Voltage 150° C. | Insulation breakdown voltage (kV/mm) AC | DC | Humidity Resistance Load Test: Number of reject | Mean Life Span (h) |
|---|---|---|---|---|---|---|---|---|---|---|---|---|---|---|---|---|---|
| *1301 | 1300 | 1570 | 0.7 | 5 | -12 | 4.2 | -16.7 | 16.7 | -42 | 5100 | 4850 | 200 | 190 | 12 | 14 | 0/72 | 900 |
| *1302 | 1300 | 820 | 0.7 | 2.2 | -6.7 | 4 | -6 | 6.7 | -9 | 5500 | 5230 | 180 | 170 | 12 | 14 | 0/72 | 910 |
| *1303 | 1300 | 1450 | 0.7 | 2.1 | -7.5 | 4 | -7.7 | 8.2 | -36 | 3020 | 2110 | 100 | 70 | 12 | 14 | 0/72 | 890 |
| *1304 | 1300 | 1350 | 0.7 | 2.3 | -14.2 | 5.3 | -28 | 28 | -27 | 5100 | 4850 | 200 | 190 | 12 | 14 | 0/72 | 120 |
| *1305 | | | | | | | | Unmeasurable due to semiconductor formation | | | | | | | | | |
| *1306 | 1280 | 1420 | 0.8 | 3.5 | -8.4 | 4.5 | -18.1 | 18 | -36 | 3120 | 2960 | 140 | 130 | 12 | 14 | 0/72 | 140 |
| *1307 | | | | | | | | Unmeasurable due to insufficient sintering | | | | | | | | | |
| *1308 | 1300 | 1410 | 0.7 | 3.5 | -8.5 | 4.3 | -8.8 | 9.1 | -35 | 3100 | 2950 | 130 | 120 | 10 | 12 | 0/72 | 100 |
| *1309 | | | | | | | | Unmeasurable due to insufficient sintering | | | | | | | | | |
| *1310 | | | | | | | | Unmeasurable due to insufficient sintering | | | | | | | | | |
| *1311 | | | | | | | | Unmeasurable due to insufficient sintering | | | | | | | | | |
| *1312 | 1300 | 1330 | 2.3 | 3.6 | -8.4 | 4.1 | -8.9 | 9.2 | -27 | 3330 | 3160 | 140 | 130 | 11 | 11 | 0/72 | 130 |
| *1313 | | | | | | | | Unmeasurable due to insufficient sintering | | | | | | | | | |
| *1314 | 1300 | 1450 | 2.5 | 2.7 | -7.9 | 3.2 | -7.1 | 7.9 | -369 | 3150 | 2990 | 160 | 150 | 10 | 11 | 0/72 | 160 |
| *1315 | 1300 | 1310 | 0.7 | 2.6 | -7.4 | 5.5 | -8.9 | 9.2 | -25 | 5060 | 4810 | 230 | 220 | 12 | 14 | 0/72 | 920 |

TABLE 27

| Sample No. | Baking Temp. (° C.) | Dielectric Constant | Dielectric Loss tan δ (%) | Ratio of Temperature Dependent Capacitance Change (%) | | | | | DC vias characteristic (%) ΔC/C 5 kV/mm |
|---|---|---|---|---|---|---|---|---|---|
| | | | | ΔC/C$_{20}$ -25° C. | 85° C. | ΔC/C$_{25}$ -55° C. | 125° C. | Maximum value | |
| 1316 | 1280 | 1590 | 0.7 | 2.5 | −.7 | 3 | −8 | 8.4 | −40 |
| 1317 | 1280 | 1450 | 0.6 | 2.7 | −.5 | 3.8 | −7.5 | 8 | −36 |
| 1318 | 1280 | 1570 | 0.7 | 3 | −7.5 | 3.5 | −7.7 | 8.2 | −39 |
| 1319 | 1300 | 1110 | 0.6 | 2.6 | −7.8 | 3.7 | −8.5 | 8.8 | −15 |
| 1320 | 1300 | 940 | 0.6 | 2.5 | −7.6 | 4.1 | −7.8 | 8.1 | −12 |
| 1321 | 1300 | 1530 | 0.6 | 2.7 | −7.4 | 4 | −7.6 | 8 | −40 |
| 1322 | 1300 | 1460 | 0.7 | 3 | −.6 | 4.2 | −7.4 | 7.9 | −37 |
| 1323 | 1300 | 1340 | 0.6 | 3.1 | −7.6 | 4 | −7.8 | 8.2 | −26 |
| 1324 | 1280 | 1230 | 0.7 | 2.5 | −7 | 3.7 | −7.6 | 7.9 | −22 |
| 1325 | 1300 | 1560 | 0.6 | 2.7 | −7.1 | 4 | −7.3 | 7.7 | −40 |
| 1326 | 1300 | 1580 | 0.6 | 2.6 | −.7 | 4.1 | −7.5 | 7.8 | −40 |
| 1327 | 1300 | 1430 | 0.7 | 2.5 | −7.4 | 4.2 | −7.5 | 7.8 | −36 |
| 1328 | 1280 | 1430 | 0.6 | 2.5 | −7.5 | 4.1 | −7.8 | 8 | −36 |
| 1329 | 1280 | 1440 | 0.6 | 2.3 | −7.6 | 4 | −7.7 | 8 | −36 |
| 1330 | 1300 | 1430 | 0.7 | 2.7 | −7.3 | 3.8 | −7.8 | 8.1 | −36 |
| 1331 | 1300 | 1340 | 0.6 | 2.6 | −7.1 | 4 | −7.9 | 8.2 | −26 |

| Sample No. | Product CR (Ω · F) | | | | Insulation breakdown voltage (kV/mm) | | Humidity Resistance Load Test: Number of reject | Mean Life Span (h) |
|---|---|---|---|---|---|---|---|---|
| | 315 V Impressed Voltage 25° C. | 945 V Impressed Voltage | 315 V Impressed Voltage 150° C. | 945 V Impressed Voltage | AC | DC | | |
| 1316 | 4900 | 4660 | 230 | 220 | 12 | 14 | 0/72 | 970 |
| 1317 | 4960 | 4710 | 220 | 210 | 13 | 15 | 0/72 | 960 |
| 1318 | 5000 | 4750 | 250 | 240 | 12 | 14 | 0/72 | 850 |
| 1319 | 5100 | 4850 | 210 | 200 | 12 | 14 | 0/72 | 840 |
| 1320 | 5120 | 4860 | 190 | 180 | 12 | 14 | 0/72 | 900 |
| 1321 | 5070 | 4820 | 200 | 190 | 12 | 14 | 0/72 | 890 |
| 1322 | 5200 | 4940 | 250 | 240 | 13 | 15 | 0/72 | 910 |
| 1323 | 5230 | 4970 | 250 | 240 | 13 | 15 | 0/72 | 870 |
| 1324 | 5260 | 5000 | 210 | 200 | 12 | 14 | 0/72 | 860 |
| 1325 | 5100 | 4850 | 190 | 180 | 12 | 14 | 0/72 | 890 |
| 1326 | 5020 | 4770 | 190 | 180 | 12 | 14 | 0/72 | 950 |
| 1327 | 5110 | 4860 | 230 | 220 | 13 | 15 | 0/72 | 930 |
| 1328 | 4980 | 4730 | 250 | 240 | 12 | 14 | 0/72 | 900 |
| 1329 | 5080 | 4830 | 190 | 180 | 12 | 14 | 0/72 | 890 |
| 1330 | 5060 | 4810 | 200 | 190 | 13 | 15 | 0/72 | 910 |
| 1331 | 4990 | 4740 | 200 | 190 | 12 | 14 | 0/72 | 880 |

As evident from TABLE 26 and TABLE 27, the ceramic capacitor according to the present invention has a capacitance decreasing ratio of as small as within −40% at an impressed DC voltage of 5 kV/mm and a dielectric loss of 1.0% or less, along with the rate of change of the electrostatic capacitance against temperature changes satisfying the B-level characteristic standard stipulated in the JIS Standard in the temperature range of −25° C. to +85° C. and X7R-level characteristic standard stipulated in the EIA standard in the temperature range of −55° C. to +125° C.

Moreover, the insulation resistances at 25° C. and 150° C. as expressed by the product CR show as high values as 4900 Ω•F or more and 190 Ω•F or more, respectively, when the ceramic capacitor is used under a high electric field strength of 10 kV/mm. The insulation breakdown voltage also shows high values of 12 kV/mm or more under the AC voltage and 14 kV/mm or more under the DC voltage. In addition, an acceleration test at 150° C. and DC 25 kV/mm gave a mean life span as long as 800 hours or more besides enabling a relatively low firing temperature of 1300° C. or less.

The reason why the composition was limited in the present invention will be described hereinafter.

In the composition of $(BaO)_m TiO_2 + \alpha M_2 O_3 + \gamma BaZrO_3 + g MnO$ (wherein $M_2O_3$ represents at least one of either $Sc_2O_3$ and $Y_2O_3$, α, γ, and g representing mole ratio, respectively), an $M_2O_3$ content α of less than about 0.001 as shown in the sample No. 1301 is not preferable because the temperature characteristic does not satisfy the B-level/X7R characteristics. On the other hand, an $M_2O_3$ content α of more than about 0.06 as shown in the sample No. 1302 is also not preferable because the specific dielectric constant is reduced to less than 900. Accordingly, the preferable range of the $M_2O_3$ content α is $0.001 \leq \alpha \leq 0.06$.

It is not preferable that the $BaZrO_3$ content γ of zero as in the sample No. 1303 is not preferable since the insulation resistance is low and the voltage dependency of the insulating resistance is larger than that of the composition system containing $BaZrO_3$. It is also not preferable that the $BaZrO_3$ content γ is more than about 0.06 as in the sample No. 1304 because the temperature characteristic does not satisfy the B-level/X7R characteristics, along with shortening the mean life span. Accordingly, the preferable range of the $BaZrO_3$ content γ is $0.005 \leq \gamma \leq 0.06$.

It is not preferable that, as seen in the sample No. 1305, the MgO content g is about 0.001 since measurements becomes impossible due to semiconductor formation. It is not preferable that the MgO content g exceeds about 0.13 as in the sample No. 1306, because the temperature characteristic does not satisfy the X7R characteristic and the insulation resistance is low and mean life span is shortened. Accordingly, the preferable range of the MgO content g is in the range of $0.00 < m \leq 0.13$.

It is not preferable that the $BaO/TiO_2$ ratio m is less than about 1.000 as in the sample No. 1307 because measurements are impossible due to formation of semiconductors. It is also not preferable that, as seen in the sample No. 1308, the $BaO/TiO_2$ ratio m is about 1.000 since the insulation resistance as well as the AC and DC breakdown voltage becomes low along with shortening the mean life span. It is not preferable, on the other hand, that the $BaO/TiO_2$ ratio m is over about 1.035 as in the samples No. 1309 and 1310 since measurements becomes impossible due to insufficient sintering. Accordingly, the $BaO/TiO_2$ ratio m in the range of $1.000 < m \leq 1.035$ is preferable.

It is not preferable that the amount of addition of the first or second side component is zero as in the samples No. 1311 and 1313 because measurements are impossible due to insufficient sintering. It is not preferable that the amount of addition of the first or second side component exceeds about 3.0 parts by weight as seen in the samples No. 1312 and 1314, on the other hand, because the dielectric loss exceeds 1.0% and the insulation resistance and insulation breakdown voltage are lowered along with shortening the mean life span. Accordingly, the preferable content of either the first or the second components is in the range of 0.2 to 3.0 parts by weight.

The content of the alkali earth metal oxides contained in barium titanate as impurities is below about 0.02% by weight because, as in the sample No. 1315, when the contents of the alkali earth metal oxides exceeds about 0.02% by weight, the dielectric constant is decreased.

Example 11

A material with a composition of $BaO_{1.010} \cdot TiO_2 + 0.02Y_2O_3 + 0.01BaZrO_3 + 0.04$ MnO (mole ratio) was prepared using barium titanate A in TABLE 1 as a dielectric powder. A monolithic ceramic capacitor was produced by the same method as in Example 7, except that an oxide represented by $Li_2O—(Si,Ti)O_2—MO$ as shown in Table 18, having a mean particle size of 1 μm or less produced by heating the material described above at 1200 to 1500° C., was added as the first side component. The overall dimensions of the monolithic ceramic capacitor produced is the same as in Example 7. The electric characteristics were then measured by the same method as in Example 7. The results are shown in TABLE 28. The sample No.1401 to 1422 in TABLE 28 correspond to the samples NO. 1101 to 1122 in TABLE 28, respectively. For example, the sample No. 1401 in TABLE 28 was obtained by adding the side component of the sample No. 1101 in TABLE 18.

TABLE 28

| Sample No. | Baking Temp. (° C.) | Dielectric Constant | Dielectric Loss tan δ (%) | Ratio of Temperature Dependent Capacitance Change (%) | | | | | DC vias characteristic (%) ΔC/C 5 kV/mm |
|---|---|---|---|---|---|---|---|---|---|
| | | | | ΔC/C$_{20}$ | | ΔC/C$_{25}$ | | Maximum value | |
| | | | | −25° C. | 85° C. | −55° C. | 125° C. | | |
| 1401 | 1280 | 1420 | 0.7 | 2.4 | −8.1 | 3.2 | −8.3 | 8.5 | −35 |
| 1402 | 1300 | 1430 | 0.6 | 2.2 | −8.3 | 3.7 | −8.5 | 8.7 | −37 |
| 1403 | 1280 | 1460 | 0.6 | 2.4 | −7.8 | 4 | −8.1 | 8.3 | −36 |
| 1404 | 1300 | 1480 | 0.7 | 2.1 | −7.9 | 4.1 | −8 | 8.2 | −37 |
| 1405 | 1300 | 1440 | 0.7 | 2.1 | −7.8 | 3.7 | −8.2 | 8.4 | −36 |
| 1406 | 1300 | 1440 | 0.7 | 2.6 | −8.1 | 3.6 | −8.5 | 8.8 | −36 |
| 1407 | 1300 | 1430 | 0.8 | 2.7 | −8.5 | 3.7 | −8.5 | 8.8 | −35 |
| 1408 | 1280 | 1450 | 0.6 | 2.9 | −8.4 | 4 | −8.5 | 8.8 | −37 |
| 1409 | 1280 | 1470 | 0.7 | 2.5 | −7.9 | 4.1 | −8.1 | 8.4 | −36 |
| 1410 | 1280 | 1480 | 0.6 | 2.6 | −7.6 | 3.7 | −8.3 | 8.5 | −37 |
| 1411 | 1300 | 1430 | 0.7 | 2.5 | −7.5 | 3.8 | −8.2 | 8.3 | −35 |
| 1412 | 1280 | 1420 | 0.6 | 2.3 | −8 | 3.7 | −8.4 | 8.5 | −35 |
| 1413 | 1350 | | | Unmeasurable due to insufficient sintering | | | | | |
| 1414 | 1350 | | | Unmeasurable due to insufficient sintering | | | | | |
| 1415 | 1350 | 1450 | 1.5 | 2.7 | −7.9 | 4 | −8 | 8.4 | −37 |
| 1416 | 1350 | | | Unmeasurable due to insufficient sintering | | | | | |
| 1417 | 1350 | | | Unmeasurable due to insufficient sintering | | | | | |
| 1418 | 1300 | 1430 | 0.8 | 2.8 | −8 | 4.2 | −8.2 | 8.6 | −35 |
| 1419 | 1350 | 1440 | 1.5 | 2.6 | −8.1 | 4 | −8.3 | 8.5 | −36 |
| 1420 | 1300 | 1460 | 0.7 | 2.6 | −8.3 | 3.9 | −8 | 8.5 | −37 |
| 1421 | 1350 | 1450 | 1.5 | 2.4 | −8.2 | 3.7 | −8.2 | 8.7 | −37 |
| 1422 | 1350 | 1460 | 1.3 | 2.4 | −8.3 | 3.7 | −8.5 | 8.7 | −37 |

| Sample No. | Product CR (Ω · F) | | | | Insulation breakdown voltage (kV/mm) | | Humidity Resistance Load Test: Number of reject | Mean Life Span (h) |
|---|---|---|---|---|---|---|---|---|
| | 315 V Impressed Voltage | 945 V Impressed Voltage | 315 V Impressed Voltage | 945 V Impressed Voltage | | | | |
| | 25° C. | | 150° C. | | AC | DC | | |
| 1401 | 4950 | 4700 | 210 | 200 | 12 | 14 | 0/72 | 900 |
| 1402 | 4980 | 4730 | 220 | 210 | 13 | 15 | 0/72 | 910 |
| 1403 | 5100 | 4850 | 200 | 190 | 12 | 14 | 0/72 | 860 |

TABLE 28-continued

| | | | | | | | | |
|---|---|---|---|---|---|---|---|---|
| 1404 | 5000 | 4750 | 230 | 220 | 12 | 15 | 0/72 | 870 |
| 1405 | 5080 | 4830 | 220 | 210 | 13 | 14 | 0/72 | 880 |
| 1406 | 5070 | 4820 | 200 | 190 | 13 | 15 | 0/72 | 910 |
| 1407 | 5120 | 4860 | 210 | 200 | 13 | 14 | 0/72 | 930 |
| 1408 | 5160 | 4900 | 210 | 200 | 12 | 14 | 0/72 | 970 |
| 1409 | 5000 | 4750 | 200 | 190 | 12 | 14 | 0/72 | 900 |
| 1410 | 5140 | 4880 | 220 | 210 | 13 | 14 | 0/72 | 880 |
| 1411 | 5100 | 4850 | 210 | 200 | 13 | 15 | 0/72 | 890 |
| 1412 | 5120 | 4860 | 200 | 190 | 12 | 14 | 0/72 | 930 |
| 1413 | Unmeasurable due to insufficient sintering | | | | | | | |
| 1414 | Unmeasurable due to insufficient sintering | | | | | | | |
| 1415 | 4900 | 4660 | 180 | 170 | 170 | 13 | 45/72 | 140 |
| 1416 | Unmeasurable due to insufficient sintering | | | | | | | |
| 1417 | Unmeasurable due to insufficient sintering | | | | | | | |
| 1418 | 5030 | 4780 | 200 | 190 | 11 | 14 | 0/72 | 900 |
| 1419 | 4980 | 4730 | 190 | 180 | 11 | 13 | 23/72 | 130 |
| 1420 | 5000 | 4750 | 200 | 190 | 12 | 13 | 0/72 | 880 |
| 1421 | 4970 | 4720 | 190 | 180 | 11 | 13 | 39/72 | 150 |
| 1422 | 4990 | 4740 | 190 | 180 | 11 | 13 | 36/72 | 160 |

As is evident from the samples no. 1401 to 1412, 1418 and 1420 in TABLE 28, preferable results are obtained in the samples in which oxides of the samples No. 1101 to 1112, 1118 and 1120 in TABLE 18 with compositions within or on the boundary lines of the area surrounded by the straight lines connecting A (x=20, y=80, z=0), B (x=10, y=80, z=10), C (x=10, y=70, z=20), D (x=35, y=45, z=20), E (x=45, y=45, z=10) and F (x=45, y=55, z=0) (wherein x, y and z represent mole %, w represent mole ratio and w is in the range of $0.3 \leq w < 1.0$ in the composition on the line A-F) inside of the three component phase diagram of the oxides represented by $Li_2O$—$(Si_w, Ti_{1-w})O_2$—MO shown in FIG. 4 are added as side components, wherein the samples have a capacitance decreasing ratio of as small as within −40% at an impressed voltage of 5 kV/mm and a dielectric loss of 1.0% or less, along with the rate of change of the electrostatic capacitance against temperature changes satisfying the B-level characteristic standard stipulated in the JIS Standard in the temperature range of −25° C. to +85° C. and X7R-level characteristic standard stipulated in the EIA standard in the temperature range of −55° C. to +125° C.

Moreover, the insulation resistances at 25° C. and 150° C. as expressed by the product CR show as high values as 4900 Ω•F or more and 200 Ω•F or more, respectively, when the ceramic capacitor is used under a high electric field strength of 10 kV/mm. The insulation breakdown voltage also shows high values of 12 kV/mm or more under the AC voltage and 14 kV/mm or more under the DC voltage. In addition, an acceleration test at 150° C. and DC 25 kV/mm gave a mean life span as long as 800 hours or more besides enabling a relatively low firing temperature of 1300° C. or less.

On the contrary, when the oxide represented by $Li_2O$—$(Si_w, Ti_{1-w})O_2$—MO is outside of the composition range described above as shown in the samples No. 1113 to 1117, and 1119 in TABLE 18, the sintering becomes insufficient or many samples are rejected in the humidity resistance load test even after sintering as seen in the samples NO. 1413 to 1417 and 1419 in TABLE 28. The samples with the composition falling on the line A-F and w=1.0 as in the samples No. 1119 and 1121 in TABLE 18 have high sintering temperature along with causing many rejects in the humidity resistance load test as seen in the samples No. 1419 and 1421 in TABLE 26. When the value of w is less than 0.30 as shown in the samples No. 11 22 in TABLE 18, the sintering temperature becomes high along with causing many rejects in the humidity resistance load test as seen in the sample No. 1422 in TABLE 28.

Example 12

A material with a composition of $BaO_{1.010}•TiO_2 + 0.02Sc_2O_3 + 0.01BaZrO_3 + 0.04$ MnO (mole ratio) was prepared using barium titanate A of TABLE 1 as a dielectric powder. A monolithic ceramic capacitor was produced by the same method as in Example 7, except that an oxide represented by $SiO_2$—$TiO_2$—XO shown in Table 20, having a mean particle size of 1 μm or less produced by heating the material described above at 1200 to 1500° C., was added as the second side component. The overall dimensions of the monolithic ceramic capacitor produced is the same as in Example 7. The electric characteristics were then measured by the same method as in Example 7. The results are shown in TABLE 27. In TABLE 27, the samples NO. 1501 to 1519 corresponds to the samples NO. 1201 to 1219 in TABLE 22. For example, the sample No. 1501 in TABLE 29 was obtained by adding the side component of the sample No. 1201 in TABLE 22.

TABLE 29

| Sample No. | Baking Temp. (° C.) | Dielectric Constant | Dielectric Loss tan δ (%) | Ratio of Temperature Dependent Capacitance Change (%) | | | | Maximum value | DC vias characteristic (%) ΔC/C 5 kV/mm |
|---|---|---|---|---|---|---|---|---|---|
| | | | | ΔC/C$_{20}$ | | ΔC/C$_{25}$ | | | |
| | | | | −25° C. | 85° C. | −55° C. | 125° C. | | |
| 1501 | 1300 | 1440 | 1 | 2.3 | −7.3 | 2.3 | −7.6 | 8 | −35 |
| 1502 | 1300 | 1430 | 1.1 | 2.2 | −7.2 | 2.2 | −7.8 | 8.2 | −35 |

TABLE 29-continued

| | | | | | | | | | |
|---|---|---|---|---|---|---|---|---|---|
| 1503 | 1300 | 1460 | 1.2 | 2.1 | −7.7 | 2.1 | −7.7 | 8.1 | −36 |
| 1504 | 1300 | 1420 | 1.1 | 2.1 | −7.6 | 2.3 | −7.8 | 8.2 | −34 |
| 1505 | 1300 | 1470 | 1 | 2.3 | −7.4 | 2.2 | −7.6 | 8.1 | −37 |
| 1506 | 1300 | 1450 | 1.2 | 2.2 | −7.2 | 2.1 | −7.9 | 8.2 | −36 |
| 1507 | 1300 | 1420 | 1.2 | 2.3 | −7.3 | 2.3 | −7.9 | 8.2 | −34 |
| 1508 | 1300 | 1430 | 1.2 | 2.3 | −7.5 | 2.4 | −8.1 | 8.2 | −35 |
| 1509 | 1300 | 1440 | 1.1 | 2.1 | −7.2 | 2.3 | −7.8 | 8.2 | −35 |
| 1510 | 1300 | 1480 | 1.2 | 2.2 | −7.3 | 2.4 | −8 | 8.1 | −37 |
| 1511 | 1300 | 1460 | 1.1 | 2.3 | −7.1 | 2.4 | −7.8 | 8.3 | −36 |
| 1512 | 1300 | 1440 | 1.2 | 2.4 | −7.3 | 2.3 | −7.6 | 8.1 | −35 |
| 1513 | 1350 | 1420 | 1.1 | 2.3 | −7.2 | 2 | −7.7 | 8.1 | −34 |
| 1514 | 1350 | Unmeasurable due to insufficient sintering | | | | | | | |
| 1515 | 1350 | Unmeasurable due to insufficient sintering | | | | | | | |
| 1516 | 1350 | 1430 | 1.2 | 2.2 | −7.3 | 2.5 | −7.7 | 8.1 | −34 |
| 1517 | 1350 | Unmeasurable due to insufficient sintering | | | | | | | |
| 1518 | 1350 | Unmeasurable due to insufficient sintering | | | | | | | |
| 1519 | 1350 | Unmeasurable due to insufficient sintering | | | | | | | |

| | Product CR (Ω · F) | | | | Insulation | Humidity | |
|---|---|---|---|---|---|---|---|
| | 315 V | 945 V | 315 V | 945 V | breakdown | Resistance | |
| | Impressed | Impressed | Impressed | Impressed | voltage | Load Test: | Mean |
| Sample | Voltage | Voltage | Voltage | Voltage | (kV/mm) | Number of | Life Span |
| No. | 25° C. | | 150° C. | | AC DC | rejects | (h) |
| 1501 | 4950 | 4700 | 190 | 180 | 13 15 | 0/72 | 920 |
| 1502 | 4970 | 4720 | 200 | 190 | 12 14 | 0/72 | 890 |
| 1503 | 5000 | 4750 | 190 | 180 | 13 15 | 0/72 | 920 |
| 1504 | 5020 | 4770 | 230 | 220 | 13 15 | 0/72 | 960 |
| 1505 | 4960 | 4710 | 200 | 190 | 12 14 | 0/72 | 880 |
| 1506 | 5100 | 4850 | 200 | 190 | 12 15 | 0/72 | 940 |
| 1507 | 5020 | 4770 | 200 | 190 | 12 14 | 0/72 | 950 |
| 1508 | 5060 | 4810 | 230 | 220 | 12 14 | 0/72 | 870 |
| 1509 | 5050 | 4800 | 210 | 200 | 12 14 | 0/72 | 890 |
| 1510 | 5020 | 4770 | 200 | 190 | 12 14 | 0/72 | 900 |
| 1511 | 5290 | 5030 | 310 | 300 | 13 15 | 0/72 | 960 |
| 1512 | 5300 | 5040 | 320 | 300 | 12 14 | 0/72 | 950 |
| 1513 | 4820 | 4580 | 210 | 200 | 11 13 | 46/72 | 150 |
| 1514 | Unmeasurable due to insufficient sintering | | | | | | |
| 1515 | Unmeasurable due to insufficient sintering | | | | | | |
| 1516 | 4790 | 4550 | 210 | 200 | 11 13 | 72/72 | 130 |
| 1517 | Unmeasurable due to insufficient sintering | | | | | | |
| 1518 | Unmeasurable due to insufficient sintering | | | | | | |
| 1519 | Unmeasurable due to insufficient sintering | | | | | | |

As is evident from Samples NO. 1501 to 1512 in TABLE 29, preferable results are obtained in the samples, in which oxides of the samples NO. 1201 to 1212 in TABLE 20 with compositions within or on the boundary lines of the area surrounded by the straight lines connecting A (x=85, y=1, z=14), B (x=35, y=51, z=14), C (x=30, y=20, z=50) and D (x=39, y=1, z=60), (wherein x, y and z represent mole %), of the three component phase diagram of the oxides represented by $SiO_2$—$TiO_2$—XO shown in FIG. 5 are added as a side component, wherein the samples have a capacitance decreasing ratio of as small as within −40% at an impressed voltage of 5 kV/mm and a dielectric loss of 1.0% or less, along with the rate of change of the electrostatic capacitance against temperature changes satisfying the B-level characteristic standard stipulated in the JIS Standard in the temperature range of −25° C. to +85° C. and X7R-level characteristic standard stipulated in the EIA standard in the temperature range of −55° C. to +125° C.

Moreover, the insulation resistances at 25° C. and 150° C. as expressed by the product CR show as high values as 4900 Ω•F or more and 190 Ω•F or more, respectively, when the ceramic capacitor is used under a high electric field strength of 10 kV/mm. The insulation breakdown voltage also shows high values of 12 kV/mm or more under the AC voltage and 14 kV/mm or more under the DC voltage. In addition, an acceleration test at 150° C. and DC 25 kV/mm gave a mean life span as long as 800 hours or more and no rejections were found in the humidity resistance load test besides enabling a relatively low firing temperature of 1300° C. or less.

When the oxide $SiO_2$—$TiO_2$—XO has a composition outside of the composition described above as in the samples No. 1213 to 1219 in TABLE 20, on the contrary, sintering becomes insufficient or many rejection appear in the humidity resistance load test even after sintering as seen in the samples No. 1513 to 1519 in TABLE 27.

While a monolithic capacitor having, an insulation resistance of 5290 Ω•F or more and 310 Ω•F or more at 25° C. and 150° C., respectively, under a strong electric field of 10 kV/mm can be obtained as shown in the samples No. 1511 and 1512 in TABLE 29 by allowing $Al_2O_3$ and/or $ZrO_2$ in the $SiO_2$—TiO—XO oxides as in the sample No. 1211 and 1212 in Table 20, sintering property is extremely decreased when $Al_2O_3$ and $ZrO_2$ are added in an amounts of about 15 parts by weight or more and about 5 parts by weight or more, respectively, as in the samples No. 1217 and 1218 in TABLE 20.

Example 13

After preparing and weighing $TiCl_4$ and $Ba(NO_3)_2$ having a variety of purity as starting materials, the compounds were precipitated as titanyl barium oxalate ($BaTiO(C_2O_4)•4H_2O$)

by adding oxalic acid. This precipitate was decomposed by heating at a temperature of 1000° C. or more to synthesize four kinds of barium titanate listed in TABLE 1.

Oxides, carbonates or hydroxides of each component of the first side component were weighed so as to be a composition ratio (mole ratio) of $0.25Li_2O$–$0.65(0.30TiO_2$–$0.70SiO_2)$–$0.10Al_2O_3$ to obtain a powder by crushing and mixing.

Likewise, oxides, carbonates or hydroxides of each component of the second side component were weighed so as to be a composition ratio (mole ratio) of $0.66SiO_2$–$0.17TiO_2$–$0.15BaO$–$0.02MnO$ (mole ratio) to obtain a powder by crushing and mixing.

Oxide powders of the first and second side components were placed in separate platinum crucibles and heated at 1500° C. After quenching and crushing the mixture, each oxide powder with a mean particle size of 1 μm or less was obtained.

In the next step, $BaCO_3$ for adjusting the mole ratio Ba/Ti (m) in barium titanate, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $BaZrO_3$, MgO and MnO, each having a purity of 99% or more, were prepared. These raw material powders and the first or second side component were weighted so as to form compositions shown in TABLE 30 and TABLE 31. The amounts of addition of the first and second side components are indicated by parts by weight relative to 100 parts by weight of the essential component $(BaO)_mTiO_2+\beta R_2O_3+\gamma BaZrO_3+gMnO+hMgO$.

TABLE 30

| | | $(BaO)_m \cdot TiO_2 + \alpha R_2O_3 + \beta BaZrO_3 + \gamma MgO + gMnO$ | | | | | | | | |
|---|---|---|---|---|---|---|---|---|---|---|
| Sample | Kind of | | | | α | | | | | |
| No. | $BaTiO_3$ | $Eu_2O_3$ | $Gd_2O_3$ | $Tb_2O_3$ | $Dy_2O_3$ | $Ho_2O_3$ | $Er_2O_3$ | $Tm_2O_3$ | $Yb_2O_3$ | Total of α |
| *2001 | 2A | 0 | 0.0008 | 0 | 0 | 0 | 0 | 0 | 0 | 0.0008 |
| *2002 | 2A | 0 | 0 | 0 | 0.04 | 0.03 | 0 | 0 | 0 | 0.07 |
| *2003 | 2A | 0 | 0.02 | 0.02 | 0 | 0 | 0 | 0 | 0 | 0.04 |
| *2004 | 2A | 0 | 0 | 0 | 0.03 | 0 | 0 | 0 | 0 | 0.03 |
| *2005 | 2A | 0.02 | 0 | 0 | 0 | 0 | 0 | 0 | 0 | 0.02 |
| *2006 | 2A | 0 | 0.02 | 0.03 | 0 | 0 | 0 | 0 | 0.01 | 0.06 |
| *2007 | 2A | 0 | 0 | 0 | 0 | 0.01 | 0 | 0.01 | 0 | 0.02 |
| *2008 | 2A | 0 | 0 | 0 | 0.04 | 0 | 0.02 | 0 | 0 | 0.06 |
| *2009 | 2A | 0 | 0.04 | 0.01 | 0.01 | 0 | 0 | 0 | 0 | 0.06 |
| *2010 | 2A | 0 | 0 | 0 | 0 | 0.02 | 0 | 0 | 0 | 0.02 |
| *2011 | 2A | 0.03 | 0 | 0 | 0 | 0 | 0 | 0 | 0 | 0.03 |
| *2012 | 2A | 0.01 | 0 | 0 | 0 | 0 | 0 | 0 | 0 | 0.01 |
| *2013 | 2A | 0 | 0.02 | 0 | 0 | 0 | 0 | 0 | 0 | 0.02 |
| *2014 | 2A | 0 | 0 | 0.02 | 0 | 0 | 0 | 0 | 0 | 0.02 |
| *2015 | 2A | 0 | 0 | 0.01 | 0.02 | 0 | 0 | 0 | 0 | 0.03 |
| *2016 | 2A | 0 | 0 | 0 | 0.02 | 0 | 0 | 0 | 0 | 0.02 |
| *2017 | 2A | 0 | 0.01 | 0 | 0 | 0 | 0 | 0 | 0 | 0.01 |
| *2018 | 2D | 0 | 0 | 0 | 0.03 | 0 | 0 | 0 | 0 | 0.03 |
| 2019 | 2A | 0.02 | 0.01 | 0 | 0.02 | 0 | 0 | 0 | 0 | 0.05 |
| 2020 | 2B | 0 | 0 | 0 | 0.02 | 0 | 0 | 0 | 0 | 0.02 |
| 2021 | 2C | 0 | 0 | 0.02 | 0 | 0 | 0 | 0 | 0 | 0.06 |
| 2022 | 2A | 0.05 | 0 | 0 | 0 | 0 | 0 | 0 | 0.01 | 0.06 |
| 2023 | 2A | 0.01 | 0.01 | 0 | 0.04 | 0 | 0 | 0 | 0 | 0.06 |

| | $(BaO)_m \cdot TiO_2 + \alpha R_2O_3 + \beta BaZrO_3 + \gamma MgO + gMnO$ | | | | | Amount of addition of the first component | Amount of addition of the second component |
|---|---|---|---|---|---|---|---|
| Sample No. | β | γ | g | γ + g | m | (parts by weight) | (parts by weight) |
| *2001 | 0.02 | 0.0015 | 0.0015 | 0.003 | 1.005 | 1 | 0 |
| *2002 | 0.03 | 0.04 | 0.09 | 0.13 | 1.01 | 1 | 0 |
| *2003 | 0 | 0.04 | 0.038 | 0.078 | 1.01 | 1.5 | 0 |
| *2004 | 0.08 | 0.03 | 0.02 | 0.05 | 1.01 | 1.5 | 0 |
| *2005 | 0.02 | 0.001 | 0.039 | 0.04 | 1.01 | 1 | 0 |
| *2006 | 0.02 | 0.125 | 0.005 | 0.13 | 1.01 | 1.5 | 0 |
| *2007 | 0.03 | 0.039 | 0.001 | 0.04 | 1.01 | 1 | 0 |
| *2008 | 0.02 | 0.005 | 0.125 | 0.13 | 1.01 | 1 | 0 |
| *2009 | 0.03 | 0.04 | 0.1 | 0.14 | 1.01 | 1 | 0 |
| *2010 | 0.03 | 0.02 | 0.03 | 0.05 | 0.99 | 1 | 0 |
| *2011 | 0.04 | 0.03 | 0.02 | 0.05 | 1.00 | 1 | 0 |
| *2012 | 0.04 | 0.015 | 0.005 | 0.02 | 1.038 | 1 | 0 |
| *2013 | 0.02 | 0.02 | 0.03 | 0.05 | 1.05 | 0 | 1 |
| *2014 | 0.02 | 0.02 | 0.01 | 0.03 | 1.01 | 0 | 0 |
| *2015 | 0.03 | 0.02 | 0.03 | 0.05 | 1.01 | 5 | 0 |
| *2016 | 0.02 | 0.03 | 0.01 | 0.04 | 1.01 | 0 | 0 |

TABLE 30-continued

| | | | | | | | |
|---|---|---|---|---|---|---|---|
| *2017 | 0.02 | 0.015 | 0.005 | 0.02 | 1.01 | 0 | 4 |
| *2018 | 0.03 | 0.03 | 0.02 | 0.05 | 1.01 | 2 | 0 |
| 2019 | 0.02 | 0.05 | 0.07 | 0.12 | 1.015 | 1 | 0 |
| 2020 | 0.03 | 0.02 | 0.01 | 0.03 | 1.02 | 1 | 0 |
| 2021 | 0.03 | 0.12 | 0.002 | 0.122 | 1.03 | 1.5 | 0 |
| 2022 | 0.03 | 0.06 | 0.07 | 0.13 | 1.02 | 1 | 0 |
| 2023 | 0.03 | 0.002 | 0.12 | 0.122 | 1.01 | 0 | 1 |

TABLE 31

| | | $(BaO)_m \cdot TiO_2 + \alpha R_2O_3 + \beta BaZrO_3 + \gamma MgO + gMnO$ | | | | | | | | |
|---|---|---|---|---|---|---|---|---|---|---|
| Sample | Kind of | | | | $\alpha$ | | | | | |
| No. | $BaTiO_3$ | $Eu_2O_3$ | $Gd_2O_3$ | $Tb_2O_3$ | $Dy_2O_3$ | $Ho_2O_3$ | $Er_2O_3$ | $Tm_2O_3$ | $Yb_2O_3$ | Total of $\alpha$ |
| 2024 | 2A | 0 | 0 | 0 | 0.001 | 0 | 0 | 0 | 0 | 0.001 |
| 2025 | 2A | 0 | 0 | 0.01 | 0 | 0 | 0.01 | 0 | 0 | 0.02 |
| 2026 | 2A | 0 | 0 | 0 | 0.02 | 0 | 0 | 0.01 | 0 | 0.03 |
| 2027 | 2A | 0.02 | 0 | 0 | 0 | 0.02 | 0 | 0 | 0 | 0.04 |
| 2028 | 2A | 0 | 0.05 | 0 | 0 | 0 | 0 | 0 | 0 | 0.05 |
| 2029 | 2A | 0 | 0.02 | 0 | 0.04 | 0 | 0 | 0 | 0 | 0.06 |
| 2030 | 2A | 0 | 0 | 0 | 0.01 | 0 | 0.01 | 0 | 0 | 0.02 |
| 2031 | 2A | 0 | 0 | 0 | 0.01 | 0 | 0 | 0.01 | 0 | 0.02 |
| 2032 | 2A | 0 | 0.02 | 0 | 0 | 0 | 0.01 | 0 | 0 | 0.03 |
| 2033 | 2A | 0 | 0.01 | 0 | 0.01 | 0 | 0 | 0 | 0 | 0.02 |
| 2034 | 2A | 0 | 0 | 0.01 | 0 | 0 | 0 | 0 | 0 | 0.01 |
| 2035 | 2A | 0 | 0 | 0 | o.01 | 0 | 0 | 0 | 0 | 0.01 |
| 2036 | 2A | 0.01 | 0 | 0 | 0.01 | 0 | 0 | 0 | 0 | 0.02 |

| Sample | $(BaO)_m \cdot TiO_2 + \alpha R_2O_3 + \beta BaZrO_3 + \gamma MgO + gMnO$ | | | | | Amount of addition of the first component | Amount of addition of the second component |
|---|---|---|---|---|---|---|---|
| No. | $\beta$ | $\gamma$ | g | $\gamma + g$ | m | (parts by weight) | (parts by weight) |
| 2024 | 0.02 | 0.0015 | 0.0015 | 0.003 | 1.01 | 1 | 0 |
| 2025 | 0.02 | 0.02 | 0.03 | 0.05 | 1.01 | 1 | 0 |
| 2026 | 0.02 | 0.03 | 0.02 | 0.05 | 1.015 | 0 | 1 |
| 2027 | 0.02 | 0.03 | 0.05 | 0.08 | 1.01 | 0 | 1 |
| 2028 | 0.02 | 0.05 | 0.06 | 0.11 | 1.01 | 1 | 0 |
| 2029 | 0.02 | 0.06 | 0.062 | 0.122 | 1.01 | 1 | 0 |
| 2030 | 0.005 | 0.02 | 0.03 | 0.05 | 1.01 | 1 | 0 |
| 2031 | 0.06 | 0.02 | 0.02 | 0.04 | 1.01 | 1 | 0 |
| 2032 | 0.03 | 0.02 | 0.04 | 0.06 | 1.035 | 2 | 0 |
| 2033 | 0.03 | 0.02 | 0.03 | 0.05 | 1.015 | 0.2 | 0 |
| 2034 | 0.02 | 0.01 | 0.012 | 0.022 | 1.01 | 3 | 0 |
| 2035 | 0.03 | 0.015 | 0.005 | 0.02 | 1.01 | 0 | 0.2 |
| 2036 | 0.03 | 0.02 | 0.03 | 0.05 | 1.01 | 0 | 3 |

An organic solvent such as polyvinyl butyral binder and ethanol was added to the weighed compounds, which were mixed in a ball mill in an wet state to prepare a ceramic slurry. This ceramic slurry was formed into a sheet by a doctor blade method to obtain a rectangular shaped green sheet with a thickness of 35 μm, followed by printing an electroconductive paste mainly composed of Ni on the ceramic green sheet to form an electroconductive paste layer for forming inner electrodes.

Then, a plurality of the ceramic green sheets on which the electroconductive layer is formed were laminated so that the sides where the electroconductive paste projected are alternately placed, thus obtaining a monolithic body. This monolithic body was heated at 350° C. in a $N_2$ atmosphere and, after allowing the binder to decompose, the monolithic body was fired at the temperatures shown in TABLE 32 and TABLE 33 in a reducing atmosphere comprising $H_2$—$N_2$—$H_2O$ gases under an oxygen partial pressure of $10^{-9}$ to $10^{-12}$ MPa for two hours, thereby obtaining a ceramic sintered body.

Both side faces of the ceramic sintered body were coated with a silver paste containing $B_2O_3$—$Li_2O$—$SiO_2$—$BaO$ glass frit and fired at a temperature of 600° C. in a $N_2$ atmosphere, thereby obtaining outer electrodes electrically connected to the inner electrodes.

The overall dimensions of the monolithic ceramic capacitor thus obtained were 5.0 mm in width, 5.7 mm in length and 2.4 mm in thickness while the thickness of each dielectric ceramic layer was 30 μm. The total number of the effective dielectric ceramic layers were 57, the area of the confronting electrode per one layer being $8.2 \times 10^{-6}$ $m^2$.

Electric characteristics of these monolithic ceramic capacitors were measured. The electrostatic capacitance (C) and dielectric loss (tan δ) were measured using an automatic bridge type measuring instrument at 1 kHz, 1 Vrms and 25° C. and the dielectric constant (ε) was calculated from the electrostatic capacitance. Next, the insulation resistance was measured using an insulation resistance tester at 25° C. and 150° C. by impressing direct current voltages of 315 V (or 10 kV/mm) and 945 V (or 30 kV/mm) for 2 minutes, obtaining a product of the electrostatic capacitance and insulation resistance, or a product CR.

The rate of change of the electrostatic capacitance against temperature changes was also measured. The rate of change at −25° C. and 85° C. by taking the electrostatic capacitance at 20° C. as a standard ($\Delta C/C_{20}$), the rate of change at −55° C. and 125° C. by taking the electrostatic capacitance at 20° C. as a standard ($\Delta C/C_{25}$) and the maximum value of the rate of change ($|\Delta C|_{max}$) as an absolute value in the temperature range of −55° C. to 125° C. were measured as the electrostatic capacitances against temperature changes.

The DC vias characteristic was also evaluated. First, the electrostatic capacitance when an AC voltage of 1 kHz and 1 Vrms was impressed was measured. Then, the electrostatic capacitance when a DC voltage of 150 V and an AC voltage of 1 kHz and 1 Vrms were simultaneously impressed was measured, thereby the rate of reduction of the electrostatic capacitance ($\Delta C/C$) due to loading the DC voltage was calculated.

In the high temperature load test, a direct current voltage of 750 V (or 25 kV/mm) was impressed at 150° C. on 36 pieces of each sample to measure the time dependent changes of the insulation resistance. The time when the insulation resistance of each sample was reduced below $10^6$ Ω was defined to be a life span time and mean life span time was evaluated.

In the humidity resistance test, the number of the test pieces having an insulation resistance of $10^6$ Ω or less among the 72 test pieces were counted after impressing a DC voltage of 315 V under an atmospheric pressure of 2 atm (relative humidity 100%) at 120° C. for 250 hours.

Insulation breakdown voltages under AC and DC voltages were measured by impressing AC and DC voltages at a voltage increase rate of 100 V/sec.

The results described above are listed in TABLE 32 and TABLE 33.

TABLE 32

| Sample No. | Baking Temp. (° C.) | Dielectric Constant | Dielectric Loss tan δ (%) | Ratio of Temperature Dependent Capacitance Change (%) | | | | DC vias characteristic (%) $\Delta C/C$ 5 kV/mm |
|---|---|---|---|---|---|---|---|---|
| | | | | $\Delta C/C_{20}$ | | $\Delta C/C_{25}$ | | |
| | | | | −25° C. | 85° C. | −55° C. | 125° C. | Maximum value |
| *2001 | 1300 | 2030 | 0.8 | 2.4 | −8.6 | 4.3 | −12.5 | 13.4 | −56 |
| *2002 | 1300 | 860 | 1 | 3.5 | 14.9 | 6.5 | −23.4 | 23.4 | −14 |
| *2003 | 1280 | 1350 | 0.9 | 3.6 | −8.5 | 3.3 | −13.4 | 13.4 | −30 |
| *2004 | 1300 | 1420 | 1 | 3.5 | −13.2 | 4 | −28.6 | 28.6 | −36 |
| *2005 | 1280 | 1550 | 0.9 | 3.6 | −13.2 | 4 | −17.2 | 17.2 | −41 |
| *2006 | 1360 | 1080 | 2.5 | 2.9 | −9.1 | 4.5 | −12.8 | 12.8 | −16 |
| *2007 | Unmeasurable due to semiconductor formation | | | | | | | | |
| *2008 | 1280 | 1060 | 0.8 | 4.2 | −9.2 | 4.5 | −18.3 | 18.3 | −16 |
| *2009 | 1280 | 1040 | 2.5 | 3.1 | −9 | 4.1 | −13.5 | 13.5 | −15 |
| *2010 | | | | | | | | | |
| *2011 | 1300 | 1460 | 0.9 | 3.4 | −9.4 | 3.8 | −13.4 | 13.4 | −38 |
| *2012 | Unmeasurable due to insufficient sintering | | | | | | | | |
| *2013 | Unmeasurable due to insufficient sintering | | | | | | | | |
| *2014 | Unmeasurable due to insufficient sintering | | | | | | | | |
| *2015 | 1300 | 1470 | 2.7 | 3.5 | −9.3 | 4 | −12.9 | 12.9 | −39 |
| *2016 | Unmeasurable due to insufficient sintering | | | | | | | | |
| *2017 | 1300 | 1920 | 2.6 | 3.2 | −9.1 | 3.8 | −12.7 | 12.7 | −55 |
| *2018 | 1300 | 1050 | 0.8 | 3 | −8.7 | 4.2 | −13.5 | 13.5 | −15 |
| 2019 | 1280 | 1230 | 0.7 | 2.8 | −8.9 | 3.8 | −12.8 | 12.8 | −22 |
| 2020 | 1280 | 1560 | 0.8 | 2.7 | −9 | 3.8 | −13.6 | 13.6 | −42 |
| 2021 | 1280 | 1080 | 0.7 | 2.9 | −9.2 | 3.7 | −13.5 | 13.5 | −16 |
| 2022 | 1300 | 1060 | 0.8 | 3 | −9.4 | 3.9 | −13.7 | 13.7 | −16 |
| 2023 | 1300 | 1070 | 0.7 | 3.2 | −9 | 4 | −13.8 | 13.8 | −16 |

| Sample No. | Product CR (Ω · F) | | | | Insulation breakdown voltage (kV/mm) | | Humidity Resistance Load Test: Number of injects | Mean Life Span (h) |
|---|---|---|---|---|---|---|---|---|
| | 315 V Impressed Voltage | 945 V Impressed Voltage | 315 V Impressed Voltage | 945 V Impressed Voltage | | | | |
| | 25° C. | | 150° C. | | AC | DC | | |
| *2001 | 3040 | 2890 | 110 | 110 | 13 | 14 | 0/72 | 850 |
| *2002 | 5070 | 4820 | 240 | 230 | 13 | 14 | 0/72 | 170 |
| *2003 | 3020 | 2110 | 120 | >80 | 12 | 14 | 0/72 | 800 |
| *2004 | 5120 | 4860 | 210 | 200 | 12 | 14 | 0/72 | 120 |
| *2005 | 3040 | 2890 | 120 | 110 | 13 | 14 | 0/72 | 880 |
| *2006 | 5080 | 4830 | 220 | 210 | 12 | 14 | 49/72 | 180 |
| 2007 | Unmeasurable due to semiconductor formation | | | | | | | |
| *2008 | 3060 | 2910 | 140 | 130 | 12 | 14 | 0/72 | 110 |
| *2009 | 5080 | 4830 | 230 | 220 | 12 | 14 | 15/72 | 100 |
| *2010 | | | | | | | | |
| *2011 | 3180 | 3020 | t70 | 160 | 10 | 11 | 0/72 | 190 |
| *2012 | Unmeasurable due to insufficient sintering | | | | | | | |
| *2013 | Unmeasurable due to insufficient sintering | | | | | | | |
| *2014 | Unmeasurable due to insufficient sintering | | | | | | | |

TABLE 32-continued

| | | | | | | | | |
|---|---|---|---|---|---|---|---|---|
| *2015 | 3160 | 3000 | 180 | 170 | 10 | 12 | 0/72 | 150 |
| *2016 | Unmeasurable due to insufficient sintering | | | | | | | |
| *2017 | 3250 | 3090 | 170 | 160 | 11 | 11 | 0/72 | 120 |
| *2018 | 5140 | 4880 | 250 | 240 | 13 | 15 | 0/72 | 850 |
| 2019 | 5080 | 4830 | 260 | 250 | 12 | 15 | 0/72 | 890 |
| 2020 | 5060 | 4810 | 270 | 260 | 12 | 14 | 0/72 | 920 |
| 2021 | 5200 | 4940 | 280 | 270 | 12 | 15 | 0/72 | 890 |
| 2022 | 5160 | 4900 | 260 | 250 | 12 | 14 | 0/72 | 850 |
| 2023 | 5220 | 4960 | 250 | 240 | 13 | 15 | 0/72 | 900 |

TABLE 33

| Sample No. | Baking Temp. (° C.) | Dielectric Constant | Dielectric Loss tan δ (%) | Ratio of Temperature Dependent Capacitance Change (%) | | | | | DC vias characteristic (%) |
|---|---|---|---|---|---|---|---|---|---|
| | | | | $\Delta C/C_{20}$ | | $\Delta C/C_{25}$ | | Maximum value | $\Delta C/C$ 5 kV/mm |
| | | | | -25° C. | 85° C. | -55° C. | 125° C. | | |
| 2024 | 1300 | 2010 | 0.9 | 3.4 | -8.9 | 4 | -13.6 | 14 | -56 |
| 2025 | 1300 | 1530 | 0.8 | 3.4 | -8.7 | 4.1 | -12.9 | 13 | -42 |
| 2026 | 1280 | 1470 | 0.8 | 3 | -8.8 | 3.9 | -13 | 13 | -38 |
| 2027 | 1280 | 1360 | 0.7 | 2.9 | -8.9 | 3.8 | -12.8 | 13 | -32 |
| 2028 | 1300 | 1220 | 0.7 | 3.5 | -9.2 | 3.5 | -13.2 | 13 | -22 |
| 2029 | 1300 | 1050 | 0.7 | 3.3 | -9.3 | 3.8 | -13.8 | 14 | -15 |
| 2030 | 1300 | 1550 | 0.7 | 3.2 | -9.1 | 3.8 | -13.5 | 14 | -41 |
| 2031 | 1280 | 1570 | 0.7 | 3 | -9 | 4 | -12.8 | 13 | -41 |
| 2032 | 1280 | 1430 | 0.7 | 3.5 | -8.9 | 4.1 | -13 | 13 | -37 |
| 2033 | 1300 | 1580 | 0.7 | 4 | -8.8 | 3.9 | -13.7 | 14 | -41 |
| 2034 | 1300 | 1600 | 0.7 | 4.1 | -8.7 | 3.9 | -13.5 | 14 | -45 |
| 2035 | 1300 | 1600 | 0.7 | 3.2 | -9 | 3.5 | -13.9 | 14 | -45 |
| 2036 | 1280 | 1540 | 0.7 | 3.5 | -8.9 | 3.6 | -12.9 | 13 | -43 |

| Sample No. | 315 V Impressed Voltage 25° C. | 945 V Impressed Voltage 25° C. | 315 V Impressed Voltage 150° C. | 945 V Impressed Voltage 150° C. | breakdown voltage (kV/mm) AC | breakdown voltage (kV/mm) DC | Resistance Load Test: Number of rejects | Mean Life Span (h) |
|---|---|---|---|---|---|---|---|---|
| 2024 | 5260 | 5000 | 250 | 240 | 12 | 14 | 0/72 | 830 |
| 2025 | 5280 | 5020 | 280 | 270 | 12 | 14 | 0/72 | 840 |
| 2026 | 5100 | 4850 | 240 | 230 | 13 | 14 | 0/72 | 890 |
| 2027 | 5160 | 4900 | 260 | 250 | 12 | 14 | 0/72 | 820 |
| 2028 | 5290 | 5030 | 230 | 220 | 13 | 14 | 0/72 | 870 |
| 2029 | 5060 | 4810 | 210 | 200 | 12 | 14 | 0/72 | 000 |
| 2030 | 5120 | 4860 | 260 | 250 | 12 | 14 | 0/72 | 830 |
| 2031 | 5180 | 4920 | 250 | 240 | 12 | 15 | 0/72 | 810 |
| 2032 | 5280 | 5020 | 250 | 240 | 12 | 14 | 0/72 | 860 |
| 2033 | 5160 | 4900 | 230 | 220 | 12 | 14 | 0/72 | 810 |
| 2034 | 5090 | 4840 | 260 | 250 | 12 | 14 | 0/72 | 870 |
| 2035 | 5100 | 4850 | 250 | 240 | 13 | 14 | 0/72 | 850 |
| 2036 | 5160 | 4900 | 280 | 270 | 13 | 14 | 0/72 | 880 |

It is evident from Table 30 to TABLE 33 that the monolithic ceramic capacitor according to the present invention has a capacitance decreasing ratio of as small as within −45% at an impressed voltage of 5 kV/mm and a dielectric loss of less than 1.0 %, wherein the rate of change against temperature changes satisfies both the B-level characteristic standard stipulated in the JIS Standard in the temperature range of −25° C. to +85° C. and X7R-level characteristic standard stipulated in the EIA standard in the temperature range of −55° C. to +125° C.

Moreover, the insulation resistances at 25° C. and 150° C. as expressed by the product CR show as high values as 5000 Ω•F or more and 200 Ω•F or more, respectively, when the ceramic capacitor is used under a high electric field strength of 10 kV/mm. The insulation breakdown voltage also shows high values of 12 kV/mm or more under the AC voltage and 14 kV/mm or more under the DC voltage. In addition, an acceleration test at 150° C. and DC 25 kV/mm gave a mean life span as long as 800 hours or more besides enabling a relatively low firing temperature of 1300° C. or less.

The reason why the composition was limited in the present invention will be described hereinafter.

In the composition of $(BaO)_m TiO_2 + \beta R_2O_3 + \gamma BaZrO_3 + gMnO + hMgO$ (wherein $R_2O_3$ represents at least one compound selected from $Eu_2O_3$, $Gd_2O_3$, $Tb_2O_3$, $Dy_2O_3$, $Ho_2O_3$, $Er_2O_3$, $Tm_2O_3$ and $Yb_2O_3$, β, γ, representing mole ratio, respectively), a $R_2O_3$ content β of less than about 0.001 as shown in the sample No. 2001 is not preferable because the insulation resistance is low and the product CR becomes small. On the other hand, a $R_2O_3$ content β of more than about 0.06 as shown in the sample No. 2002 is also not preferable because the temperature characteristic does not satisfy the B-level/X7R characteristics, being poor in reliability. Accordingly, the preferable range of the $R_2O_3$ content β is $0.001 \leq \beta \leq 0.06$.

A BaZrO$_3$ content γ of zero as in the sample No. 2003 is not preferable since the insulation resistance is low and the voltage dependency of the insulating resistance is larger than that of the composition system containing BaZrO$_3$. It is also not preferable that the BaZrO$_3$ content γ is more than about 0.06 as in the sample No. 2004 because the temperature characteristic does not satisfy the B-level/X7R characteristics, along with shortening the mean life span. Accordingly, the preferable range of the BaZrO$_3$ content γ is 0.005≦γ≦0.06.

It is not preferable that, as seen in the sample No. 2005, the MgO content h is about 0.001 since the insulation resistance becomes low and the temperature characteristic does not satisfy the B-level/X7R characteristics. On the other hand, it is not preferable that the MgO content h exceeds about 0.12 as in the sample No. 2006, because the sintering temperature becomes high, the dielectric loss exceeds 2.0%, the number of rejections in the humidity resistance load test is extremely increased and with the mean life span being short. Accordingly, the preferable range of the MgO content h is in the range of 0.001≦h≦0.12.

It is not preferable that, as seen in the sample No. 2007, the MnO content g is 0.001 since measurement becomes impossible due to formation of semiconductors. It is not preferable, on the other hand, that the MnO content g exceeds about 0.12 as seen in the sample No. 2008 because the temperature characteristic X7R is not satisfied and the insulation resistance is lowered and the mean life span becomes short. Accordingly, the preferable range of the MnO content g is in the range of 0.001<g≦0.12.

It is not preferable that, as in the sample No. 2009, the combined amount of g+h of the MnO content and MgO content exceeds about 0.13 because the dielectric loss is increased to 2.0% and the mean life span is shortened and the rejection number in the humidity resistance load test increases. Accordingly, the combined amount of g+h of the MnO content and Mg content is preferably in the range of g+h≦0.13.

It is not preferable that the BaO/TiO$_2$ ratio m is less than about 1.000 as in the sample No. 2010 because measurements are impossible due to formation of semiconductors. It is also not preferable that, as seen in the sample No. 2011, the BaO/TiO$_2$ ratio m is about 1.000 since the insulation resistance as well as the AC and DC breakdown voltage becomes low along with shortening the mean life span. It is not preferable, on the other hand, that the BaO/TiO$_2$ ratio m is over about 1.035 as in the samples No. 2012 and 2013 since measurements becomes impossible due to insufficient sintering. Accordingly, the BaO/TiO$_2$ ratio m in the range of 1.000<m≦1.035 is preferable.

It is not preferable that the amount of addition of the first or second side component is zero as in the samples No. 2014 and 2016 because measurements are impossible due to insufficient sintering. It is not preferable that the amount of addition of the first or second side component exceeds about 3.0 parts by weight as seen in the samples No. 2015 and 2017, on the other hand, because the dielectric loss exceeds 1.0% and the insulation resistance and insulation breakdown voltage are lowered along with shortening the mean life span. Accordingly, the preferable content of either the first or the second components is 0.2 to 3.0 parts by weight.

The content of the alkali earth metal oxides contained in barium titanate as impurities is below about 0.02% by weight because when the contents of the alkali earth metal oxides exceeds about 0.02% by weight as in the sample No. 2018, the dielectric constant is decreased.

Example 14

A material with a composition of BaO$_{1.010}$·TiO$_2$+ 0.03Gd$_2$O$_3$+0.025BaZrO$_3$+0.05MgO+0.01 MnO (mole ratio) was prepared using barium titanate A of TABLE 1 as a dielectric powder. A monolithic ceramic capacitor was produced by the same method as in Example 13, except that an oxide represented by Li$_2$O—(Si, Ti)O$_2$—MO shown in Table 34, having a mean particle size of 1 μm or less produced by heating the material described above at 1200 to 1500° C., was added as the first side component. The overall dimensions of the monolithic ceramic capacitor produced is the same as in Example 13.

The electric characteristics were then measured by the same as in Example 13. The results are shown in TABLE 35.

TABLE 34

| | The first side component | | | | |
| --- | --- | --- | --- | --- | --- |
| Sample No. | Amount of addition (parts by weight) | Composition (mol %, except w) | | | |
| | | Li$_2$O | (Si$_w$Ti$_{1-w}$)O$_2$ | w | Al$_2$O$_3$ | ZrO$_2$ |
| 2101 | 1 | 20 | 80 | 0.3 | 0 | 0 |
| 2102 | 1 | 10 | 80 | 0.6 | 5 | 5 |
| 2103 | 0.8 | 10 | 70 | 0.5 | 20 | 0 |
| 2104 | 0.8 | 35 | 45 | 1 | 10 | 10 |
| 2105 | 1.5 | 45 | 45 | 0.5 | 10 | 0 |
| 2106 | 1.5 | 45 | 55 | 0.3 | 0 | 0 |
| 2107 | 1 | 20 | 70 | 0.6 | 5 | 5 |
| 2108 | 1 | 20 | 70 | 0.4 | 10 | 0 |
| 2109 | 1.2 | 30 | 60 | 0.7 | 5 | 5 |
| 2110 | 1.2 | 30 | 60 | 0.8 | 10 | 0 |
| 2111 | 2 | 40 | 50 | 0.6 | 5 | 5 |
| 2112 | 2 | 40 | 50 | 0.9 | 0 | 10 |
| 2113 | 1.5 | 10 | 85 | 0.4 | 5 | 0 |
| 2114 | 2 | 5 | 75 | 0.6 | 10 | 10 |
| 2115 | 1.2 | 20 | 55 | 0.5 | 25 | 0 |
| 2116 | 1 | 45 | 40 | 0.8 | 0 | 15 |
| 2117 | 0.8 | 50 | 45 | 0.7 | 5 | 0 |
| 2118 | 1.2 | 25 | 75 | 0.9 | 0 | 0 |
| 2119 | 1.5 | 25 | 75 | 1 | 0 | 0 |
| 2120 | 1 | 35 | 65 | 0.9 | 0 | 0 |
| 2121 | 1.5 | 35 | 65 | 1 | 0 | 0 |
| 2122 | 1.2 | 20 | 70 | 0.2 | 0 | 10 |

TABLE 35

| Sample No. | Baking Temp. (° C.) | Dielectric Constant | Dielectric Loss tan δ (%) | Ratio of Temperature Dependent Capacitance Change (%) | | | | Maximum value | DC vias characteristic (%) ΔC/C 5 kV/mm |
|---|---|---|---|---|---|---|---|---|---|
| | | | | ΔC/C$_{20}$ −25° C. | 85° C. | ΔC/C$_{25}$ −55° C. | 125° C. | | |
| 2101 | 1280 | 1430 | 0.8 | 3.6 | −9 | 4.2 | −13.4 | 13 | −37 |
| 2102 | 1280 | 1460 | 0.8 | 3.8 | −8.7 | 3.8 | −13.5 | 14 | −37 |
| 2103 | 1280 | 1490 | 0.8 | 4.1 | −8.9 | 3.9 | −13.6 | 14 | −40 |
| 2104 | 1300 | 1420 | 0.8 | 4 | −9 | 4 | −14 | 14 | −35 |
| 2105 | 1300 | 1430 | 0.9 | 3.2 | −9.2 | 4.2 | −13.8 | 14 | −36 |
| 2106 | 1280 | 1400 | 0.8 | 3.6 | −9.4 | 3.7 | −13.7 | 14 | −35 |
| 2107 | 1280 | 1460 | 0.8 | 3.5 | −8.8 | 3.5 | −13.9 | 14 | −38 |
| 2108 | 1280 | 1460 | 0.8 | 4 | −9.5 | 3.9 | −12.8 | 13 | −38 |
| 2109 | 1280 | 1420 | 0.9 | 3.8 | −9.6 | 4.2 | −12.5 | 13 | −36 |
| 2110 | 1300 | 1470 | 0.8 | 3.5 | −9.7 | 3.5 | −13 | 13 | −38 |
| 2111 | 1300 | 1430 | 0.8 | 3.9 | −9.5 | 4.2 | −13.8 | 14 | −35 |
| 2112 | 1280 | 1420 | 0.8 | 4 | −9.6 | 4.3 | −13.6 | 14 | −35 |
| 2113 | 1350 | Unmeasurable due to insufficient sintering | | | | | | | |
| 2114 | 1350 | Unmeasurable due to insufficient sintering | | | | | | | |
| 2115 | 1350 | 1230 | 1.8 | 3.5 | −9.1 | 4 | −13.8 | 14 | −22 |
| 2116 | 1350 | Unmeasurable due to insufficient sintering | | | | | | | |
| 2117 | 1350 | Unmeasurable due to insufficient sintering | | | | | | | |
| 2118 | 1300 | 1480 | 0.9 | 3.8 | −9.3 | 4.6 | −13.5 | 14 | −37 |
| 2119 | 1350 | 1200 | 1.6 | 3.2 | −8.8 | 3.8 | −12.9 | 13 | −20 |
| 2120 | 1300 | 1450 | 0.9 | 3 | −8.9 | 3.8 | −13.7 | 14 | −38 |
| 2121 | 1350 | 1210 | 1.4 | 3.8 | −8.9 | 3.5 | −13.6 | 14 | −21 |
| 2122 | 1350 | 1190 | 1.5 | 3.6 | −9 | 4 | −13.5 | 14 | −20 |

| Sample No. | Product CR (Ω · F) | | | | Insulation breakdown voltage (kV/mm) | | Humidity Resistance Load Test: Number of reject | Mean Life Span (h) |
|---|---|---|---|---|---|---|---|---|
| | 315 V Impressed Voltage 25° C. | 945 V Impressed Voltage 25° C. | 315 V Impressed Voltage 150° C. | 945 V Impressed Voltage 150° C. | AC | DC | | |
| 2101 | 5240 | 4980 | 240 | 230 | 12 | 14 | 0/72 | 850 |
| 2102 | 5130 | 4870 | 220 | 210 | 12 | 14 | 0/72 | 890 |
| 2103 | 5170 | 4910 | 220 | 210 | 12 | 14 | 0/72 | 870 |
| 2104 | 5090 | 4840 | 230 | 220 | 12 | 14 | 0/72 | 830 |
| 2105 | 5080 | 4830 | 220 | 210 | 13 | 14 | 0/72 | 840 |
| 2106 | 5100 | 4850 | 210 | 200 | 12 | 14 | 0/72 | 850 |
| 2107 | 5160 | 4900 | 210 | 200 | 13 | 14 | 0/72 | 890 |
| 2108 | 5240 | 4980 | 210 | 200 | 12 | 15 | 0/72 | 840 |
| 2109 | 5230 | 4970 | 210 | 200 | 12 | 14 | 0/72 | 830 |
| 2110 | 5200 | 4940 | 210 | 200 | 12 | 14 | 0/72 | 840 |
| 2111 | 5180 | 4920 | 220 | 210 | 13 | 14 | 0/72 | 890 |
| 2112 | 5270 | 5010 | 220 | 210 | 12 | 14 | 0/72 | 900 |
| 2113 | Unmeasurable due to insufficient sintering | | | | | | | |
| 2114 | Unmeasurable due to insufficient sintering | | | | | | | |
| 2115 | 3800 | 3610 | 150 | 140 | 11 | 12 | 26/72 | 150 |
| 2116 | Unmeasurable due to insufficient sintering | | | | | | | |
| 2117 | Unmeasurable due to insufficient sintering | | | | | | | |
| 2118 | 5160 | 4900 | 220 | 210 | 12 | 14 | 0/72 | 860 |
| 2119 | 3860 | 3670 | 120 | 110 | 11 | 12 | 20/72 | 160 |
| 2120 | 5230 | 4970 | 230 | 220 | 12 | 14 | 0/72 | 840 |
| 2121 | 3810 | 3620 | 130 | 120 | 11 | 12 | 34/72 | 130 |
| 2122 | 3850 | 3660 | 100 | 90 | 11 | 12 | 29/72 | 180 |

As is evident from TABLE 34 and TABLE 35, preferable results are obtained in the samples No. 2101 to 2112, 2118 and 2120 in which the oxides with compositions within or on the boundary lines of the area surrounded by the straight lines connecting A (x=20, y=80, z=0), B (x=10, y 80, z=10), C (x=10, y=70, z=20), D (x=35, y=45, z=20), E (x=45, y=45, (x=45, y=55, z=0) (wherein x, y and z represent mole % and w represents mole ratio, w being in the range of $0.3 \leq w < 1.0$ when it falls on the line A-F) of the three component phase diagram of the oxides represented by $Li_2O$—$(Si_{1-w}, Ti_{1-w})_2$—MO shown in FIG. 4 are added, wherein the samples have a capacitance decreasing ratio of as small as within −45% at an impressed voltage of 5 kV/mm and a dielectric loss of 1.0% or less, along with the rate of change of the electrostatic capacitance against temperature changes satisfying the B-level characteristic standard stipulated in the JIS Standard in the temperature range of −25° C. to +85° C. and X7R-level characteristic standard stipulated in the EIA standard in the temperature range of −55° C. to +125° C.

Moreover, the insulation resistances at 25° C. and 150° C. as expressed by the product CR show as high values as 5000 Ω•F or more and 200 Ω•F or more, respectively, when the ceramic capacitor is used under a high electric field strength of 10 kV/mm. The insulation breakdown voltage also shows high values of 12 kV/mm or more under the AC voltage and 14 kV/mm or more under the DC voltage. In addition, an acceleration test at 150° C. and DC 25 kV/mm gave a mean life span as long as 800 hours or more besides enabling a relatively low firing temperature of 1300° C. or less.

When the oxide represented by $Li_2O$—$(Si_wTi_{1-w})O_2$—MO has a composition outside of the composition described above as in the samples No. 2113 to 2117 and 2119, on the other hand, sintering becomes insufficient or many rejection appear in the humidity resistance load test even after sintering. When the composition falls on the line A-F and w=1.0, the sintering temperature becomes high, giving a lot of rejections in the humidity resistance load test as shown in the samples No. 2119 and 2121. When the value of w is less than 3.0, the sintering temperature becomes so high that many rejections appear in the humidity resistance test as shown in Sample No. 2122.

Example 15

A material with a composition of $BaO_{1.010}@TiO_2$+ $0.03Dy_2O_3$+$0.02BaZrO_3$+$0.05$ $MgO$+$0.01$ $MnO$ (mole ratio) was prepared using barium titanate A of TABLE 1 as a dielectric powder. A monolithic ceramic capacitor was produced by the same method as in Example 13, except that an oxide represented by $SiO_2$—$TiO_2$—XO shown in Table 36, having a mean particle size of 1 μm or less produced by heating the material described above at 1200 to 1500 ° C., was added as the second side component. The amounts of addition of $Al_2O_3$ and $ZrO_3$ are indicated by parts by weight relative to 100 parts by weight of the second side component ($xSiO_2$-$yTiO_2$—zXO). The overall dimensions of the monolithic ceramic capacitor produced is the same as in Example 13.

The electric characteristics were then measured by the same method as in Example 13. The results are shown in TABLE 37.

TABLE 36

| | | | | The second side component | | | | | | | | |
|---|---|---|---|---|---|---|---|---|---|---|---|---|
| | Amount of addition | | | Essential component (mol %) | | | | | | | Added component (Parts by weight) | |
| Sample | (Parts by | | | | | XO | | | | | | |
| N0. | Weight) | $SiO_2$ | $TiO_2$ | BaO | CaO | SrO | MgO | ZnO | MnO | Total | $Al_2O_3$ | $ZrO_2$ |
| 2201 | 1 | 85 | 1 | 1 | 0 | 0 | 0 | 4 | 9 | 14 | 0 | 0 |
| 2202 | 1 | 35 | 51 | 0 | 10 | 0 | 0 | 0 | 4 | 14 | 0 | 0 |
| 2203 | 1 | 30 | 20 | 0 | 30 | 0 | 15 | 4 | 1 | 50 | 0 | 0 |
| 2204 | 1 | 39 | 1 | 20 | 20 | 2 | 0 | 13 | 5 | 60 | 0 | 0 |
| 2205 | 1 | 70 | 10 | 5 | 5 | 0 | 0 | 10 | 0 | 20 | 0 | 0 |
| 2206 | 1 | 45 | 10 | 0 | 0 | 0 | 0 | 15 | 30 | 45 | 0 | 0 |
| 2207 | 1 | 50 | 20 | 10 | 10 | 3 | 7 | 0 | 0 | 30 | 0 | 0 |
| 2208 | 1 | 50 | 30 | 0 | 16 | 0 | 0 | 0 | 4 | 20 | 0 | 0 |
| 2209 | 1 | 35 | 30 | 25 | 10 | 0 | 0 | 0 | 0 | 35 | 0 | 0 |
| 2210 | 1 | 40 | 40 | 10 | 0 | 0 | 0 | 5 | 5 | 20 | 0 | 0 |
| 2211 | 1 | 45 | 22 | 3 | 30 | 0 | 0 | 0 | 0 | 33 | 15 | 0 |
| 2212 | 1 | 45 | 22 | 3 | 30 | 0 | 0 | 0 | 0 | 33 | 10 | 5 |
| 2213 | 1 | 65 | 25 | 5 | 5 | 0 | 0 | 0 | 0 | 10 | 0 | 0 |
| 2214 | 1 | 25 | 40 | 15 | 0 | 10 | 0 | 5 | 5 | 35 | 0 | 0 |
| 2215 | 1 | 30 | 10 | 30 | 25 | 0 | 0 | 5 | 0 | 60 | 0 | 0 |
| 2216 | 1 | 50 | 0 | 35 | 15 | 0 | 0 | 0 | 0 | 50 | 0 | 0 |
| 2217 | 1 | 45 | 22 | 30 | 0 | 0 | 3 | 0 | 0 | 33 | 25 | 0 |
| 2218 | 1 | 45 | 22 | 30 | 0 | 3 | 0 | 0 | 0 | 33 | 0 | 15 |
| 2219 | 1 | 30 | 60 | 10 | 0 | 0 | 0 | 0 | 0 | 10 | 0 | 0 |

TABLE 37

| Sample No. | Baking Temp. (°C.) | Dielectric Constant | Dielectric Loss tan δ (%) | Ratio of Temperature Dependent Capacitance Change (%) | | | | DC vias characteristic (%) Maximum value | DC vias characteristic ΔC/C 5 k V/mm | Product CR (Ω · F) 315 V Impressed Voltage 25° C. | Product CR (Ω · F) 945 V Impressed Voltage 25° C. | 315 V Impressed Voltage 150° C. | 945 V Impressed Voltage 150° C. | Insulation breakdown voltage (kV/mm) AC | Insulation breakdown voltage (kV/mm) DC | Humidity Resistance Load Test Number of reject | Mean Life Span (h) |
|---|---|---|---|---|---|---|---|---|---|---|---|---|---|---|---|---|---|
| | | | | ΔC/C$_{20}$ -25° C. | ΔC/C$_{20}$ 85° C. | ΔC/C$_{25}$ -55° C. | ΔC/C$_{25}$ 125° C. | | | | | | | | | | |
| 2101 | 1300 | 1040 | 0.7 | 3.4 | −9.5 | 3.6 | −13.9 | 14 | −16 | 5070 | 4820 | 210 | 200 | 13 | 15 | 0/72 | 880 |
| 2102 | 1280 | 1060 | 0.7 | 3.5 | −8.9 | 4 | −14.2 | 14 | −17 | 5090 | 48A0 | 210 | 200 | 12 | 14 | 0/72 | 850 |
| 2103 | 1280 | 1100 | 0.7 | 3.8 | −9.1 | 3.9 | −13.8 | 14 | −18 | 5100 | 4850 | 220 | 210 | 12 | 15 | 0/72 | 800 |
| 2104 | 1300 | 1070 | 0.7 | 4 | −9 | 4.2 | −13.5 | 14 | −17 | 5120 | 4860 | 210 | 200 | 12 | 14 | 0/72 | 900 |
| 2105 | 1300 | 1020 | 0.7 | 4.2 | −9.2 | 4.3 | −13.6 | 14 | −15 | 5130 | 4870 | 210 | 200 | 13 | 14 | 0/72 | 920 |
| 2106 | 1280 | 1080 | 0.7 | 3.9 | −8.8 | 4.5 | −13.7 | 14 | −17 | 5080 | 4830 | 230 | 220 | 13 | 15 | 0/72 | 840 |
| 2107 | 1280 | 1100 | 0.7 | 3.4 | −8.7 | 4.5 | −14 | 14 | −18 | 5080 | 4830 | 210 | 200 | 12 | 14 | 0/72 | 860 |
| 2108 | 1300 | 1060 | 0.7 | 3.6 | −8.9 | 4.2 | −13.5 | 14 | −17 | 5120 | 4860 | 220 | 210 | 12 | 14 | 0/72 | 920 |
| 2109 | 1300 | 1090 | 0.7 | 4.1 | −8.8 | 4 | −13.6 | 14 | −18 | 5160 | 4900 | 220 | 210 | 12 | 14 | 0/72 | 900 |
| 2t10 | 1300 | 1050 | 0.7 | 3.8 | −9 | 4.3 | −13.7 | 14 | −17 | 5150 | 4890 | 210 | 200 | 12 | 14 | 0/72 | 880 |
| 2111 | 1280 | 1070 | 0.7 | 3.9 | −9.2 | 4.2 | −13.3 | 13 | −17 | 5430 | 5160 | 310 | 300 | 12 | 15 | 0/72 | 870 |
| 2112 | 1300 | 1080 | 0.7 | 4 | −9.4 | 4 | −13.5 | 14 | −18 | 5450 | 5180 | 320 | 300 | 12 | 14 | 0/72 | 900 |
| 2113 | 1350 | 860 | 1.4 | 3.5 | −8.7 | 3.9 | −13.6 | 14 | −14 | 3790 | 3600 | 150 | 140 | 11 | 13 | 45/72 | 160 |
| 2114 | 1350 | Unmeasurable due to insufficient sintering | | | | | | | | | | | | | | | |
| 2115 | 1350 | Unmeasurable due to insufficient sintering | | | | | | | | | | | | | | | |
| 2116 | 1350 | 830 | 1.3 | 3.6 | −8.8 | 3.9 | −13.7 | 14 | −14 | 3860 | 3670 | 130 | 120 | 11 | 12 | 68/72 | 180 |
| 2117 | 1350 | Unmeasurable due to insufficient sintering | | | | | | | | | | | | | | | |
| 2118 | 1350 | Unmeasurable due to insufficient sintering | | | | | | | | | | | | | | | |
| 2119 | 1350 | Unmeasurable due to insufficient sintering | | | | | | | | | | | | | | | |

As is evident from TABLE 36 and TABLE 37, preferable results are obtained in the samples No. 2201 to 2212, in which oxides with compositions within or on the boundary lines of the area surrounded by the straight lines connecting A (x=85, y=1, z=14), B (x=35, y=51, z=14), C (x=30, y=20, z=50) and D (x=39, y=1, z=60), (wherein x, y and z represent mole %), of the three component phase diagram of the oxides represented by $SiO_2$—$TiO_2$—XO shown in FIG. 5 are added, wherein the samples have a capacitance decreasing ratio of as small as within −45% at an impressed voltage of 5 kV/mm and a dielectric loss of 1.0% or less, along with the rate of change of the electrostatic capacitance against temperature changes satisfying the B-level characteristic standard stipulated in the JIS Standard in the temperature range of −25° C. to +85° C. and X7R-level characteristic standard stipulated in the EIA standard in the temperature range of −55° C. to +125° C.

Moreover, the insulation resistances at 25° C. and 150° C. as expressed by the product CR show as high values as 5000 Ω•F or more and 200 Ω•F or more, respectively, when the ceramic capacitor is used under a high electric field strength of 10 kV/mm. The insulation breakdown voltage also shows high values of 12 kV/mm or more under the AC voltage and 14 kV/mm or more under the DC voltage. In addition, an acceleration test at 150° C. and DC 25 kV/mm gave a mean life span as long as 800 hours or more and no rejections were found in the humidity resistance load test besides enabling a relatively low firing temperature of 1300° C. or less.

When the oxide represented by $SiO_2$—$TiO_2$—XO has a composition outside of the composition described above as in the samples No. 2114, 2115 and 2117 to 2119, on the contrary, sintering becomes insufficient or many rejection appear in the humidity resistance load test even after sintering.

While a monolithic capacitor having an insulation resistance of 5400 Ω•F or more and 300 Ω•F or more at 25° C. and 150° C., respectively, under a strong electric field of 10 kV/mm can be obtained by allowing $Al_2O_3$ and/or $ZrO_2$ in the $SiO_2$—$TiO_2$—XO oxides as in the sample No. 2211 and 2212, the sintering, property is extremely decreased when $Al_2O_3$ and $ZrO_2$ are added in an amounts of about 15 parts by weight or more and about 5 parts by weight or more, respectively, as in the samples No. 2217 and 2218.

Example 16

Four kinds of barium titanate ($BaTiO_3$), an oxide powder as a first side component and an oxide powder as a second side component were obtained by the same method as in Example 13.

Then, $BaCO_3$ for adjusting the mole ratio Ba/Ti in barium titanate, $Eu_2O_3$, $Gd_2O_3$, $Tb_2O_3$, $Dy_2O_3$, $Ho_2O_3$, $Er_2O_3$, $Tm_2O_3$ and $Yb_2O_3$, and MnO, each having a purity of 99% or more, were prepared. These raw material powders and the oxides described above as either the first or the second component were weighed so as to be the composition in TABLE 38 and TABLE 39. The amounts of addition of the first and second side components are defined by the amount of addition relative to 100 parts by weight of $(BaO)_m TiO_2 + \alpha R_2O_3 + \gamma BaZrO_3 + gMnO$. A monolithic ceramic capacitor was produced by the same method as in Example 13 using these weighed materials. The overall dimensions of the monolithic ceramic capacitor are the same as in Example 13.

TABLE 38

| Sample No. | Kind of BaTiO$_3$ | (BaO)$_m$ · TiO$_2$ + αR$_2$O$_3$ + βBaZrO$_3$ + γMnO | | | | | | | | | | | Amount of addition of the first component (parts by weight) | Amount of addition of the second component (parts by weight) |
|---|---|---|---|---|---|---|---|---|---|---|---|---|---|---|---|
| | | α | | | | | | | | | | | | | |
| | | Eu$_2$O$_3$ | Gd$_2$O$_3$ | Tb$_2$O$_3$ | Dy$_2$O$_3$ | Ho$_2$O$_3$ | Er$_2$O$_3$ | Tm$_2$O$_3$ | Yb$_2$O$_3$ | Total of α | β | γ | m | | |
| *2301 | A | 0 | 0.0007 | 0 | 0 | 0 | 0 | 0 | 0 | 0.0007 | 0.03 | 0.0014 | 1.005 | 1 | 0 |
| *2302 | A | 0 | 0 | 0.02 | 0 | 0.055 | 0 | 0 | 0 | 0.075 | 0.02 | 0.0128 | 1.01 | 1 | 0 |
| *2303 | A | 0.01 | 0 | 0 | 0.025 | 0 | 0 | 0 | 0 | 0.035 | 0 | 0.07 | 1.015 | 2 | 0 |
| *2304 | A | 0 | 0.01 | 0 | 0 | 0.01 | 0 | 0.01 | 0 | 0.03 | 0.07 | 0.06 | 1.01 | 2.5 | 0 |
| *2305 | A | 0.04 | 0 | 0 | 0 | 0 | 0 | 0 | 0 | 0.04 | 0.025 | 0.001 | 1.01 | 1 | 0 |
| *2306 | A | 0 | 0 | 0 | 0.02 | 0 | 0.03 | 0 | 0 | 0.05 | 0.03 | 0.145 | 1.01 | 1 | 0 |
| *2307 | A | 0 | 0 | 0.02 | 0 | 0 | 0 | 0 | 0.01 | 0.03 | 0.03 | 0.06 | 0.99 | 0 | 1 |
| *2308 | A | 0 | 0.01 | 0 | 0.01 | 0 | 0 | 0 | 0 | 0.02 | 0.03 | 0.04 | 1 | 2 | 0 |
| *2309 | A | 0 | 0 | 0 | 0 | 0 | 0 | 0.01 | 0 | 0.01 | 0.03 | 0.02 | 1.037 | 1 | 0 |
| *2310 | A | 0.01 | 0.01 | 0 | 0 | 0 | 0 | 0 | 0 | 0.02 | 0.03 | 0.04 | 1.045 | 0 | 2 |
| *2311 | A | 0 | 0 | 0 | 0 | 0.01 | 0 | 0 | 0 | 0.01 | 0.02 | 0.02 | 1.01 | 0 | 0 |
| *2312 | A | 0 | 0.02 | 0 | 0 | 0 | 0.02 | 0 | 0 | 0.04 | 0.03 | 0.08 | 1.01 | 4 | 0 |
| *2313 | A | 0 | 0 | 0.01 | 0.01 | 0 | 0 | 0 | 0 | 0.02 | 0.04 | 0.04 | 1.015 | 0 | 0 |
| *2314 | A | 0.01 | 0 | 0 | 0 | 0 | 0 | 0 | 0.01 | 0.02 | 0.02 | 0.04 | 1.01 | 0 | 5 |
| *2315 | D | 0 | 0 | 0 | 0 | 0.02 | 0 | 0 | 0 | 0.02 | 0.04 | 0.04 | 1.01 | 2 | 0 |
| 2316 | A | 0 | 0.02 | 0.02 | 0 | 0 | 0 | 0 | 0 | 0.04 | 0.02 | 0.08 | 1.01 | 0 | 1 |
| 2317 | B | 0 | 0 | 0.01 | 0 | 0 | 0.01 | 0 | 0 | 0.02 | 0.03 | 0.04 | 1.02 | 1 | 0 |

TABLE 39

| Sample No. | Kind of BaTiO$_3$ | (BaO)$_m$ · TiO$_2$ + αR$_2$O$_3$ + βBaZrO$_3$ + γMnO | | | | | | | | | | | Amount of addition of the first component (parts by weight) | Amount of addition of the second component (parts by weight) |
|---|---|---|---|---|---|---|---|---|---|---|---|---|---|---|---|
| | | α | | | | | | | | | | | | | |
| | | Eu$_2$O$_3$ | Gd$_2$O$_3$ | Tb$_2$O$_3$ | Dy$_2$O$_3$ | Ho$_2$O$_3$ | Er$_2$O$_3$ | Tm$_2$O$_3$ | Yb$_2$O$_3$ | Total of α | β | γ | m | | |
| 2318 | C | 0.03 | 0 | 0 | 0 | 0 | 0 | 0 | 0 | 0.03 | 0.02 | 0.013 | 1.03 | 2 | 0 |
| 2319 | A | 0 | 0 | 0 | 0.01 | 0 | 0 | 0.02 | 0 | 0.03 | 0.02 | 0.06 | 1.015 | 1 | 0 |
| 2320 | A | 0 | 0.04 | 0 | 0 | 0 | 0 | 0 | 0 | 0.04 | 0.03 | 0.08 | 1.02 | 0 | 2 |
| 2321 | A | 0 | 0.001 | 0 | 0 | 0 | 0 | 0 | 0 | 0.001 | 0.02 | 0.002 | 1.01 | 1 | 0 |
| 2322 | A | 0 | 0 | 0.01 | 0.01 | 0 | 0 | 0 | 0.01 | 0.03 | 0.03 | 0.06 | 1.01 | 1 | 0 |
| 2323 | A | 0 | 0 | 0 | 0 | 0 | 0.02 | 0 | 0 | 0.02 | 0.02 | 0.04 | 1.025 | 0 | 1 |
| 2324 | A | 0 | 0.01 | 0 | 0 | 0.03 | 0 | 0 | 0 | 0.04 | 0.02 | 0.08 | 1.01 | 0 | 1 |
| 2325 | A | 0 | 0 | 0 | 0.02 | 0 | 0 | 0.02 | 0 | 0.04 | 0.03 | 0.08 | 1.01 | 1 | 0 |
| 2326 | A | 0 | 0.03 | 0 | 0 | 0 | 0.03 | 0 | 0 | 0.06 | 0.03 | 0.12 | 1.02 | 2 | 0 |
| 2327 | A | 0 | 0 | 0.01 | 0 | 0 | 0 | 0.02 | 0 | 0.03 | 0.005 | 0.06 | 1.01 | 1 | 0 |
| 2328 | A | 0 | 0 | 0 | 0.01 | 0.01 | 0 | 0 | 0 | 0.02 | 0.06 | 0.04 | 1.01 | 1 | 0 |
| 2329 | A | 0 | 0 | 0.01 | 0 | 0 | 0.01 | 0 | 0 | 0.02 | 0.02 | 0.04 | 1.035 | 2 | 0 |
| 2330 | A | 0 | 0 | 0 | 0 | 0 | 0.o3 | 0 | 0 | 0.03 | 0.03 | 0.06 | 1.01 | 0.2 | 0 |
| 2331 | A | 0.01 | 0 | 0.01 | 0 | 0 | 0 | 0 | 0 | 0.02 | 0.02 | 0.04 | 1.01 | 3 | 0 |
| 2332 | A | 0 | 0 | 0 | 0.01 | 0 | 0 | 0 | 0.01 | 0.02 | 0.04 | 0.04 | 1.01 | 0 | 0.2 |
| 2333 | A | 0 | 0 | 0 | 0 | 0 | 0.02 | 0 | 0 | 0.02 | 0.03 | 0.04 | 1.01 | 0 | 3 |

The electric characteristics were measured by the same method as in Example 13. The results are shown in TABLE 40 and TABLE 41.

TABLE 40

| Sample No. | Baking Temp. (° C.) | Dielectric Constant | Dielectric Loss tan δ (%) | Ratio of Temperature Dependent capacitance Change (%) ΔC/C$_{20}$ -25° C. | ΔC/C$_{20}$ 85° C. | ΔC/C$_{25}$ -55° C. | ΔC/C$_{25}$ 125° C. | Maximum value | DC vias characteristic (%) ΔC/C 5 k V/mm | Product CR (Ω · F) 315 V Impressed Voltage 25° C. | Product CR (Ω · F) 945 V Impressed Voltage 25° C. | Product CR (Ω · F) 315 V Impressed Voltage 150° C. | 945 V Impressed Voltage 150° C. | Insulation breakdown voltage (kV/mm) AC | Insulation breakdown voltage (kV/mm) DC | Humidity Resistance Load Test Number of reject | Mean Life Span (h) |
|---|---|---|---|---|---|---|---|---|---|---|---|---|---|---|---|---|---|
| *2301 | 1300 | 1560 | 0.8 | 4 | -13 | 5 | -18 | 18 | -39 | 5200 | 4940 | 230 | 220 | 12 | 14 | 0/72 | 880 |
| *2302 | 1300 | 810 | 0.7 | 2.4 | -7 | 4 | -7 | 7 | -10 | 5430 | 5160 | 200 | 190 | 12 | 14 | 12/72 | 920 |
| *2303 | 1300 | 1330 | 0.8 | 2.2 | -7.8 | 5 | -8 | 8 | -22 | 3000 | 2100 | 90 | 60 | 12 | 14 | 0/72 | 860 |
| *2304 | 1300 | 1330 | 0.7 | 2.4 | -14.2 | 4.8 | -27 | 27 | -22 | 5230 | 4970 | 220 | 210 | 12 | 14 | 0/72 | 130 |
| *2305 | | | | Unmeasurable due to semiconductor formation | | | | | | | | | | | | | |
| *2306 | 1280 | 1120 | 0.8 | 3.4 | -8.3 | 4.6 | -19 | 19 | -13 | 3080 | 2930 | 130 | 120 | 12 | 14 | 0/72 | 120 |
| *2307 | | | | Unmeasurable due to semiconductor formation | | | | | | | | | | | | | |
| *2308 | 1300 | 1440 | 0.7 | 3.2 | -8.2 | 4.1 | -9 | 9 | -37 | 3200 | 3040 | 120 | 110 | 10 | 12 | 0/72 | 110 |
| *2309 | | | | Unmeasurable due to insufficient sintering | | | | | | | | | | | | | |
| *2310 | | | | Unmeasurable due to insufficient sintering | | | | | | | | | | | | | |
| *2311 | | | | Unmeasurable due to insufficient sintering | | | | | | | | | | | | | |
| *2312 | 1300 | 1280 | 2.2 | 3.3 | -8.7 | 4.3 | -9.2 | 9.2 | -22 | 3310 | 3150 | 130 | 120 | 11 | 11 | 0/72 | 140 |
| *2313 | | | | Unmeasurable due to insufficient sintering | | | | | | | | | | | | | |
| *2314 | 1300 | 1420 | 2.4 | 2.7 | -7.6 | 3.6 | -8 | 8 | -36 | 3200 | 3040 | 150 | 140 | 10 | 11 | 0/72 | 170 |
| *2315 | 1300 | 1120 | 0.7 | 2.4 | -7.2 | 5 | -9.1 | 9.1 | -14 | 5240 | 4980 | 210 | 200 | 12 | 14 | 0/72 | 900 |
| 2316 | 1280 | 1220 | 0.7 | 2.4 | -8.4 | 4.5 | -11 | 11 | -21 | 5130 | 4870 | 250 | 240 | 12 | 14 | 0/72 | 850 |
| 2317 | 1280 | 1450 | 0.7 | 2.6 | -8.6 | 4.6 | -12.1 | 12.1 | -37 | 5160 | 4900 | 230 | 220 | 13 | 15 | 0/72 | 890 |

TABLE 41

| Sample No. | Baking Temp. (° C.) | Dielectric Constant | Dielectric Loss tan δ (%) | Ratio of Temperature Dependent capacitance Change (%) ΔC/C$_{20}$ -25° C. | ΔC/C$_{20}$ 85° C. | ΔC/C$_{25}$ -55° C. | ΔC/C$_{25}$ 125° C. | Maximum value | DC vias characteristic (%) ΔC/C 5 k V/mm | Product CR (Ω · F) 315 V Impressed Voltage 25° C. | Product CR (Ω · F) 945 V Impressed Voltage 25° C. | 315 V Impressed Voltage 150° C. | 945 V Impressed Voltage 150° C. | Insulation breakdown voltage (kV/mm) AC | Insulation breakdown voltage (kV/mm) DC | Humidity Resistance Load Test Number of reject | Mean Life Span (h) |
|---|---|---|---|---|---|---|---|---|---|---|---|---|---|---|---|---|---|
| 2318 | 1280 | 1360 | 0.8 | 3 | -9 | 4.7 | -10.4 | 10.4 | -28 | 5200 | 4940 | 220 | 210 | 12 | 14 | 0/72 | 930 |
| 2319 | 1300 | 1370 | 0.7 | 3.4 | -9.1 | 4.5 | -9.7 | 9.7 | -30 | 5080 | 4830 | 240 | 230 | 12 | 14 | 0/72 | 870 |
| 2320 | 1300 | 1240 | 0.7 | 2.8 | -8.7 | 5 | -9.5 | 9.5 | -22 | 5140 | 4880 | 230 | 220 | 12 | 14 | 0/72 | 830 |
| 2321 | 1300 | 1510 | 0.7 | 2.6 | -8.5 | 4.8 | -13.4 | 13.4 | -39 | 5300 | 5040 | 230 | 220 | 12 | 14 | 0/72 | 950 |
| 2322 | 1300 | 1360 | 0.7 | 2 | -9 | 4.6 | -10.3 | 10.3 | -29 | 5220 | 4960 | 210 | 200 | 12 | 14 | 0/72 | 880 |
| 2323 | 1300 | 1460 | 0.7 | 3 | -9.2 | 4.9 | -11.2 | 11.2 | -38 | 5290 | 5030 | 250 | 240 | 12 | 14 | 0/72 | 900 |
| 2324 | 1280 | 1250 | 0.8 | 3.2 | -8.8 | 4.6 | -11 | 11 | -23 | 5340 | 5070 | 230 | 220 | 13 | 15 | 0/72 | 860 |
| 2325 | 1300 | 1240 | 0.7 | 3.3 | -8.7 | 4.3 | -12 | 12 | -23 | 5330 | 5060 | 220 | 210 | 12 | 14 | 0/72 | 830 |
| 2326 | 1300 | 960 | 0.7 | 2.9 | -9.2 | 5.1 | -12.5 | 12.5 | -12 | 5080 | 4830 | 200 | 190 | 13 | 15 | 0/72 | 810 |
| 2327 | 1300 | 1340 | 0.7 | 2.8 | -9.3 | 5.3 | -12.1 | 12.1 | -30 | 5210 | 4950 | 210 | 200 | 12 | 14 | 0/72 | 870 |
| 2328 | 1280 | 1440 | 0.7 | 2.1 | -8.5 | 4 | -11.5 | 11.5 | -38 | 5240 | 4980 | 220 | 210 | 12 | 14 | 0/72 | 910 |
| 2329 | 1300 | 1470 | 0.8 | 2.6 | -8.2 | 4.6 | -13.6 | 13.6 | -39 | 5260 | 5000 | 230 | 220 | 12 | 14 | 0/72 | 950 |
| 2330 | 1300 | 1360 | 0.7 | 3 | -8.8 | 4.2 | -11.8 | 11.8 | -28 | 5220 | 4960 | 220 | 210 | 12 | 14 | 0/72 | 880 |
| 2331 | 1280 | 1420 | 0.8 | 2.7 | -9 | 4.8 | -11.9 | 11.9 | -36 | 5240 | 4980 | 210 | 200 | 12 | 14 | 0/72 | 930 |
| 2332 | 1300 | 1430 | 0.7 | 2.8 | -8.6 | 4.7 | -11 | 11 | -36 | 5280 | 5020 | 230 | 220 | 12 | 14 | 0/72 | 910 |
| 2333 | 1300 | 1460 | 0.7 | 3 | -9.1 | 4.3 | -10.7 | 10.7 | -39 | 5300 | 5040 | 220 | 210 | 12 | 14 | 0/72 | 860 |

It is evident from Table 38 to TABLE 41 that the monolithic ceramic capacitor according to the present invention has a capacitance decreasing ratio of as small as within -40% or less at an impressed voltage of 5 kV/mm and a dielectric loss of less than 1.0 %, wherein the rate of change against temperature changes satisfies both the B-level characteristic standard stipulated in the JIS Standard in the temperature range of -25° C. to +85° C. and X7R-level characteristic standard stipulated in the EIA standard in the temperature range of -55° C. to +125° C.

Moreover, the insulation resistances at 25° C. and 150° C. as expressed by the product CR show as high values as 5000 Ω•F or more and 200 Ω•F or more, respectively, when the ceramic capacitor is used under a high electric field strength of 10 kV/mm. The insulation breakdown voltage also shows high values of 12 kV/mm or more under the AC voltage and 14 kV/mm or more under the DC voltage. In addition, an acceleration test at 150° C. and DC 25 kV/mm gave a mean life span as long as 800 hours or more besides enabling a relatively low firing, temperature of 1300° C. or less.

The reason why the composition was limited in the present invention will be described hereinafter.

In the composition of $(BaO)_m TiO_2 + \beta R_2O_3 + \gamma BaZrO_3 + gMnO$ (wherein $R_2O_3$ represents at least one compound selected from $Eu_2O_3$, $Gd_2O_3$, $Tb_2O_3$, $Dy_2O_3$, $Ho_2O_3$, $Er_2O_3$, $Tm_2O_3$ and $Yb_2O_3$, $\beta$, $\gamma$ and g representing mole ratio, respectively), a $R_2O_3$ content $\beta$ of less than about 0.001 as shown in the sample No. 2301 is not preferable because the temperature characteristics does not satisfy the B-level/X7R characteristics. On the other hand, a $Ra_2O_3$ content $\beta$ of more than about 0.06 as shown in the sample No. 2302 is also not preferable because the specific dielectric constant becomes as small as less than 900. Accordingly, the preferable range of the $Ra_2O_3$ content $\beta$ is $0.001 \leq \beta \leq 0.06$.

A $BaZrO_3$ content $\gamma$ of zero as in the sample No. 2303 is not preferable since the insulation resistance is low and the voltage dependency of the insulating resistance is larger than that of the composition system containing $BaZrO_3$. It is also not preferable that the $BaZrO_3$ content $\gamma$ is more than about 0.06 as in the sample No. 2304 because the temperature characteristic does not satisfy the B-level/X7R characteristics, along with shortening the mean life span. Accordingly, the preferable range of the $BaZrO_3$ content $\gamma$ is $0.005 \leq \gamma \leq 0.06$.

It is not preferable that, as seen in the sample No. 2305, the MnO content g is about 0.001 since measuring is impossible due to formation of semiconductors. On the other hand, it is not preferable that the MnO content g exceeds about 0.13 as in the sample No. 2306, because the temperature characteristic X7R is not satisfied and the insulation capacitance is low along with the mean life span being short. Accordingly, the MnO content g is preferably in the range of $0.001 \leq g < 0.13$.

It is not preferable that the $BaO/TiO_2$ ratio m is less than about 1.000 as in the sample No. 2307 because measurements are impossible due to formation of semiconductors. It is also not preferable that, as seen in the sample No. 2308, the $BaO/TiO_2$ ratio m is about 1.000 since the insulation resistance as well as the AC and DC breakdown voltage becomes low along with shortening the mean life span. It is not preferable, on the other hand, that the $BaO/TiO_2$ ratio m is over about 1.035 as in the samples No. 2309 and 2310 since measurements becomes impossible due to insufficient sintering. Accordingly, the $BaO/TiO_2$ ratio m in the range of $1.000 < m \leq 1.035$ is preferable.

It is not preferable that the amount of addition of the first or second side component is zero as in the samples No. 2311 and 2313 because measurements are impossible due to insufficient sintering. It is not preferable that the amount of addition of the first or second side component exceeds about 3.0 parts by weight as seen in the samples No. 2312 and 314, on the other hand, because the dielectric loss exceeds 1.0% and the insulation resistance and insulation breakdown voltage are lowered alone with shortening the mean life span. Accordingly, the preferable content of either the first or the second components is about 0.2 to 3.0 parts by weight.

The content of the alkali earth metal oxides contained in barium titanate as impurities is below about 0.02% by weight because when the contents of the alkali earth metal oxides exceeds about 0.02% by weight as in the sample No. 2315, the dielectric constant is decreased.

Example 17

A material with a composition of $BaO_{1.010}TiO_2 + 0.015Ho_2O_3 + 0.01BaZrO_3 + 0.03$ MnO (mole ratio) was prepared using barium titanate A of TABLE 1 as a dielectric powder. A monolithic ceramic capacitor was produced by the same method as in Example 1, except that an oxide represented by $Li_2O$—$(Si, Ti)O_2$—MO shown in Table 34, having a mean particle size of 1 $\mu$m or less produced by heating the material described above at 1200 to 1500° C., was added as the first side component. The overall dimensions of the monolithic ceramic capacitor produced is the same as in Example 13. The electric characteristics were measured by the same method as in Example 13. The results are shown in TABLE 42. In Table 42, the samples No. 2401 to 2422 correspond to the samples No. 2101 to 2122 in TABLE 34. For example, the sample No. 2401 in TABLE 42 was obtained by adding the side component of the sample No. 2101 in TABLE 34.

TABLE 42

| Sample No. | Baking Temp. (° C.) | Dielectric Constant | Dielectric Loss tan δ (%) | Ratio of Temperature Dependent Capacitance Change (%) | | | | DC vias characteristic (%) | Product CR (Ω · F) | | | | Insulation breakdown voltage (kV/mm) | | Humidity Resistance Test Load Number of reject | Mean Life Span (h) |
|---|---|---|---|---|---|---|---|---|---|---|---|---|---|---|---|---|
| | | | | ΔC/C₂₀ | | ΔC/C₂₅ | | | 315 V Impressed | 945 V Impressed | 315 V Impressed Voltage | 945 V Impressed Voltage | | | | |
| | | | | −25° C. | 85° C. | −55° C. | 125° C. | Maximum value | ΔC/C 5 k V/mm | Voltage 25° C. | Voltage 25° C. | 150° C. | 150° C. | AC | DC | |
| 2401 | 1300 | 1430 | 0.7 | 2.6 | −8.4 | 3.6 | −10.1 | 10.1 | −36 | 5200 | 4850 | 220 | 210 | 12 | 14 | 0/72 | 880 |
| 2402 | 1300 | 1430 | 0.6 | 2.3 | −8.4 | 3.4 | −10.5 | 10.5 | −36 | 5120 | 4860 | 210 | 200 | 12 | 14 | 0/72 | 900 |
| 2403 | 1280 | 1440 | 0.7 | 2.5 | −8 | 4.1 | −10.6 | 10.6 | −36 | 5230 | 4970 | 200 | 190 | 12 | 14 | 0/72 | 870 |
| 2404 | 1300 | 1470 | 0.7 | 2.2 | −8.1 | 4.2 | −11 | 11 | −38 | 5100 | 4850 | 230 | 220 | 12 | 14 | 0/72 | 820 |
| 2405 | 1300 | 1430 | 0.7 | 2.2 | −7.9 | 4 | −11.3 | 11.3 | −36 | 5160 | 4900 | 230 | 220 | 13 | 15 | 0/72 | 820 |
| 2406 | 1280 | 1430 | 0.7 | 2.7 | −8 | 4.2 | −11.5 | 11.5 | −36 | 5230 | 4970 | 210 | 200 | 12 | 14 | 0/72 | 950 |
| 2407 | 1300 | 1430 | 0.7 | 2.6 | −8.2 | 3.9 | −10.5 | 10.5 | −36 | 5140 | 4880 | 220 | 210 | 13 | 15 | 0/72 | 830 |
| 2408 | 1280 | 1460 | 0.6 | 2.8 | −8.3 | 4.1 | −11 | 11 | −37 | 5510 | 4890 | 220 | 210 | 12 | 14 | 0/72 | 800 |
| 2409 | 1280 | 1460 | 0.7 | 2.4 | −8 | 4.2 | −12.1 | 12.1 | −37 | 5120 | 4860 | 200 | 190 | 12 | 14 | 0/72 | 880 |
| 2410 | 1280 | 1480 | 0.7 | 2.3 | −8.1 | 4.1 | −11.7 | 11.7 | −38 | 5130 | 4870 | 220 | 210 | 12 | 14 | 0/72 | 850 |
| 2411 | 1300 | 1440 | 0.7 | 2.4 | −8.2 | 3.9 | −11.6 | 11.6 | −36 | 5140 | 4880 | 220 | 210 | 12 | 14 | 0/72 | 810 |
| 2412 | 1280 | 1420 | 0.6 | 2.2 | −8.3 | 3.8 | −11.5 | 11.5 | −36 | 5260 | 5000 | 200 | 190 | 12 | 14 | 0/72 | 920 |
| 2413 | 1350 | Unmeasurable due to insufficient sintering | | | | | | | | | | | | | | | |

TABLE 42-continued

| | | | | | | | | | DC vias charac- teristic (%) | Product CR (Ω · F) | | | | Insula- tion break- down voltage (kV/ mm) | | Humid- ity Resis- tance Load | |
|---|---|---|---|---|---|---|---|---|---|---|---|---|---|---|---|---|---|
| | | Di- elec- tric Con- stant | Di- elec- tric Loss tan δ (%) | Ratio of Temperature Dependent Capacitance Change (%) | | | | | | 315 V Im- press- ed | 945 V Im- press- ed | 315 V Im- pressed Voltage | 945 V Im- pressed Voltage | | | | |
| | | | | ΔC/C$_{20}$ | | ΔC/C$_{25}$ | | Maxi- mum | ΔC/C 5 k | | | | | | | Test | Life |
| Sam- ple | Baking Temp. | | | | | | | | | | | | | | | Number | Span |
| No. | (° C.) | | | −25° C. | 85° C. | −55° C. | 125° C. | value | V/mm | 25° C. | | 150° C. | | AC | DC | of reject | (h) |
| 2414 | 1350 | | | | | | | | | | | | | | | | |
| 2415 | 1350 | 1440 | 1.8 | 2.8 | −8 | 3.8 | −11 | 11 | −38 | 5220 | 4960 | 190 | 180 | 11 | 12 | 55/72 | 120 |
| 2416 | 1350 | | | | | | Unmeasurable due to insufficient sintering | | | | | | | | | | |
| 2417 | 1350 | | | | | | | | | | | | | | | | |
| | | | | | | | Unmeasurable due to insufficient sintering | | | | | | | | | | |
| 2418 | 1300 | 1460 | 0.8 | 2.7 | −8.2 | 4.1 | −10.7 | 10.7 | −37 | 5170 | 4910 | 210 | 200 | 11 | 13 | 0/72 | 860 |
| 2419 | 1350 | 1430 | 1.6 | 2.5 | −8.3 | 4.2 | −10.8 | 10.8 | −36 | 5280 | 5020 | 220 | 210 | 11 | 13 | 33/72 | 110 |
| 2420 | 1300 | 1440 | 0.7 | 2.5 | −8.4 | 4 | −11.5 | 11.5 | −37 | 5100 | 4850 | 190 | 180 | 12 | 13 | 6/72 | 870 |
| 2421 | 1350 | 1460 | 1.8 | 2.7 | −8.3 | 3.9 | −10 | 10 | −37 | 5160 | 4900 | 190 | 180 | 11 | 13 | 52/72 | 130 |
| 2422 | 1350 | 1420 | 1.6 | 2.5 | −8.2 | 3.7 | −10.7 | 10.7 | −36 | 5200 | 4940 | 200 | 190 | 11 | 13 | 49/72 | 140 |

As is evident from the samples No. 2401 to 2412, 2418 and 2420, preferable results are obtained in the samples in which oxides of the samples No. 2101 to 2112, 2118 and 2120 in TABLE 34 with compositions within or on the boundary lines of the area surrounded by the straight lines connecting by A (x=20, y=80, z=0), B (x=10, y=80, z=10), C (x=10, y=70, z=20), D(x=35, y=45, z=20), E (x=45, y=45, z=10) and F(x=45, y=55, z=0) (wherein x, y and z represent mole %, w represents mole ratio, w being within the range of $0.3 \leq w<1.0$ when it falls on the line A-F) in the three component phase diagram of the oxides represented by $Li_2O$—$(Si_w, Ti_{1-w})O_2$—MO in FIG. 4 are added, wherein the samples have a capacitance decreasing ratio of as small as within −40% at an impressed voltage of 5 kV/mm and a dielectric loss of 1.0% or less, along with the rate of change of the electrostatic capacitance against temperature changes satisfying the B-level characteristic standard stipulated in the JIS Standard in the temperature range of −25° C. to +85° C. and X7R-level characteristic standard stipulated in the EIA standard in the temperature range of −55° C. to +125° C.

Moreover, the insulation resistances at 25° C. and 150° C. as expressed by the product CR show as high values as 5000 Ω•F or more and 190 Ω•F or more, respectively, when the ceramic capacitor is used under a high electric field strength of 10 kV/mm. The insulation breakdown voltage also shows high values of 12 kV/mm or more under the AC voltage and 14 kV/mm or more under the DC voltage. In addition, an acceleration test at 150° C. and DC 25 kV/mm gave a mean life span as long as 800 hours or more besides enabling a relatively low firing temperature of 1300° C. or less.

When the oxide represented by $Li_2O$—$(Si_w, Ti_{1-w})O_2$—MO has a composition outside of the composition described above as in the samples No. 2113 to 2117 and 2119, on the other hand, sintering becomes insufficient or many rejection appear in the humidity resistance load test even after sintering as seen in the samples No. 2413 to 2417 and 2419 in TABLE 42. When the composition falls on the line A-F and w=1.0 as in the samples No. 2119 and 2121 in TABLE 34, the sintering temperature becomes high and many rejects appear in the humidity resistance load test. When the value of w is less than 0.30 as in the sample No. 2122 in TABLE 34, he sintering temperature becomes high and many rejects appear in the humidity resistance load test as seen in the sample No. 2422 in TABLE 42.

Example 18

A material with a composition of $BaO_{1.010}TiO_2$+ $0.025Eu_2O_3$+$0.01BaZrO_3$+$0.05$ MnO (mole ratio) was prepared using barium titanate A of TABLE 1 as a dielectric powder. A monolithic ceramic capacitor was produced by the same method and same overall dimensions as in Example 13, except that an oxide $SiO_2$—$TiO_2$—XO shown in Table 38, having a mean particle size of 1 μm or less produced by heating the material described above at 1200 to 1500° C., was added as the second side component. The electric characteristics were measured by the same method as in Example 13. The results are shown in TABLE 43. The samples No. 2501 to 2519 in TABLE 43 correspond to the samples No. 2201 to 2219 in TABLE 36. For example, sample No.2501 in TABLE 43 was obtained by adding the side component of the sample No. 2201 in TABLE 36.

TABLE 43

| Sample No. | Baking Temp. (° C.) | Dielectric Constant | Dielectric Loss tan δ (%) | Ratio of Temperature Dependent Capacitance Change (%) | | | | DC vias characteristic (%) Maximum value | ΔC/C 5 k V/mm | Product CR (Ω · F) | | | | Insulation breakdown voltage (kV/mm) | | Humidity Resistance Load Test Number of reject | Mean Life Span (h) |
| | | | | ΔC/C$_{20}$ | | ΔC/C$_{25}$ | | | | 315 V Impressed Voltage 25° C. | 945 V Impressed Voltage | 315 V Impressed Voltage 150° C. | 945 V Impressed Voltage | | | | |
| | | | | −25° C. | 85° C. | −55° C. | 125° C. | | | | | | | AC | DC | | |
| 2501 | 1300 | 1350 | 0.9 | 2.2 | −8.3 | 3.6 | −10.2 | 10.2 | −32 | 5120 | 4860 | 230 | 220 | 12 | 14 | 0/72 | 870 |
| 2502 | 1300 | 1350 | 0.8 | 2.3 | −8.6 | 4.1 | −10.4 | 10.4 | −32 | 5210 | 4950 | 240 | 230 | 12 | 14 | 0/72 | 920 |
| 2503 | 1300 | 1360 | 0.9 | 2.4 | −8.7 | 4 | −11 | 11 | −32 | 5130 | 4870 | 220 | 210 | 12 | 14 | 0/72 | 860 |
| 2504 | 1300 | 1320 | 0.8 | 2.3 | −9 | 3.8 | −11.6 | 11.6 | −31 | 5140 | 4880 | 230 | 220 | 13 | 15 | 0/72 | 840 |
| 2505 | 1300 | 1360 | 0.9 | 2.2 | −8.2 | 3.9 | −10.8 | 10.8 | −32 | 5160 | 4900 | 220 | 210 | 12 | 14 | 0/72 | 920 |
| 2506 | 1300 | 1340 | 0.8 | 2.3 | −8.6 | 4 | −10.7 | 10.7 | −32 | 5120 | 4860 | 210 | 200 | 12 | 14 | 0/72 | 910 |
| 2507 | 1300 | 1310 | 0.9 | 2.6 | −8.4 | 4.2 | −11 | 11 | −30 | 5240 | 4980 | 230 | 220 | 13 | 15 | 0/72 | 880 |
| 2508 | 1300 | 1340 | 0.9 | 2.5 | −8.2 | 4 | −11.5 | 11.5 | −32 | 5230 | 4970 | 220 | 210 | 12 | 14 | 0/72 | 900 |
| 2509 | 1300 | 1330 | 0.9 | 2.3 | −8.3 | 3.7 | −11.6 | 11.6 | −31 | 5200 | 4940 | 220 | 210 | 12 | 14 | 0/72 | 920 |
| 2510 | 1300 | 1370 | 0.9 | 2.1 | −8.4 | 3.5 | −11.3 | 11.3 | −33 | 5030 | 4780 | 210 | 200 | 12 | 14 | 0/72 | 930 |
| 2511 | 1300 | 1360 | 0.8 | 2.2 | −8.6 | 3.8 | −10.9 | 10.9 | −32 | 5430 | 5160 | 340 | 320 | 12 | 14 | 0/72 | 850 |
| 2512 | 1300 | 1350 | 0.9 | 2.6 | −8.3 | 3.6 | −10.7 | 10.7 | −32 | 5410 | 5140 | 330 | 310 | 12 | 14 | 0/72 | 900 |
| 2513 | 1350 | 1330 | 0.9 | 2.4 | −8.4 | 4 | −11 | 11 | −31 | 5120 | 4860 | 220 | 210 | 11 | 13 | 55/72 | 120 |
| 2514 | 1350 | | | | | | | Unmeasurable due to sintering | | | | | | | | | |
| 2515 | 1350 | | | | | | | Unmeasurable due to sintering | | | | | | | | | |
| 2516 | 1350 | 1320 | 1 | 2.3 | −8.5 | 3.8 | −11.5 | 11.5 | −30 | 5160 | 4900 | 230 | 220 | 11 | 13 | 64/72 | 110 |
| 2517 | 1350 | | | | | | | Unmeasurable due to sintering | | | | | | | | | |
| 2519 | 1350 | | | | | | | Unmeasurable due to sintering | | | | | | | | | |
| 2519 | 1350 | | | | | | | Unmeasurable due to sintering | | | | | | | | | |

As is evident from the samples No. 2501 to 2512 in TABLE 43, preferable results are obtained in the samples in which oxides of the samples No. 2201 to 2212 in TABLE 36 with compositions within or on the boundary lines of the area surrounded by the straight lines connecting A (x=85, y=1, z=14), B (x=35, y=51, z=14), C (x=30, y=20, z=50) and D (x=39, y=1, z=60) (wherein x, y and z represent mole %) in the three component phase diagram of the $SiO_2$—$TiO_2$—XO oxides shown in FIG. 5 are added, wherein the samples have a capacitance decreasing ratio of as small as within −40% at an impressed voltage of 5 kV/mm and a dielectric loss of 1.0% or less, along with the rate of change of the electrostatic capacitance against temperature changes satisfying the B-level characteristic standard stipulated in the JIS Standard in the temperature range of −25° C. to +85° C. and X7R-level characteristic standard stipulated in the EIA standard in the temperature range of −55° C. to +125° C.

Moreover, the insulation resistances at 25° C. and 150° C. as expressed by the product CR show as high values as 5000 Ω•F or more and 200 Ω•F or more, respectively, when the ceramic capacitor is used under a high electric field strength of 10 kV/mm. The insulation breakdown voltage also shows high values of 12 kV/mm or more under the AC voltage and 14 kV/mm or more under the DC voltage. In addition, an acceleration test at 150° C. and DC 25 kV/mm gave a mean life span as long as 800 hours or more besides enabling a relatively low firing temperature of 1300° C. or less.

When the oxide $SiO_2$—$TiO_2$—XO has a composition outside of the composition described above as in the samples No. 2213 to 2119 in TABLE 36, on the other hand, sintering becomes insufficient or many rejection appear in the humidity resistance load test even after sintering as seen in the samples No. 2513 to 2519 in TABLE 43.

While a monolithic capacitor having an insulation resistance of 5400 Ω•F or more and 330 Ω•F or more at 25° C. and 150° C., respectively, under a strong electric field of 10 kV/mm can be obtained by allowing $Al_2O_3$ and/or $ZrO_2$ in the $SiO_2$—$TiO_2$—XO oxides as in the sample No. 2211 and 2212 in TABLE 36, the sintering property is extremely decreased as shown in the samples NO. 2517 and 2518 in TABLE 43 when $Al_2O_3$ and $ZrO_2$ are added in an amounts of about 15 parts by weight or more and about 5 parts by weight or more, respectively, as in the samples No. 2517 and 2518 in TABLE 43.

Although powders prepared by the oxalic acid method are used in the foregoing examples, the methods are not limited thereto but a powder of barium titanate prepared by an alkoxide method or hydrothermal synthesis method may be used. It may happen that the characteristics of the monolithic ceramic capacitor are more improved than those shown in the foregoing examples by using these powders.

The oxide powders as starting materials are not limited to those hitherto described, and the resulting characteristics are not affected in any sense by using a solution of an alkoxide or organometals compound provided that the starting materials are formulated so as to construct the dielectric ceramic layers within the scope of the present invention.

It is made clear from the foregoing descriptions that the dielectric ceramic composition according to the present invention is not reduced by firing in the reducing atmosphere and is not formed into semiconductors, and sintering is possible at a relatively low temperature of about 1300° C. or less.

Accordingly, when a monolithic ceramic capacitor is constricted by using this dielectric ceramic composition as dielectric ceramic layers, the production cost of the monolithic ceramic capacitor can be reduced since base metals such as nickel or nickel alloys may be used for the electrode materials.

When the monolithic ceramic capacitor using this dielectric ceramic composition is used under a high electric field of 10 kV/mm where reliability can not be ensured due to low insulation resistance in the monolithic ceramic capacitor using nickel or nickel alloys for the conventional inner electrodes, a monolithic ceramic capacitor excellent in weather resistance properties such as high temperature load at an impressed voltage of DC 25 kV/mm at 150° C. and humidity resistance load can be obtained, wherein the insulation resistances at room temperature and at 150° C. represented by the product of the insulation resistance and electrostatic capacitance (CR) becomes as high as 4900 to 5000 Ω•F and 190 to 200 Ω•F, respectively, the voltage dependency of the insulation resistance is low, the capacitance decrease ratio at an impressed voltage of 5 kV/mm is as small as 40 to 45% and the insulation durability is high, and the temperature characteristics of the electrostatic capacitance satisfies the B-level characteristic standard stipulated in the JIS Standard and X7R-level characteristic standard stipulated in the EIA standard.

What is claimed:

1. A dielectric ceramic composition comprising barium titanate containing about 0.02% by weight or less of alkali metal oxides; at least one of scandium oxide or yttrium oxide; at least one of europium oxide, gadolinilinm oxide, terbium oxide, dysprosium oxide, holmium oxide, erbium oxide, thuliumi oxide and ytterbium oxide; barium zirconate and manganese oxide, as an essential component represented by the composition formula $(BaO)_mTiO_2+\alpha M_2O_3+\beta R_2O_3+\beta' R'_2O_3+\gamma BaZrO_3+gMnO$ wherein M is at least one of Sc and Y; R is at least one of Eu, Gd, Tb and Dy; R' is at least one of R, Ho, Er, Tm and Yb; $\alpha \leq 0.06$; $\beta \leq 0.06$; $\beta' \leq 0.06$; $0.005 \leq \gamma 0.06$; $0.001 < g \leq 0.13$; $\alpha+\beta+\beta' < 0.06$; and $1.000 < m < 1.035$; provided at least one of β and β is 0 and at least one of α, β and β is not 0;

and about 0.2 to 3.0 parts by weight of a side component relative to 100 parts by weight of said essential component, wherein said side component is an oxide represented by $Li_2O—(Si, Ti)O_2—MO$ or $SiO_2—TiO_2—XO$, wherein MO is at least one of $Al_2O_3$ or $ZrO_2$ and wherein XO is at least one of BaO, CaO, SrO, MgO, ZnO and MnO.

2. A dielectric ceramic composition according to claim 1, wherein said essential component further contains h moles of magnesium oxide, where $0.001 < g \leq 0.12$, $0.001 < h \leq 0.12$ and $g+h \leq 0.13$.

3. A dielectric ceramic composition according to claim 1, wherein said essential component is represented by the composition formula $(BaO)_mTiO_2+\alpha M_2O_3+\beta R_2O_3+\gamma BaZrO_3+gMnO$ and $0.001 \leq \alpha \leq 0.05$, $0.001 \leq \beta 0.05$, $0.005 \leq \gamma \leq 0.06$, $0.001 < g \leq 0.13$ and $\alpha+\beta \leq 0.06$, and $1.000 < m \leq 1.035$.

4. A dielectric ceramic composition according to claim 3, wherein said essential component further contains h moles of magnesiumn oxide, where $0.001 < g \leq 0.12$, $0.001 < h \leq 0.12$ and $g+h \leq 0.13$.

5. A dielectric ceramic composition according to claim 3, wherein said essential component is represented by the composition formula;

$(BaO)_mTiO_2+\alpha M_2O_3+\gamma BaZrO_3+gMnO$ and $0.001 \leq \alpha \leq 0.06$, $0.005 \leq \gamma \leq 0.06$, and $0.001 < g \leq 0.13$, and $1.000 < m < 1.035$.

6. A dielectric ceramic composition according to claim 5, wherein said essential component further contains h mole ratio of magnesium oxide, where $0.001 < g \leq 0.12$, $0.001 \leq h \leq 0.12$ and $g+h \leq 0.13$.

7. A dielectric ceramic composition according to claim 1, wherein said essential component is $(BaO)_mTiO_2+\beta' R'_2O_3+\gamma BaZrO_3+gMnO$ and $0.001 \leq \beta' 0.06$, $0.005 < \gamma < 0.06$ and $0.001 < g \leq 0.13$, and $1.000 < m \leq 1.025$.

8. A dielectric ceramic composition according to claim 7, wherein said essential component further contains h moles of magnesium oxide, where $0.001 \leq \gamma \leq 0.06$, $0.001 < g \leq 0.12$, $0.001 < h \leq 0.12$ and $g+h \leq 0.13$.

9. A dielectric ceramic composition according to claim 7, wherein said side component has a composition represented by $xLi_2O—y(Si_wTi_{1-w})O_2—zMO$ and wherein x, y and z represent mol % and w is in the range of $0.3 \leq w \leq 1.00$ and falls within or on the boundary lines of the area surrounded by the 5 straight lines connecting points A (x=20, y=80, z=0), B (x=10, y=80, z=10), C (x=10, y=70, z=20), D (x=35, y=45, z=20), E (x=45, y=45, z=10) and F (x=45, y=55, z=0), provided that when the composition falls on the straight line of A-F, w is within the area of $0.3 \leq w \leq 1.0$, on a three component phase diagram defined by the apexes corresponding to each component.

10. A dielectric ceramic composition according to claim 7, wherein said side component has a composition represented by $xSiO2—yTiO_2—zXO$ and wherein x, y and z represent mol % falling within or on the boundary lines of the area surrounded by straight lines connecting points A (x=85, y=1, z=14), B (x=35, y=51, z=14), C (x=30, y=20, z=50) and D (x=39, y=1, z=60) on a three component phase diagram defines by the apexes corresponding to each component.

11. A dielectric ceramic composition according to claim 10, wherein the side component contains in total of about 15 parts by weight or less of at least one of $Al_2O_3$ and $ZrO_2$ in which the content of $ZrO_2$ is about 5 parts by weight or less, relative to 100 parts by weight of the oxide $SiO_2—TiO_2—XO$.

12. A dielectric ceramic composition according to claim 5, wherein said side component has a composition represented by $xLi_2O—y(Si_wTi_{1-w})O_2—zMO$ and wherein x, y and z represent mol % and w is in the range of $0.3 \leq w \leq 1.00$ and falls within or on the boundary lines of the area surrounded by the straight lines connecting points A (x=20, y=80, z=0), B (x=10, y=80, z=10), C (x=10, y=70, z=20), D (x=35, y=45, z=20), E (x=45, y=45, z=10) and F (x=45, y=55, z=0), provided that when the composition falls on the straight line of A-F, w is within the area of $0.3 \leq w \leq 1.0$, on a three component phase diagram defined by the apexes corresponding to each component.

13. A dielectric ceramic composition according to claim 5, wherein said side component has a composition represented by $xSiO2—yTiO_2—zXO$ and wherein x, y and z represent mol % falling within or on the boundary lines of the area surrounded by straight lines connecting points A (x=85, y=1, z=14), B (x 35, y=51, z=14), C (x=30, y=20, z=50) and D (x=39, y=1, z=60) on a three component phase diagram defines by the apexes corresponding to each component.

14. A dielectric ceramic composition according to claim 3, wherein said side component has a composition represented by $xLi_2O—y(Si_w, Ti_{1-w})O_2—zMO$ and wherein x, y and z represent mol % and w is in the range of $0.3 \leq w \leq 1.00$ and falls within or on the boundary lines of the area surrounded by the straight lines connecting points A (x=20, y=80, z=0), B (x=10, y=80, z=10), C (x=10, y=70, z=20), D (x=35, y=45, z=20), E (x=45, y=45, z=10) and F (x=45, y=55, z=0), provided that when the composition falls on the straight line of A-F, w is within the area of $0.3 \leq w \leq 1.0$, on a three component phase diagram defined by the apexes corresponding to each component.

15. A dielectric ceramic composition according to claim 3, wherein said side component has a composition represented by $xSiO2$—$yTiO_2$—$zXO$ and wherein x, y and z represent mol % falling within or on the boundary lines of the area surrounded by straight lines connecting points A (x=85, y=1, z=14), B (x=35, y=51, z=14), C (x=30, y=20, z=50) and D (x=39, y=1, z=60) on a three component phase diagram defines by the apexes corresponding to each component.

16. A monolithic ceramic capacitor comprising a plurality of dielectric ceramic layers, a plurality of inner electrodes each of which is between adjacent ceramic layers and outer electrodes electrically connected to said inner electrodes, wherein said dielectric ceramic layers comprise the dielectric ceramic composition according to claim 1.

17. A monolithic ceramic capacitor comprising a plurality of dielectric ceramic layers, a plurality of inner electrodes each of which is between adjacent ceramic layers and outer electrodes electrically connected to said inner electrodes, wherein said dielectric ceramic layers comprise the dielectric ceramic composition according to claim 3 and said inner electrodes are nickel or a nickel alloy.

18. A monolithic ceramic capacitor comprising a plurality of dielectric ceramic layers, a plurality of inner electrodes each of which is between adjacent ceramic layers and outer electrodes electrically connected to said inner electrodes, wherein said dielectric ceramic layers comprise the dielectric ceramic composition according to claim 5 and said inner electrodes are nickel or a nickel alloy.

19. A monolithic ceramic capacitor comprising a plurality of dielectric ceramic layers, a plurality of inner electrodes each of which is between adjacent ceramic layers and outer electrodes electrically connected to said inner electrodes, wherein said dielectric ceramic layers comprise the dielectric ceramic composition according to claim 7 and said inner electrodes are nickel or a nickel alloy.

20. A monolithic ceramic capacitor according to claim 16, wherein the outer electrode comprises a first sintered layer of an electroconductive metal powder or an electroconductive metal powder and glass frit and an optional second layer comprising a plating layer on said first layer.

* * * * *